May 10, 1960  J. A. DE YOUNG ET AL  2,935,942
HOMING DEVICE

Filed July 29, 1946  36 Sheets-Sheet 1

INVENTORS:
John A. De Young
Murry N. Fairbank
Robert C. Jones
Charles H. Matz
Otto E. Wolff
By Frank J. Novotny
ATTORNEY

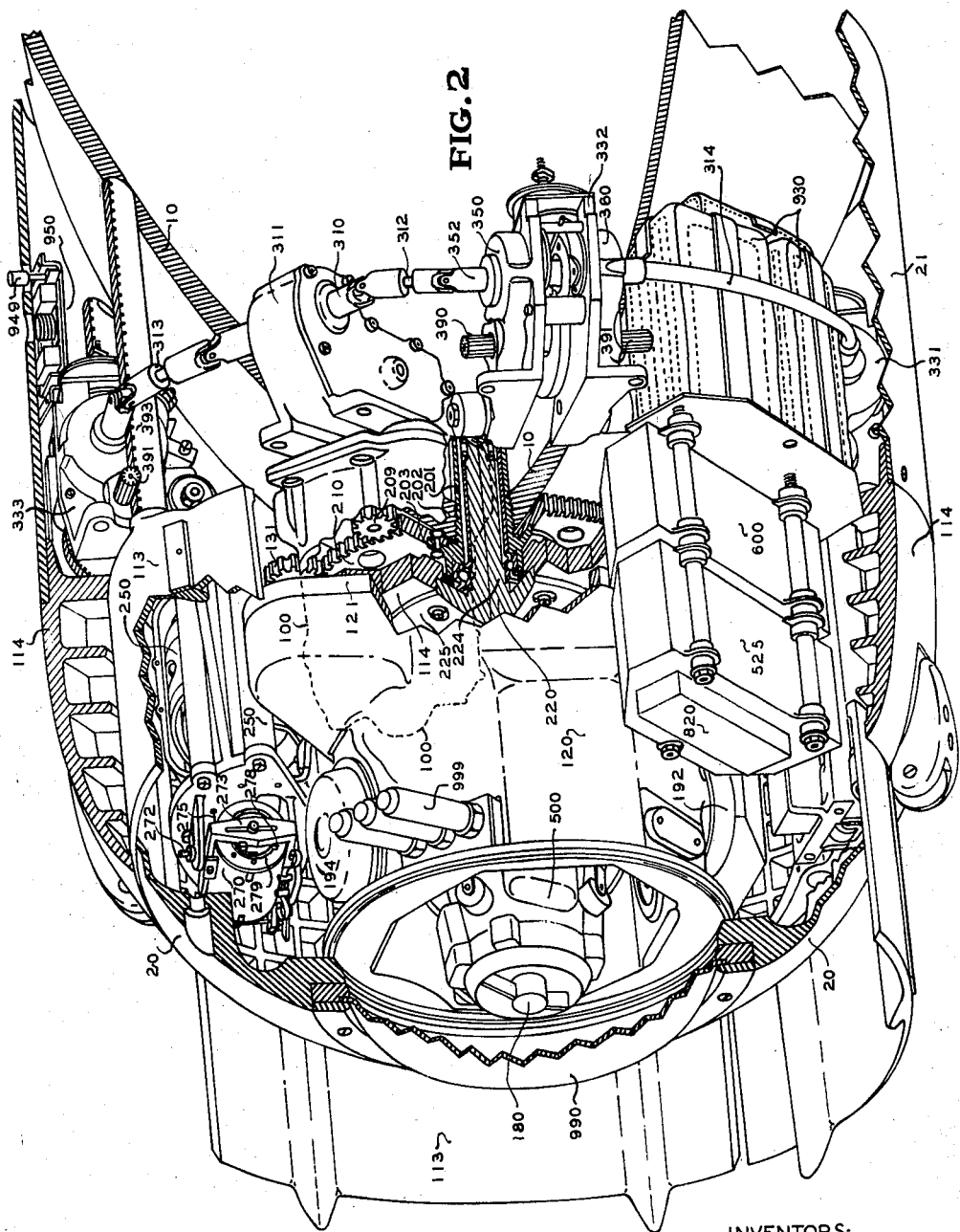

May 10, 1960

J. A. DE YOUNG ET AL 2,935,942

HOMING DEVICE

Filed July 29, 1946

May 10, 1960   J. A. DE YOUNG ET AL   2,935,942
HOMING DEVICE

Filed July 29, 1946   36 Sheets-Sheet 4

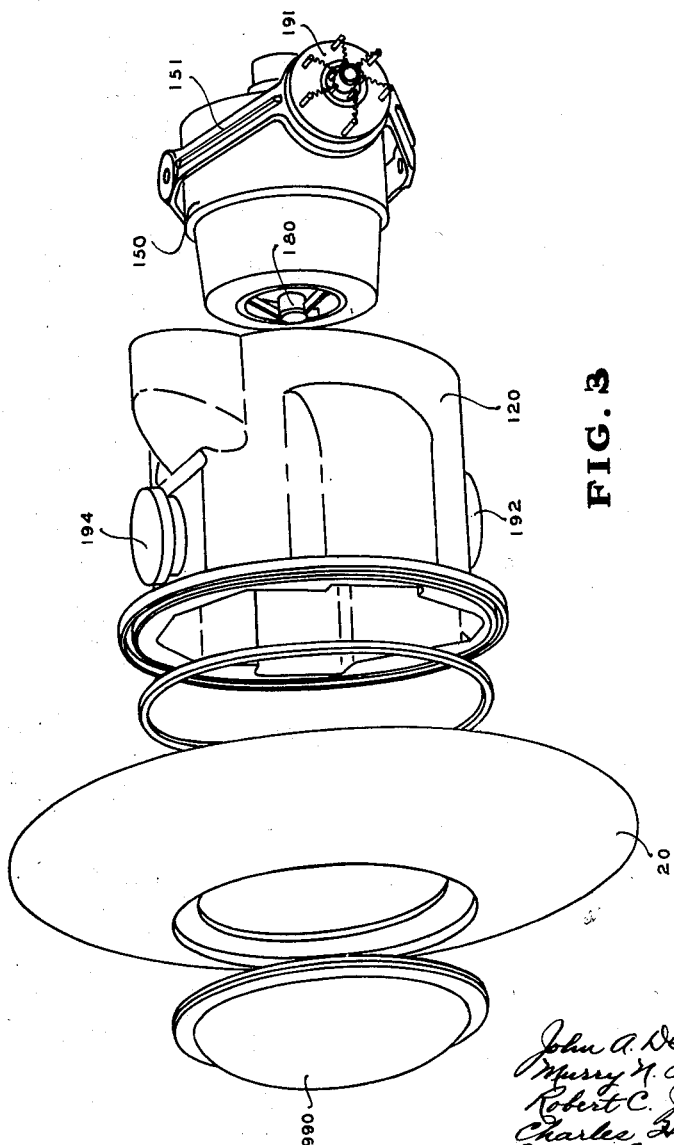

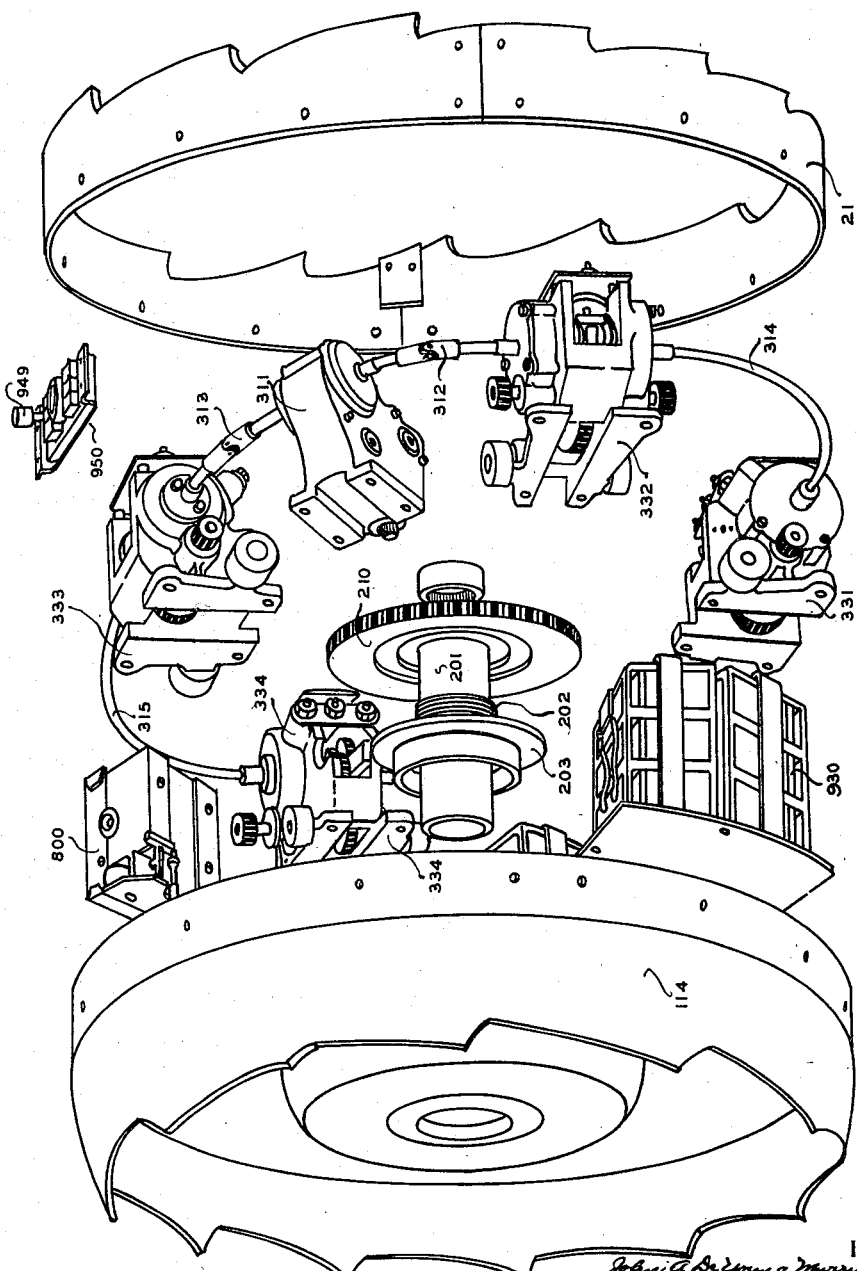

May 10, 1960  J. A. DE YOUNG ET AL  2,935,942
HOMING DEVICE

Filed July 29, 1946  36 Sheets-Sheet 9

John A. De Young
Murry N. Fairbank
Robert C. Jones
Charles N. Matz
and Otto E. Wolff
INVENTORS BY Frank J. Novotny
Attorney May 10, 1960  J. A. DE YOUNG ET AL  2,935,942
HOMING DEVICE Filed July 29, 1946  36 Sheets-Sheet 10

John A. De Young
Murry N. Fairbank
Robert C. Jones
Charles H. Mats
Otto E. Hoff
INVENTORS BY Frank J. Novotny
ATTORNEY

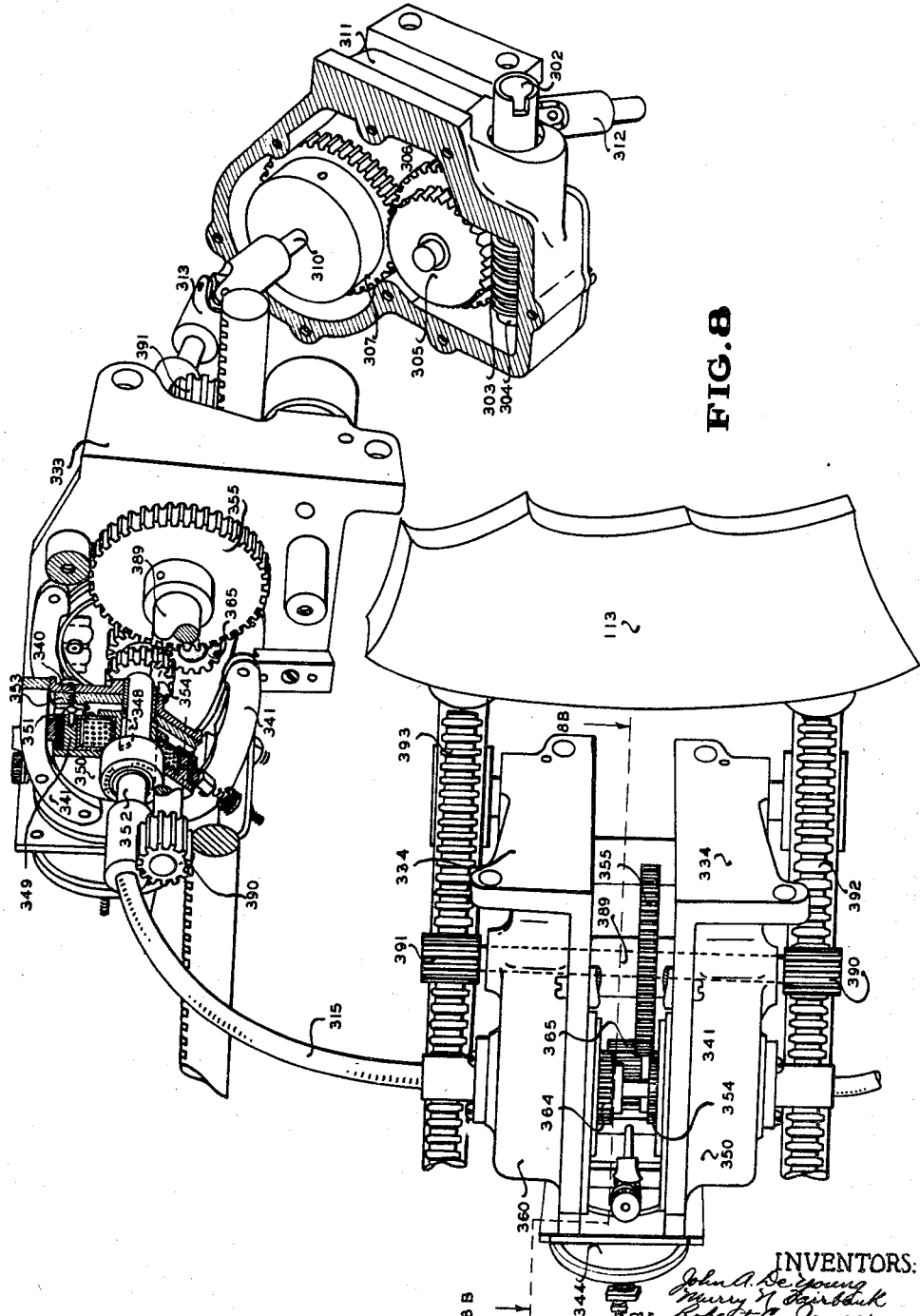

May 10, 1960  J. A. DE YOUNG ET AL  2,935,942
HOMING DEVICE
Filed July 29, 1946  36 Sheets-Sheet 12

INVENTORS
BY
ATTORNEY

May 10, 1960  J. A. DE YOUNG ET AL  2,935,942
HOMING DEVICE

Filed July 29, 1946  36 Sheets-Sheet 13

John A. De Young
Murry N. Fairbank
Robert C. Jones
Charles A. Matz
and Otto E. Wolff
INVENTORS BY Frank J. Novotny
Attorney May 10, 1960

J. A. DE YOUNG ET AL 2,935,942

HOMING DEVICE

Filed July 29, 1946

INVENTORS

BY

ATTORNEY

May 10, 1960 J. A. DE YOUNG ET AL 2,935,942
HOMING DEVICE
Filed July 29, 1946 36 Sheets-Sheet 15

INVENTORS
John A. De Young
Murry N. Fairbank
Robert C. Jones
Charles J. Matz
Otto E. Hoff BY Frank J. Novotny
ATTORNEY May 10, 1960 J. A. DE YOUNG ET AL 2,935,942
HOMING DEVICE
Filed July 29, 1946 36 Sheets-Sheet 17

INVENTORS:
John A. De Young, Harry N. Fairbank,
Robert C. Jones, Charles H. Metz
and Otto E. Wolff
BY
Frank J. Novotny
ATTORNEY

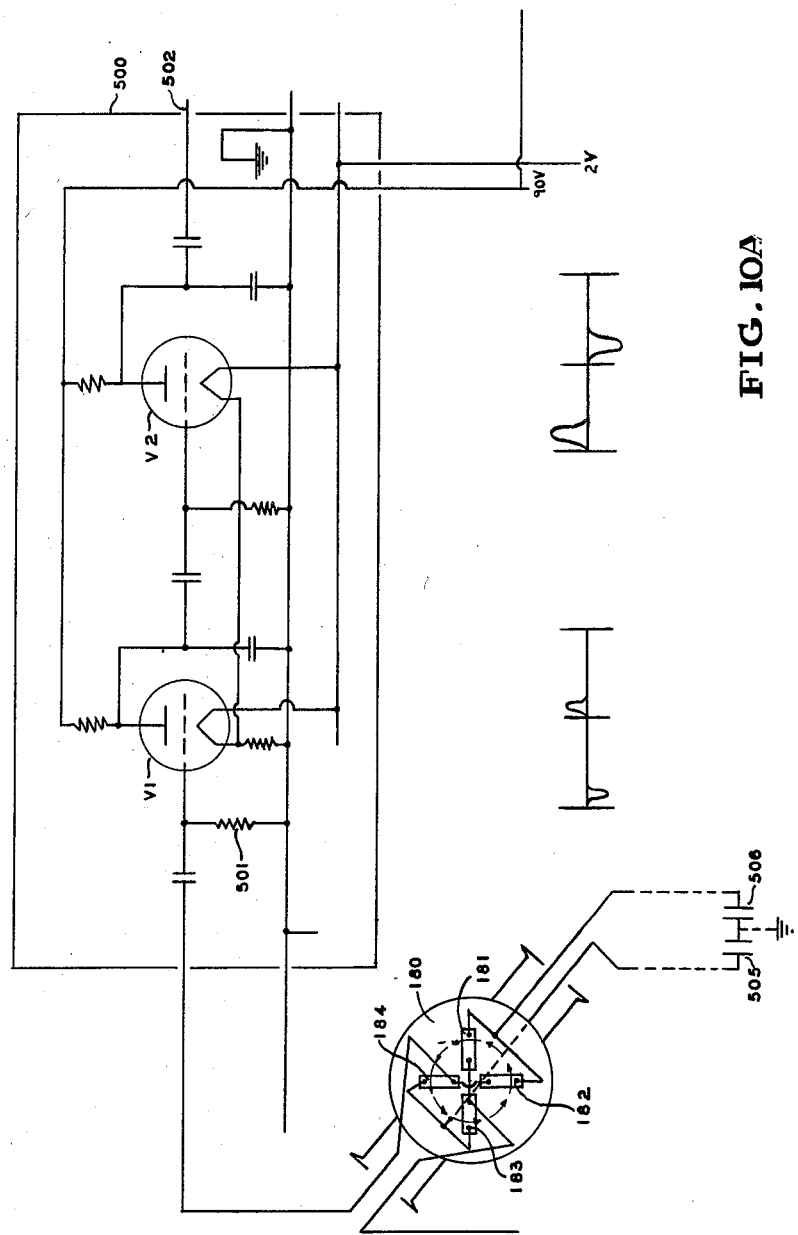

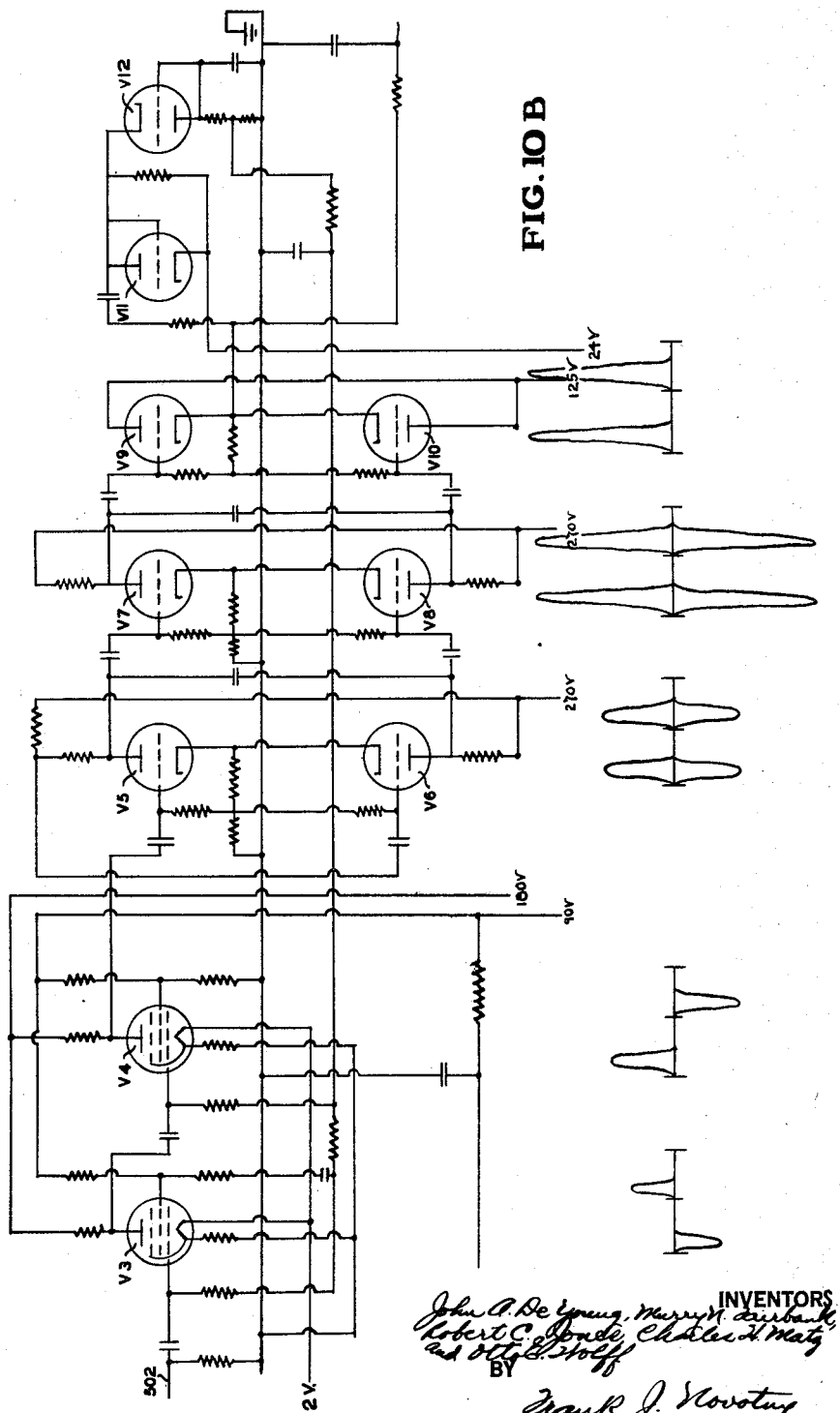

May 10, 1960

J. A. DE YOUNG ET AL 2,935,942

HOMING DEVICE

Filed July 29, 1946

INVENTORS:
John A. De Young, Murry N. Fairbank,
Robert C. Jones, Charles H. Matz,
and Otto E. Hoff
BY
Frank J. Novotny
ATTORNEY

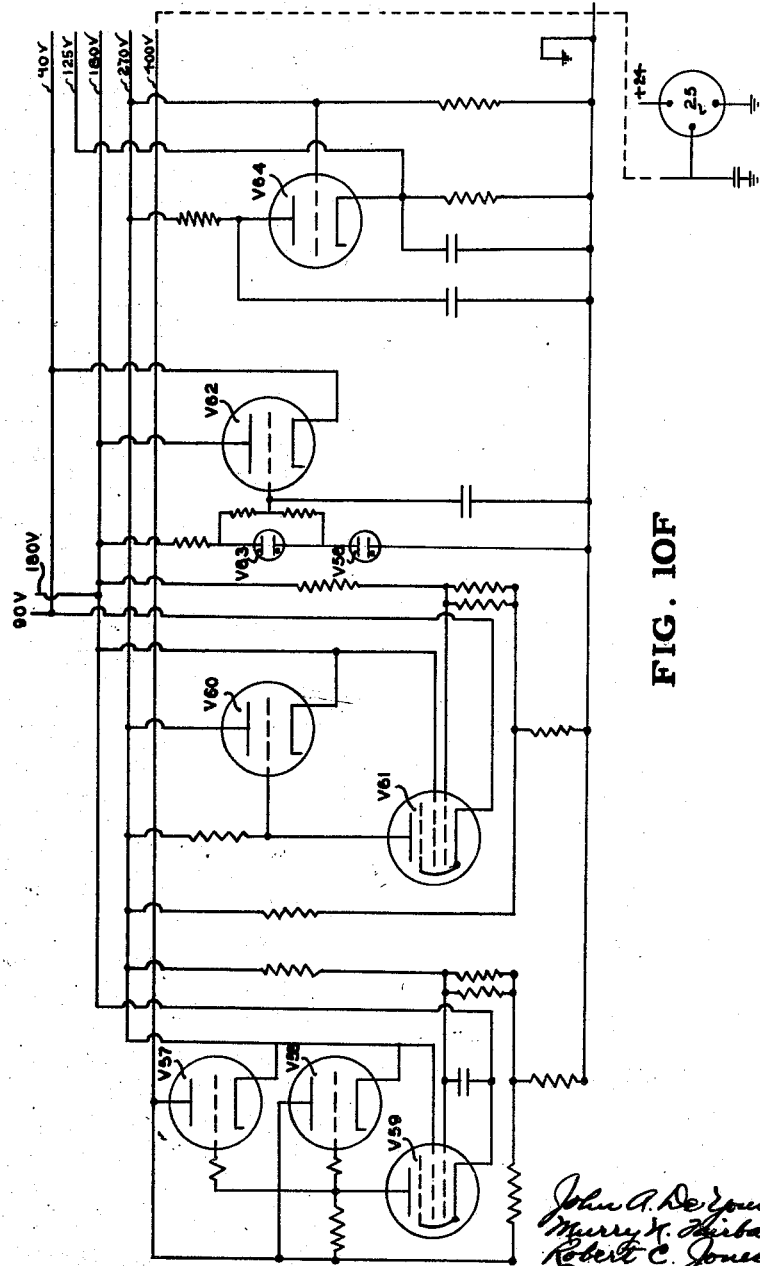

May 10, 1960 J. A. DE YOUNG ET AL 2,935,942
HOMING DEVICE
Filed July 29, 1946 36 Sheets-Sheet 24

INVENTORS
BY
ATTORNEY

May 10, 1960

J. A. DE YOUNG ET AL 2,935,942

HOMING DEVICE

Filed July 29, 1946

May 10, 1960 J. A. DE YOUNG ET AL 2,935,942
HOMING DEVICE
Filed July 29, 1946 36 Sheets-Sheet 34

INVENTORS
ATTORNEY

United States Patent Office 2,935,942
Patented May 10, 1960

2,935,942
HOMING DEVICE

John A. De Young, Medford, Murry N. Fairbank, Weston, Robert C. Jones, Cambridge, Charles H. Matz, Brookline, and Otto E. Wolff, Cambridge, Mass., assignors, by mesne assignments, to the United States of America as represented by the Secretary of the Navy Application July 29, 1946, Serial No. 687,012

14 Claims. (Cl. 102—3)

This invention relates to a homing device. More particularly, it embraces a heat homing device for use with an air or similarly borne object whereby the latter is directed in its course.

Although such an apparatus has many commercial applications, for example as in aircraft guidance through fog or low hanging clouds, devices for fire control and target tracking utilizing heat homing or infrared intelligence, the piloting of steamships through narrow channels and past mud banks, the detection of excessively or dangerously hot bearing boxes in a specific car of a long line of freight trains, or the spot delivery of mail or similar packaged articles from moving aircraft, its most pertinent use is to be found, perhaps, in the art of aerial warfare, more especially in aerial bombing.

Essentially, and for the purpose of explaining its operation, the invention is described herein as embodied in an attachable nosepiece which can be readily mounted on a standard bomb and adapted to maintain the bomb on a directed trajectory so as to cause practically every bomb launched to score a hit. In order to effect this precision bombing of a given target, such as a rapidly moving ship, the attachable nosepiece is provided with a scanning unit or eye which, in response to signals received in the form of thermal radiations from the ship, transmits a signal to control activators or deflecting vanes in the nosepiece to guide the bomb on-target.

Heretofore, a number of homing devices for missiles have been suggested, but in general, have resorted to tail-fin distortion or rudder control and usually have necessitated such radical changes in design as to render the ordinary pilot incapable of adapting either himself or the usual bomb bay for the ready use of such a novel bomb. Frequently, bombs equipped with such devices do not avail themselves of the computations made by the bombsight and in some instances the devices do not seek to have the bomb follow the typical parabolic trajectory over any part of its flight as a freely falling body.

This invention, on the contrary, contemplates the use of bombs and bombing procedures completely standard in every detail except for the provision of an attachment, preferably a nosepiece, for receiving thermal or similar radiations from the target and correcting the bomb trajectory in order that a hit should always be scored. Thus, it is adapted for use with ordinary or standard bombs or missiles and hence requires a minimum of departure from the standard designs of such bombs and from the standard procedures used in bombing runs.

Briefly, the object of this invention is the provision of a nosepiece adapted to retain the normal parabolic trajectory as initiated by the bombsight, modifying this trajectory only insofar as the bombsight was in error and insofar as new winds or changes in position of the target result in information unpredictable by the bombsight.

In order to facilitate a more ready and complete understanding of the theory and operation of the principle involved, a preferred embodiment of the invention is illustrated in the accompanying drawings, wherein:

Fig. 2 shows a complete nosepiece attached to a standard bomb;

Figure 4:
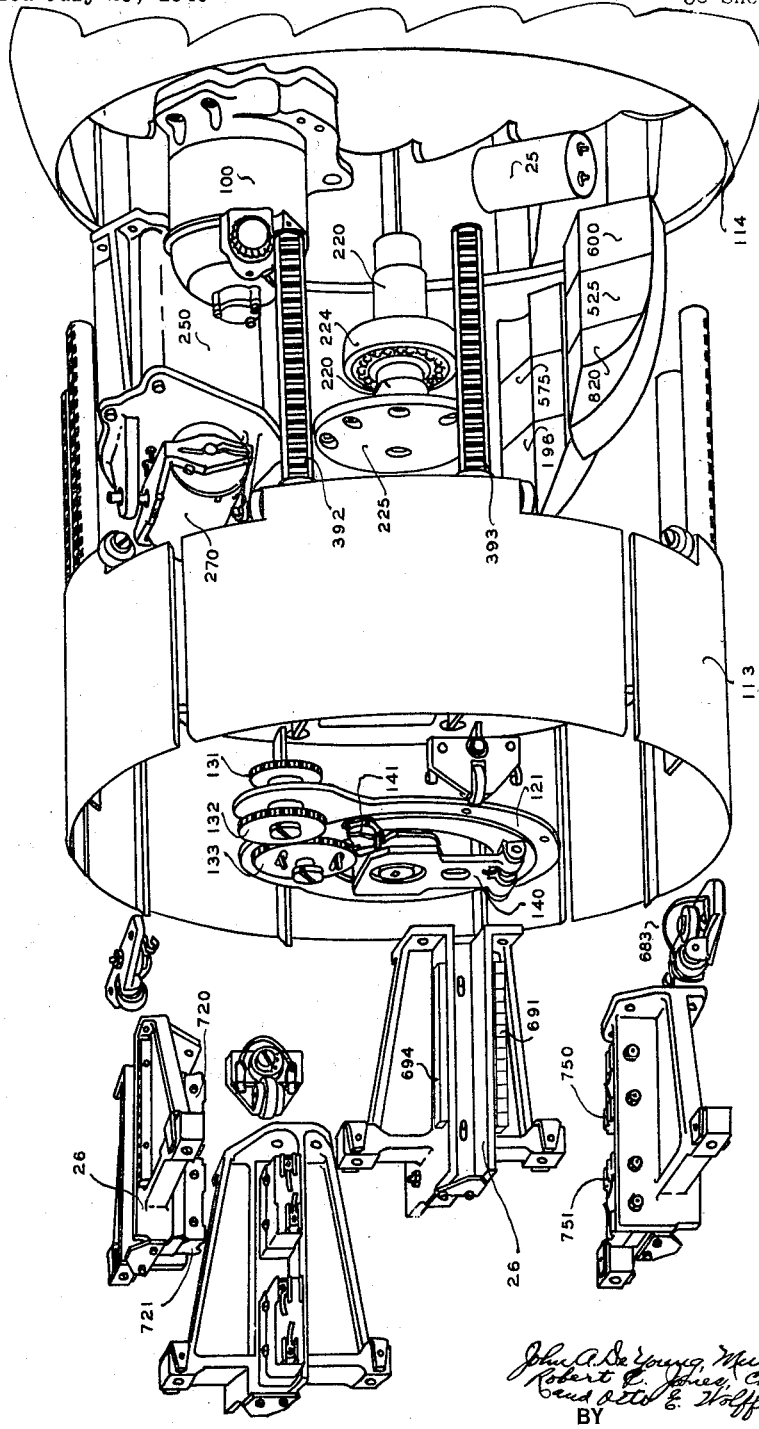
Figure 7:
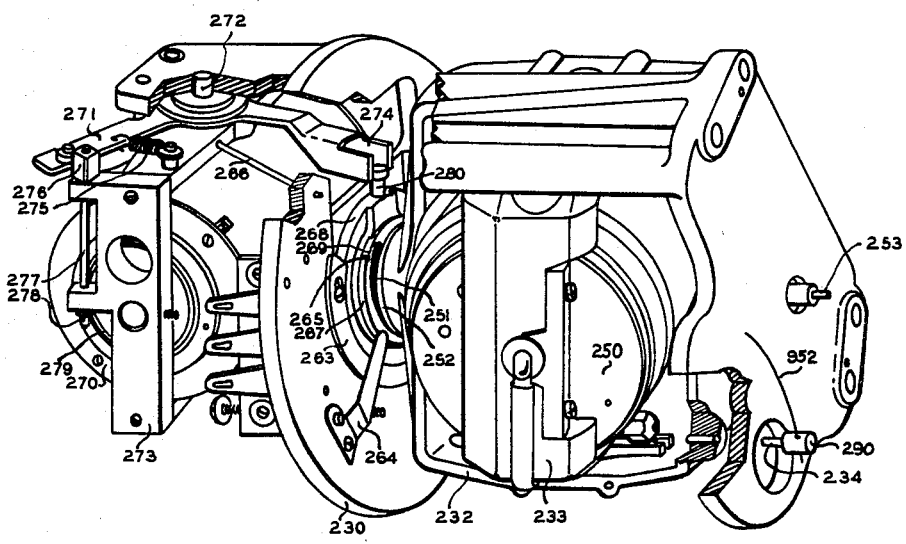
Figure 6:
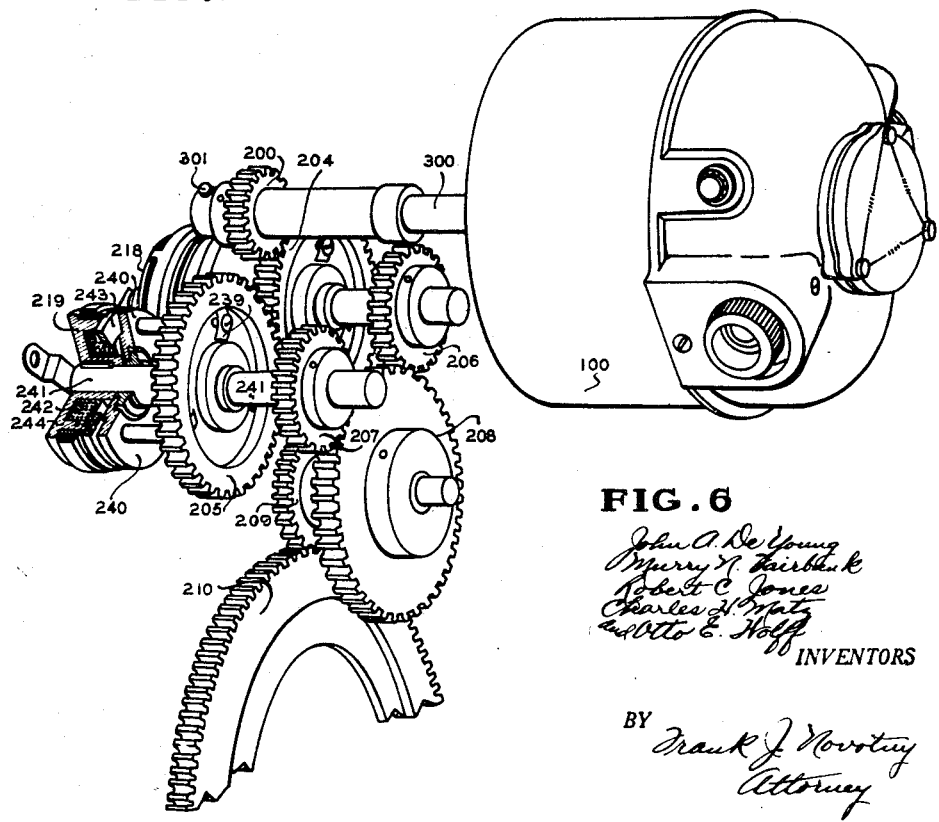
Figure 7A:
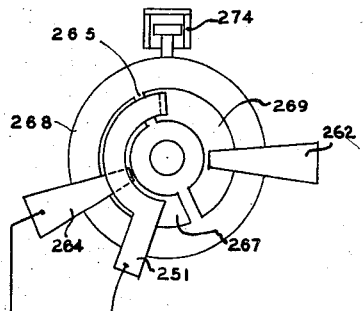
Figure 7B:
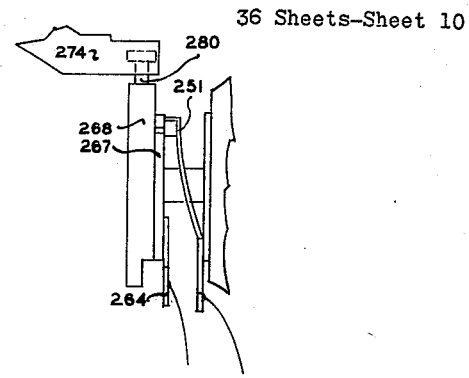
Figure 6A:
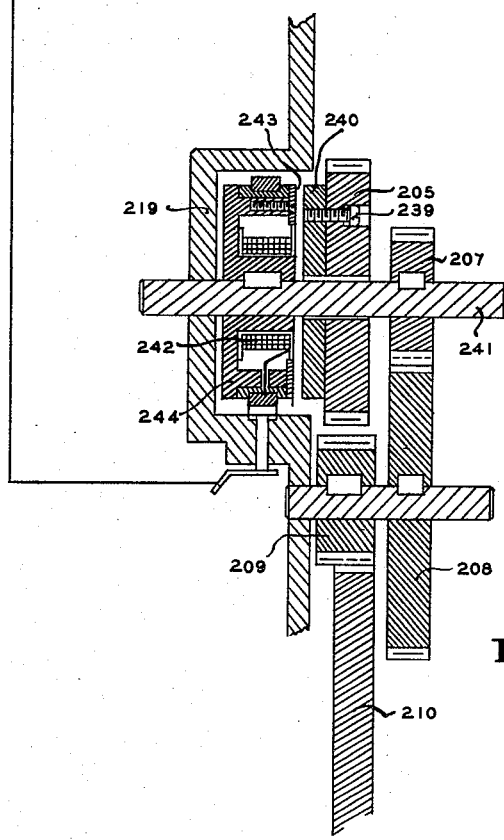
Figure 8A:
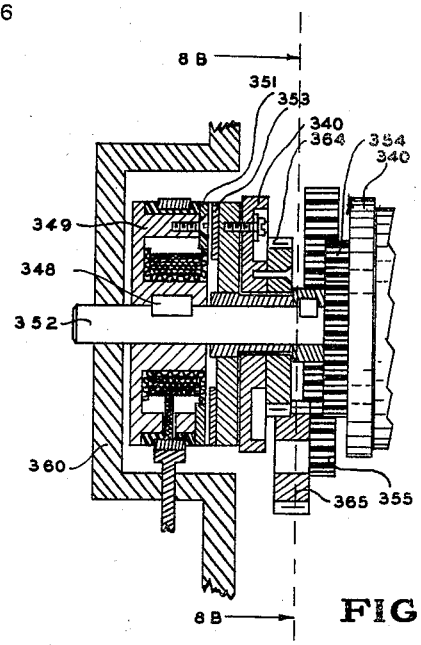
Figure 8B:
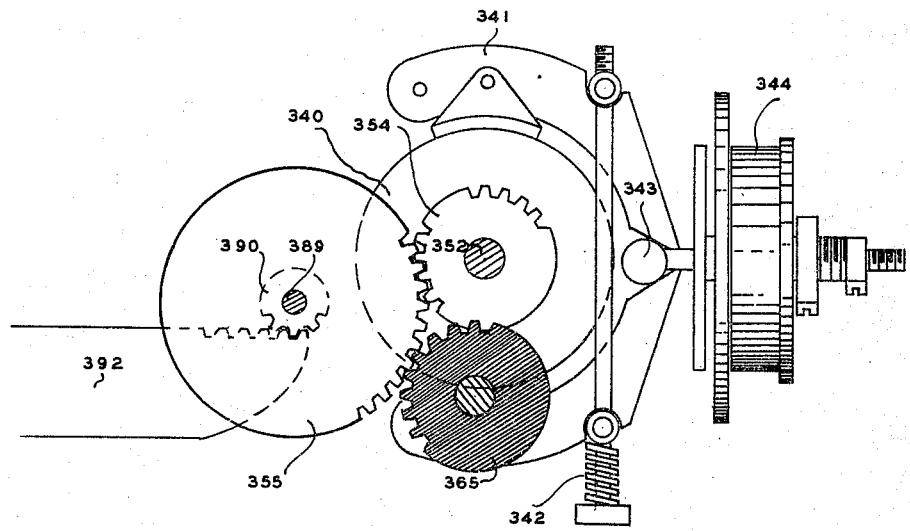
Figure 9:
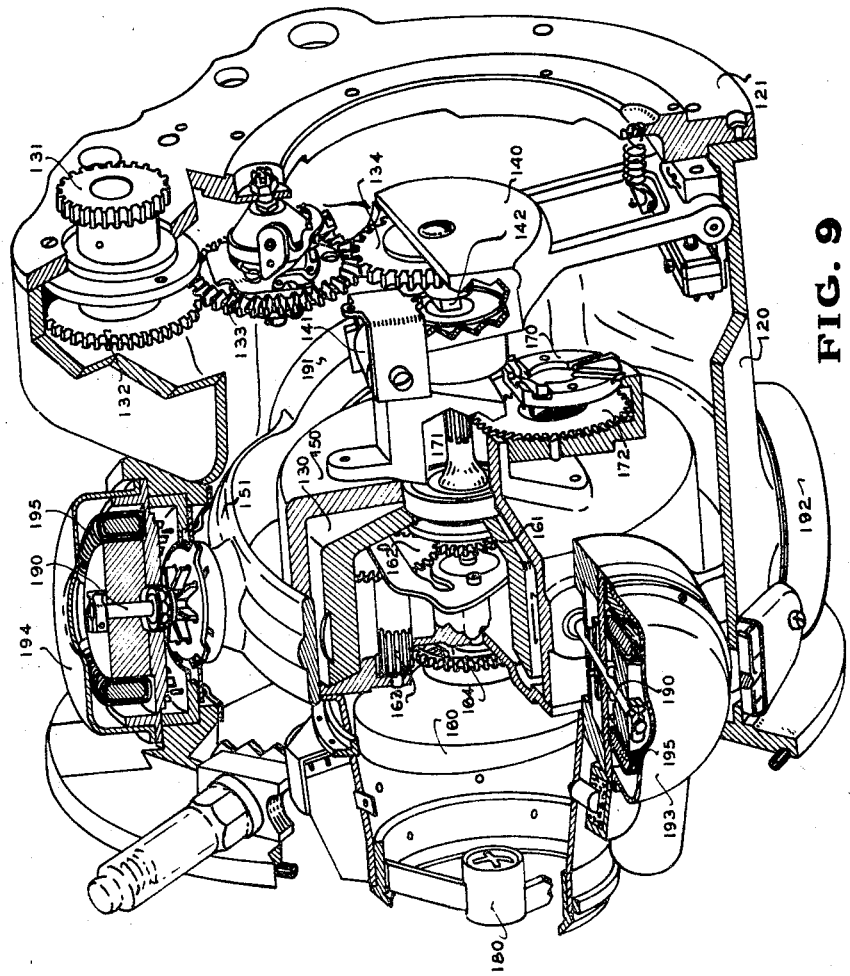
Figure 9A:
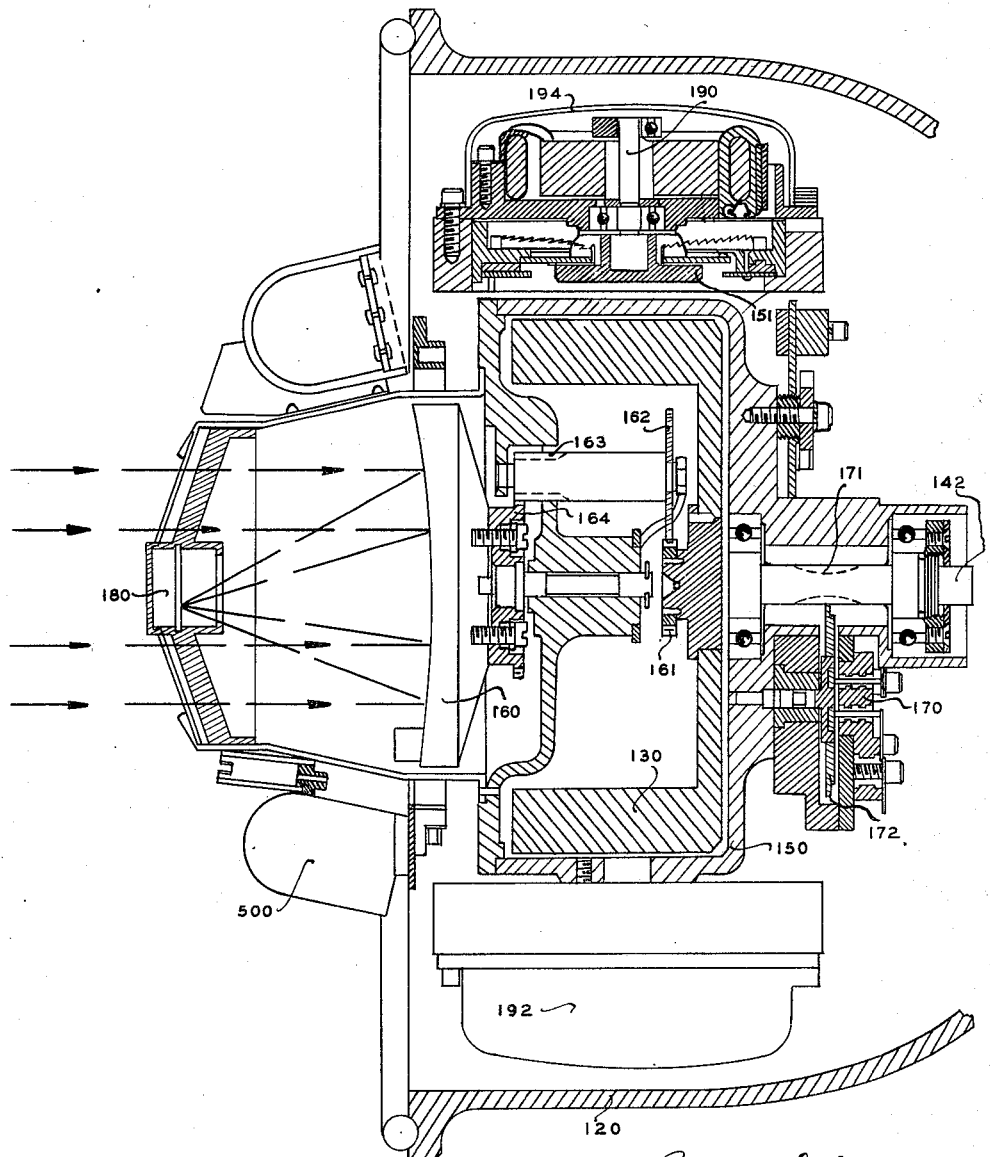
Figure 9B:
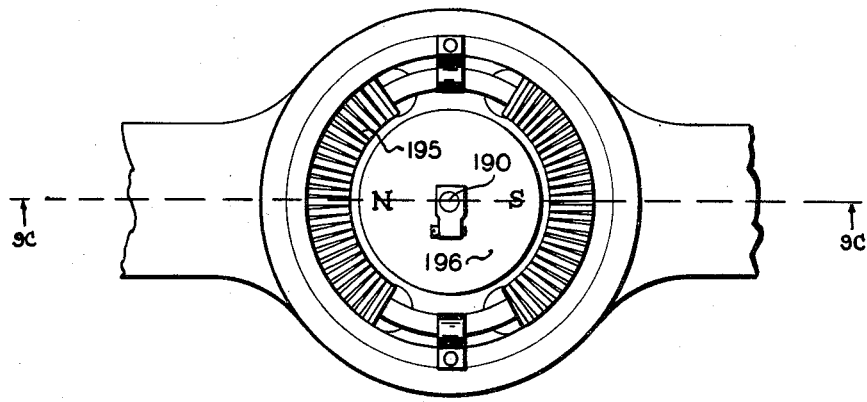
Figure 9C:
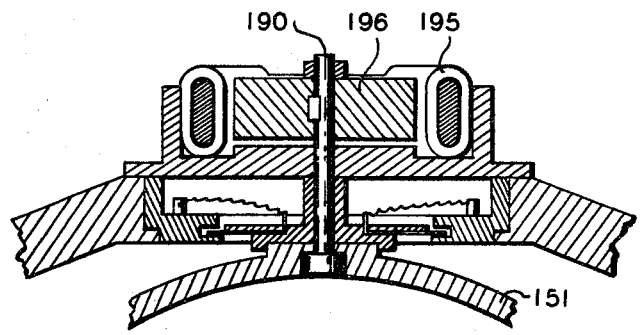
Figure 9D:
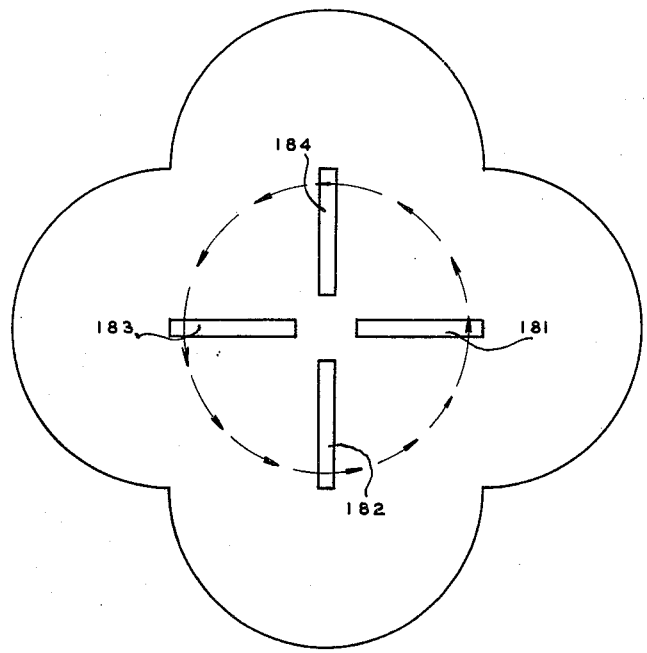
Figure 10:
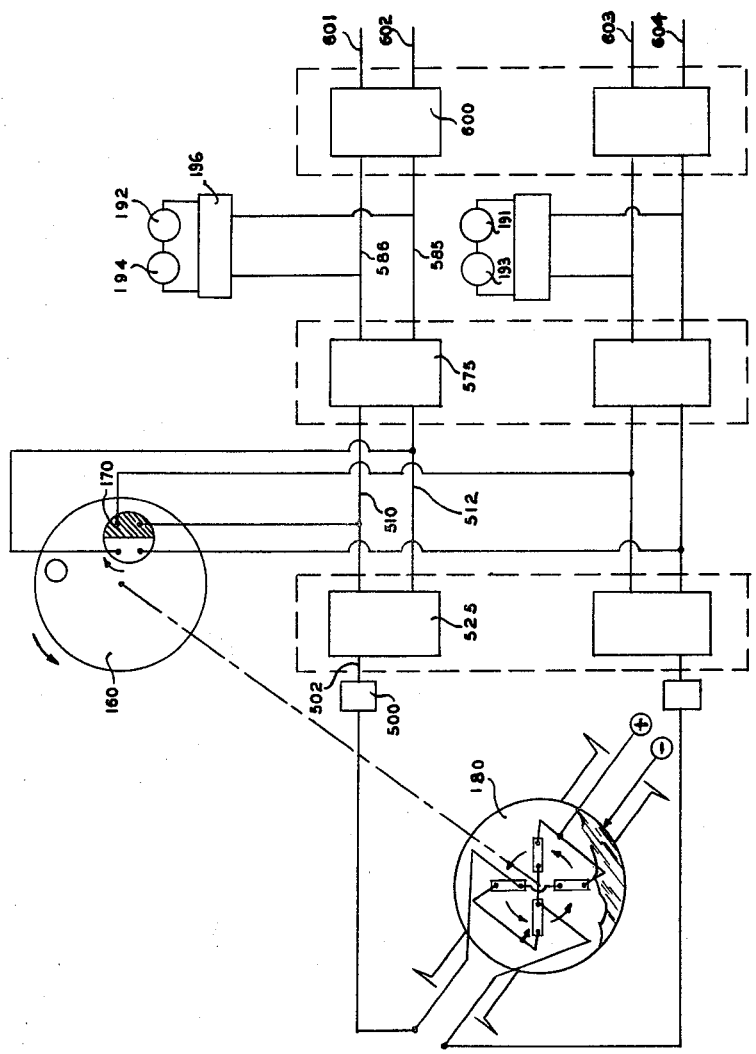
Figure 10C:
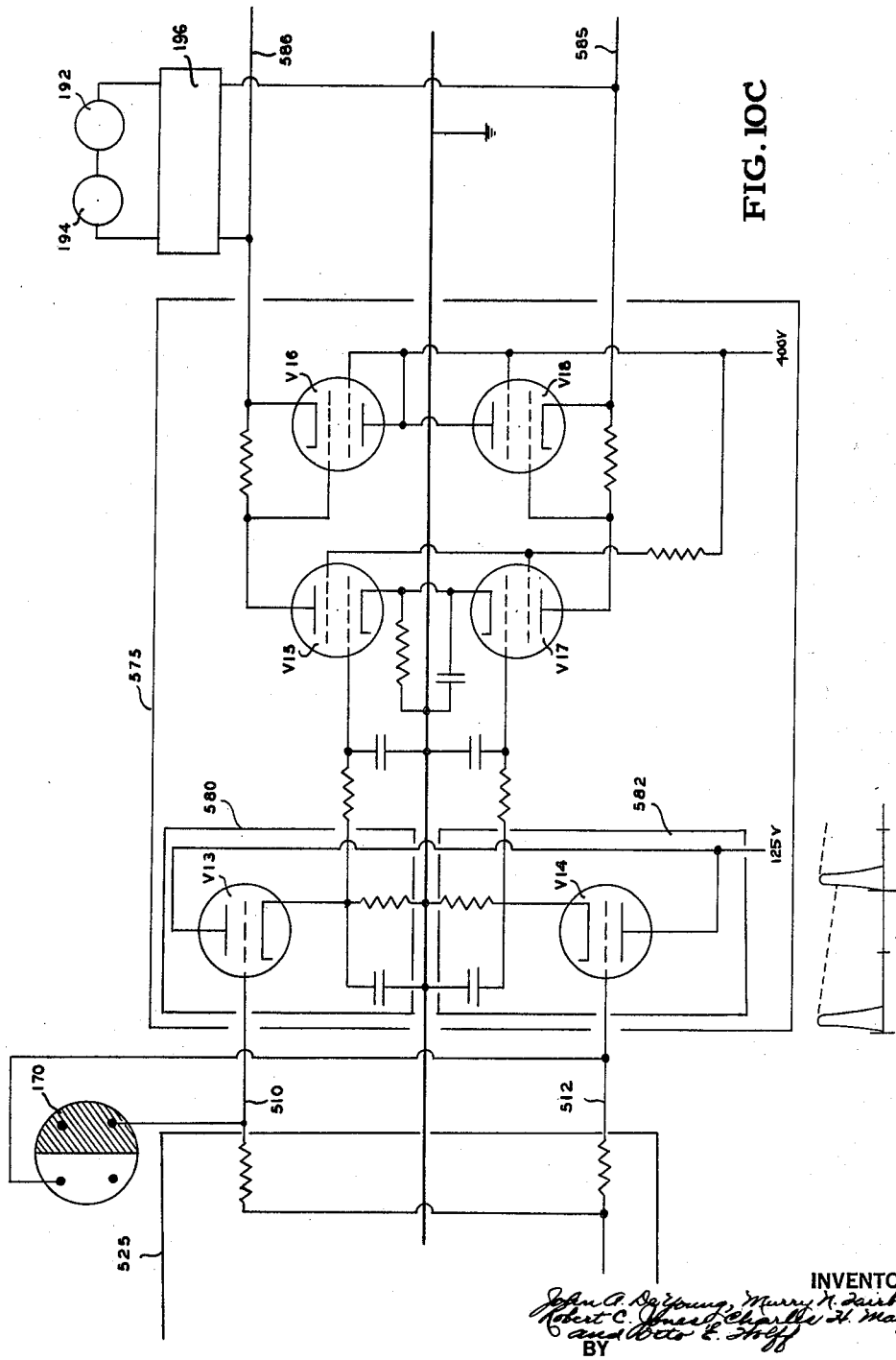
Figure 10D:
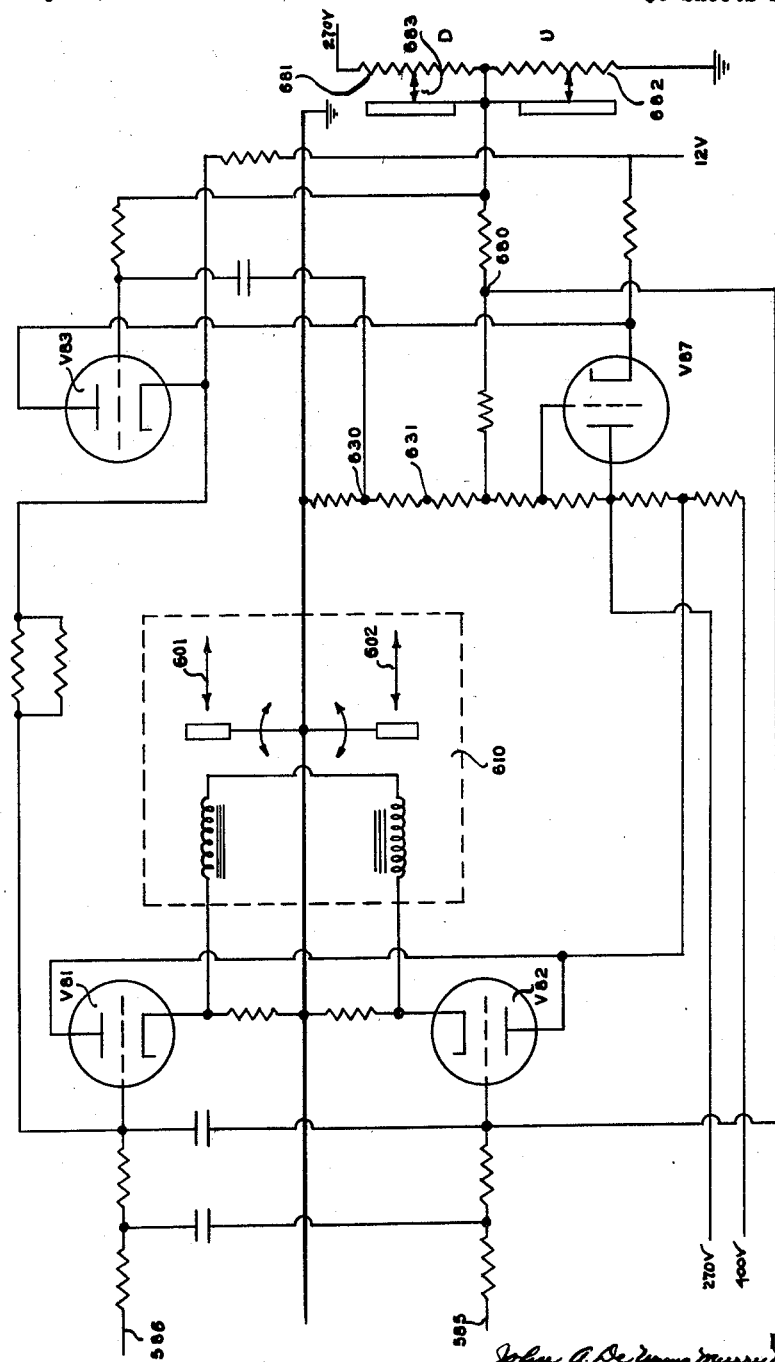
Figure 10E:
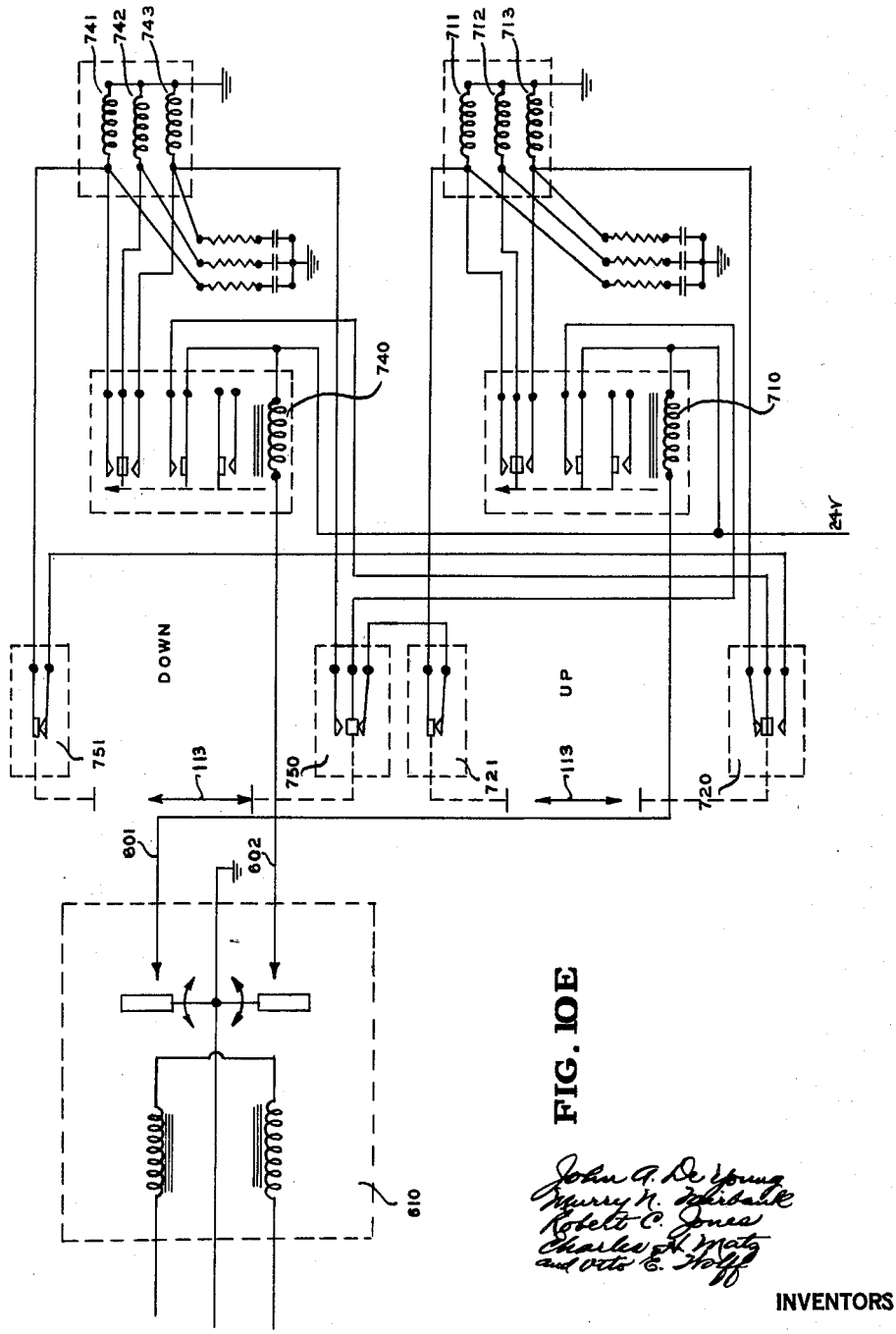
Figure 11:
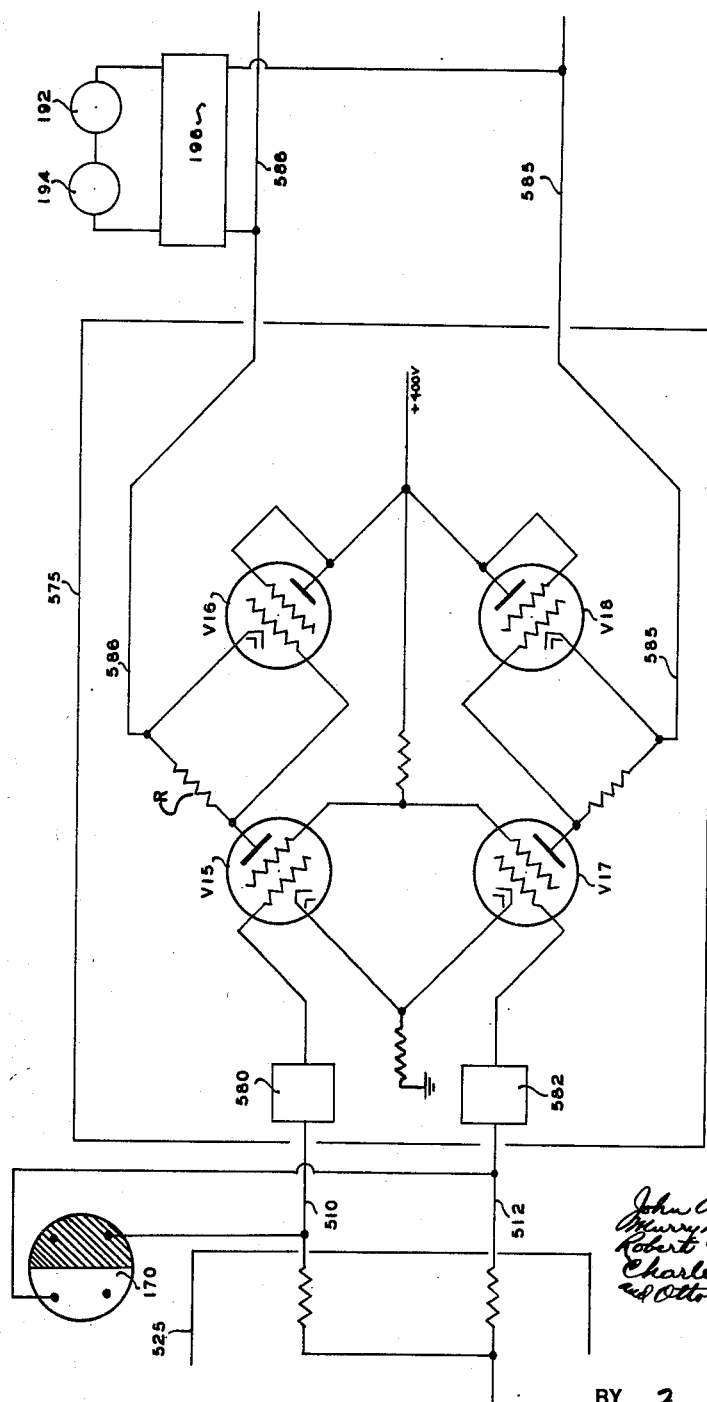
Figure 12:
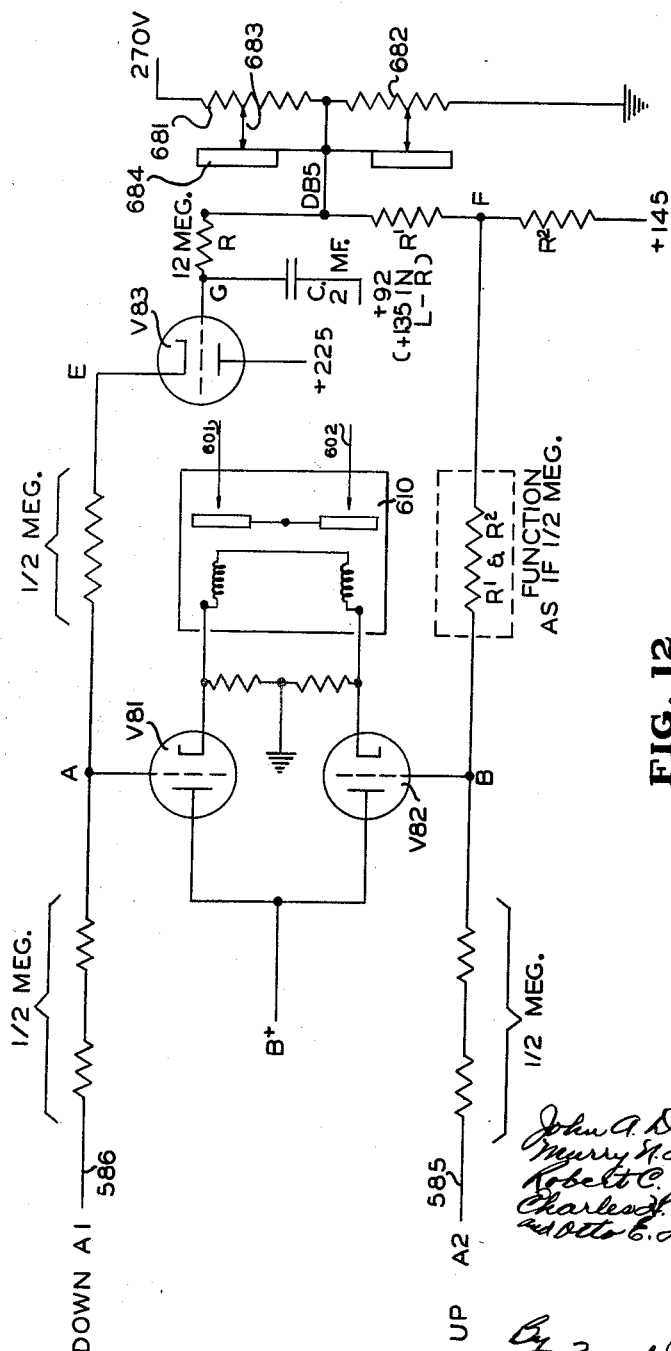
Figure 13:
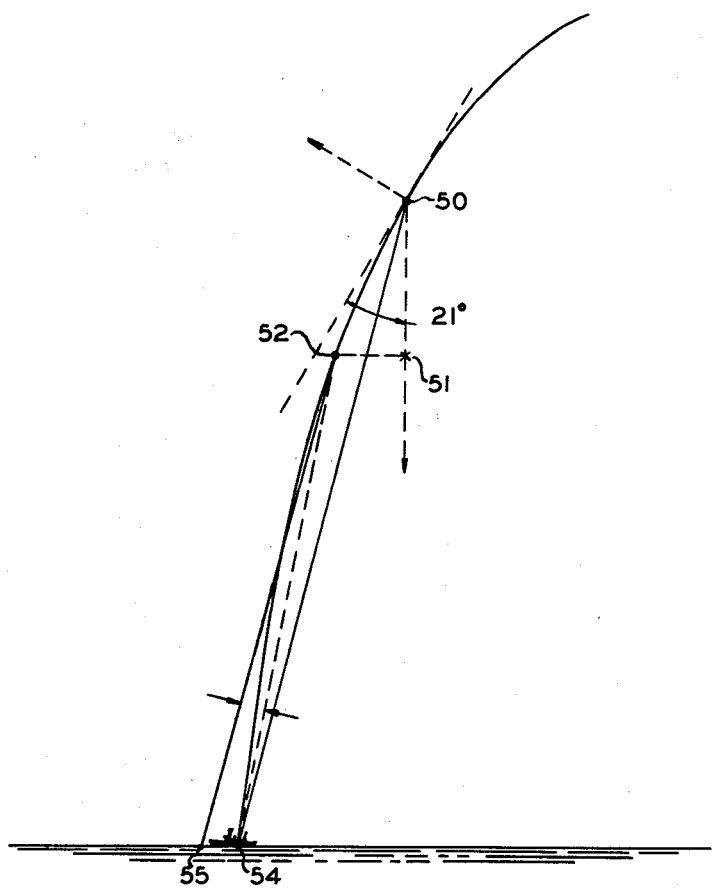
Figure 14:
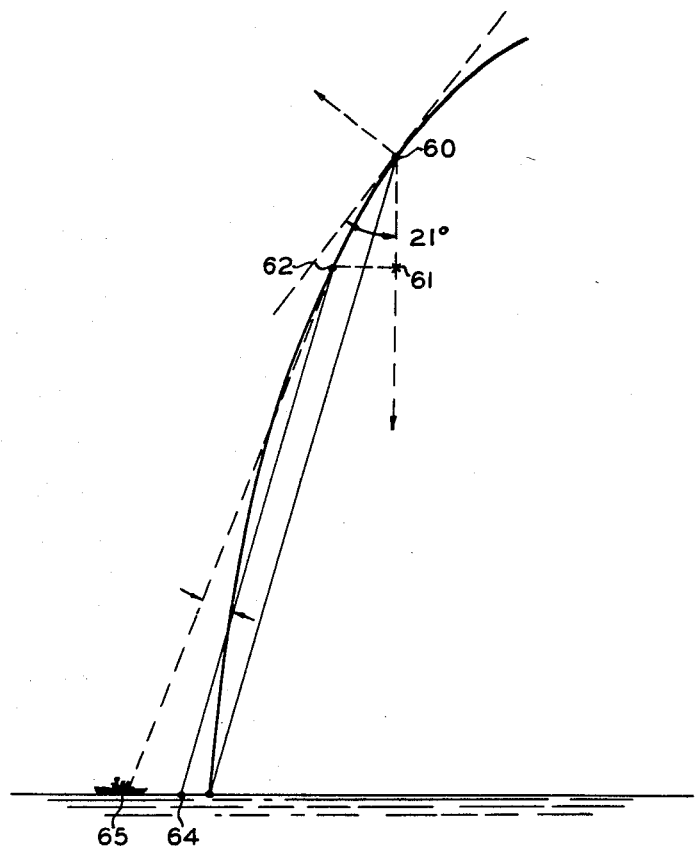
Figure 15:
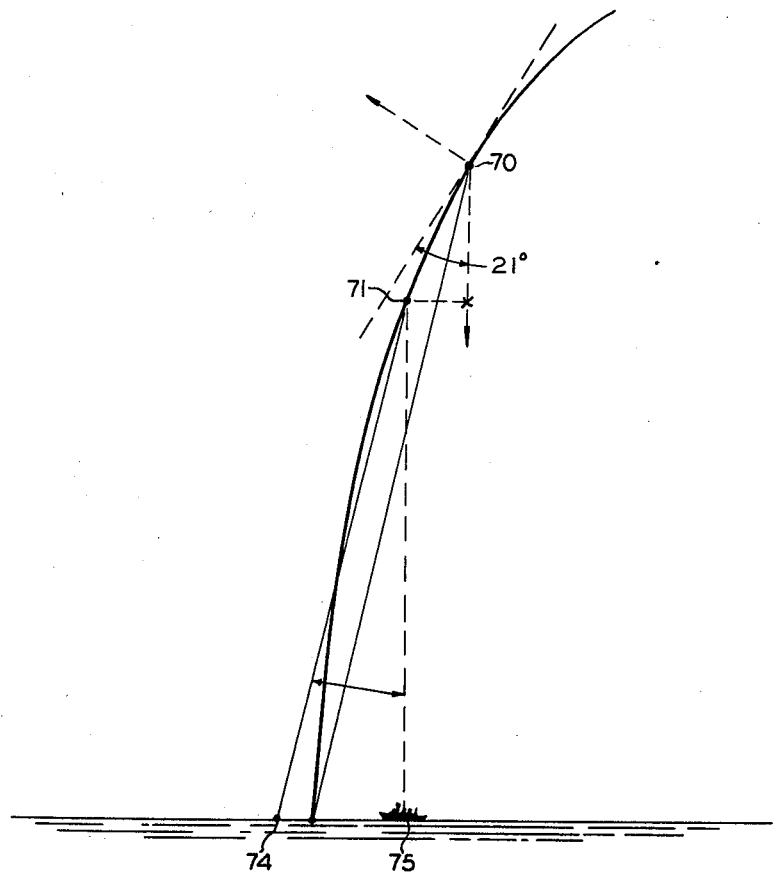
Figure 16:
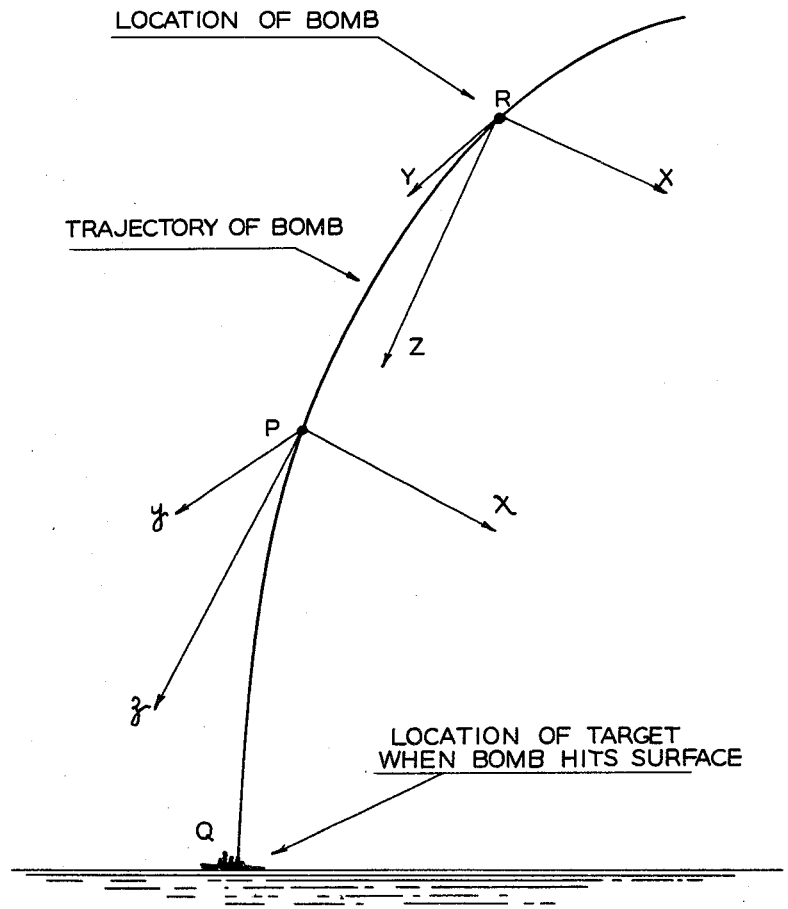
Figure 17:
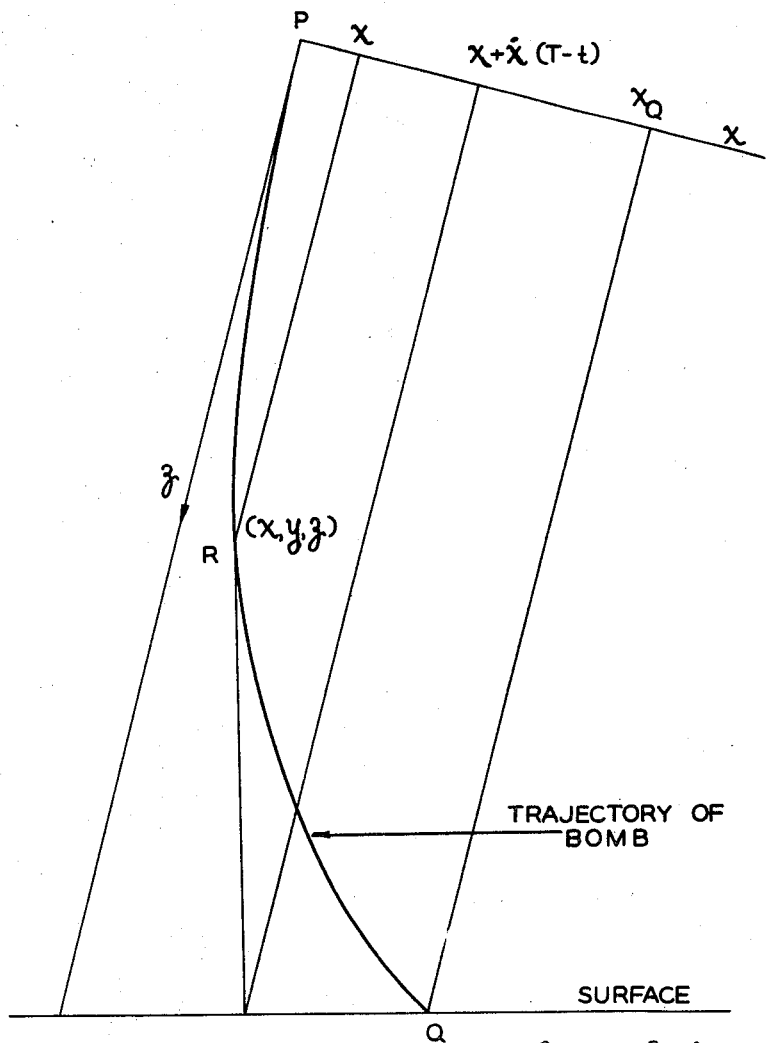

Figs. 3, 4 and 5 show an exploded view of the nosepiece of a homing bomb showing apparatus for receiving signal energy in the form of radiations from a target and other equipment responsive to such radiations for operating extensible deflectors for correcting the trajectory in order that a hit may be scored; these figures show the relative position and the location of the various stabilizing gyroscopes, deflector drive, the drive motor storage batteries, dynamotor, the elements of the eye pot assembly, together with the apparatus used for guiding the deflectors, the mounting ring or frame, etc.;

Fig. 6 is an enlarged view of the drive motor and gear train for stabilizing the nosepiece against roll;

Fig. 6A is a sectional view of Fig. 6 taken on a plane through the axes of gears 207 and 208;

Fig. 7 is an enlarged view of the free gyroscope and the rate gyroscope for controlling circuits for the operation of the apparatus of Fig. 6;

Fig. 7A is a face plan view of the roll stabilizing sector switch of Fig. 7 taken from the left of washer 252;

Fig. 7B is a side plan view of the roll stabilizing sector switch of Fig. 7A taken from the left of Fig. 7A;

Fig. 8 is an enlarged perspective view of the upper half of the apparatus for extending and retracting the deflectors shown in Fig. 5 and taken a little to the left of the axis of the nosepiece with portions of the apparatus removed or cut away in order to show the mechanism more clearly;

Fig. 8A is a vertical sectional view of Fig. 8 taken on a plane through the axes of gears 264 and 265, showing the electromagnetic clutch, forward and reversing gears;

Fig. 8B is a sectional view taken on the line 8B—8B of Figs. 8 and 8A;

Fig. 9 is an enlarged view of the eye pot assembly with portions broken away to show the construction more clearly;

Fig. 9A is an enlarged vertical sectional view of the eye pot taken through the axis of Fig. 9;

Fig. 9B is a top plan view of the torque motor shown at the top of Fig. 9 with cover 194 removed;

Fig. 9C is a vertical sectional view of the torque motor of Fig. 9B taken on the line 9C—9C;

Fig. 9D is the clover leaf field of view of the eye unit due to the superimposed rotation of the mirror on the thermistor;

Fig. 10 is a block diagram showing the components of the electronic system;

Fig. 10A is a detailed view of the preamplifier circuit showing in a schematic manner the elements thereof;

Fig. 10B is a detailed view of the information circuit showing in a schematic manner the elements thereof and below each tube the changes effected in the various signals;

Fig. 10C is detailed view of the torque motor bridge circuit also shown in a schematic manner;

Fig. 10D is a detailed view of the deflector circuit showing in a schematic manner the micropositioner switch and deflector potentiometer of the up-down channel;

Fig. 10E is a detailed view of the electrical connections showing in a schematic manner the micropositioner switch, limit switches and deflector clutch magnets for the up-down channel;

Fig. 10F is a detailed view of the power supply circuit showing in a schematic manner the elements of the circuit;

Fig. 11 is a schematic representation of the torque motor bridge circuit of Fig. 10C laid out, however, as a conventional bridge circuit in order to facilitate an understanding of its functional operation;

Fig. 12 is a schematic representation of the deflector bridge circuit of Fig. 10D simplified somewhat in order to facilitate an analysis of the circuit and its functional operation;

Fig. 13 is a diagrammatic representation of the trajectory of an on-target bomb showing a collision course;

Fig. 14 is a diagrammatic representation of a bomb trajectory falling short of the target;

Fig. 15 is a diagrammatic representation of a bomb trajectory over-shooting the target;

Fig. 16 is a diagram illustrating the theoretical explanation of the bomb trajectory;

Fig. 17 is a diagram illustrating the theoretical explanation of the bomb trajectory; and Figs. 18, 19, 20, 21, 22 and 23 show the complete circuit diagram for the bomb in its connected condition as it appears when the timer 800 has completed its cycle (i.e. at time interval $x+5$ seconds, where $x$ equals 22 to 25 seconds approximately).

The complete electrical circuit shown in Figs. 18, 19, 20, 21 and 22 is a composite of the up-down channel and left-right channel shown in block diagram in Fig. 10 and includes the detail shown for the up-down channel in Figs. 10A, 10B, 10C, 10E and 10F, together with timer switch 800, battery power source 930, 931, 932, wiring for roll stabilizing unit of Figs. 6, 6A, 7 and 7A, together with the power supply, relays and thermistor condensers 505, 506 and the connecting leads for the above units.

In general when a ship is the target, there is sufficient contrast between the thermal radiation of the ship and the thermal radiation of its surroundings (background radiation) to make detection of the ship's presence possible. The basic principle upon which this invention is founded is the use of signals in the range of the far infrared of the electromagnetic spectrum, the projection of this signal on a plane surface which carries elements sensitive to the signal and the detection and location of the signal in any one of the sectors (for example, one of four quadrants) into which a plane surface is divisible. The pulse thus received is then allocated for the operation of apparatus for causing the particular detection means to remain or to be guided on-target and for causing the detector carrying means to so alter its course as to follow a new trajectory, thereby remaining on-target and registering a hit.

The sequence of operations of the apparatus in the course of a bomb run may be summarized as follows: The missile is dropped. At a certain altitude, approximately 10,000 feet and presumably when the trajectory has attained a somewhat vertical direction, the eye is "opened" and the receptor becomes operative, picking up the target. If the missile is on-target, no deflection is necessary. However, if the eye perceives an error, this information is transmitted to the electronic controlling circuit and the resultant signal causes the eye to precess so as to keep pointing at the target. This precessional velocity is a measure of the correction needed and is used to cause appropriate deflectors to extend. The extended deflector or deflectors will cause the projectile to accelerate (pitch and yaw) and result in an acceleration in the direction in which the target lies. As the deflector brings the bomb into an on-target position, the signal representing an off-axis target becomes smaller and smaller until deflector action is no longer required, whereupon the deflector is withdrawn into the nosepiece and, if necessary, the opposite deflector may be extended to correct for any over-compensation occasioned by any delay in integration of the signal.

The improved operation of such a directed or homing bomb capable of scoring hits with practically each bomb launched is accomplished in accordance with this disclosure by the provision of apparatus in the nosepiece whereby the following conditions are precisely controlled:

(1) The stabilization of the nosepiece against roll;

(2) The guidance of the bomb from the nose by the use of axially extensible deflectors; and (3) The maintenance of the detecting eye on the target regardless of the excessive variation of the bomb axis from the vertical, the locking-on of the eye on the target and the utilization of this information for the operation of appropriate preselected deflectors to guide the bomb to its target.

Figure 1:
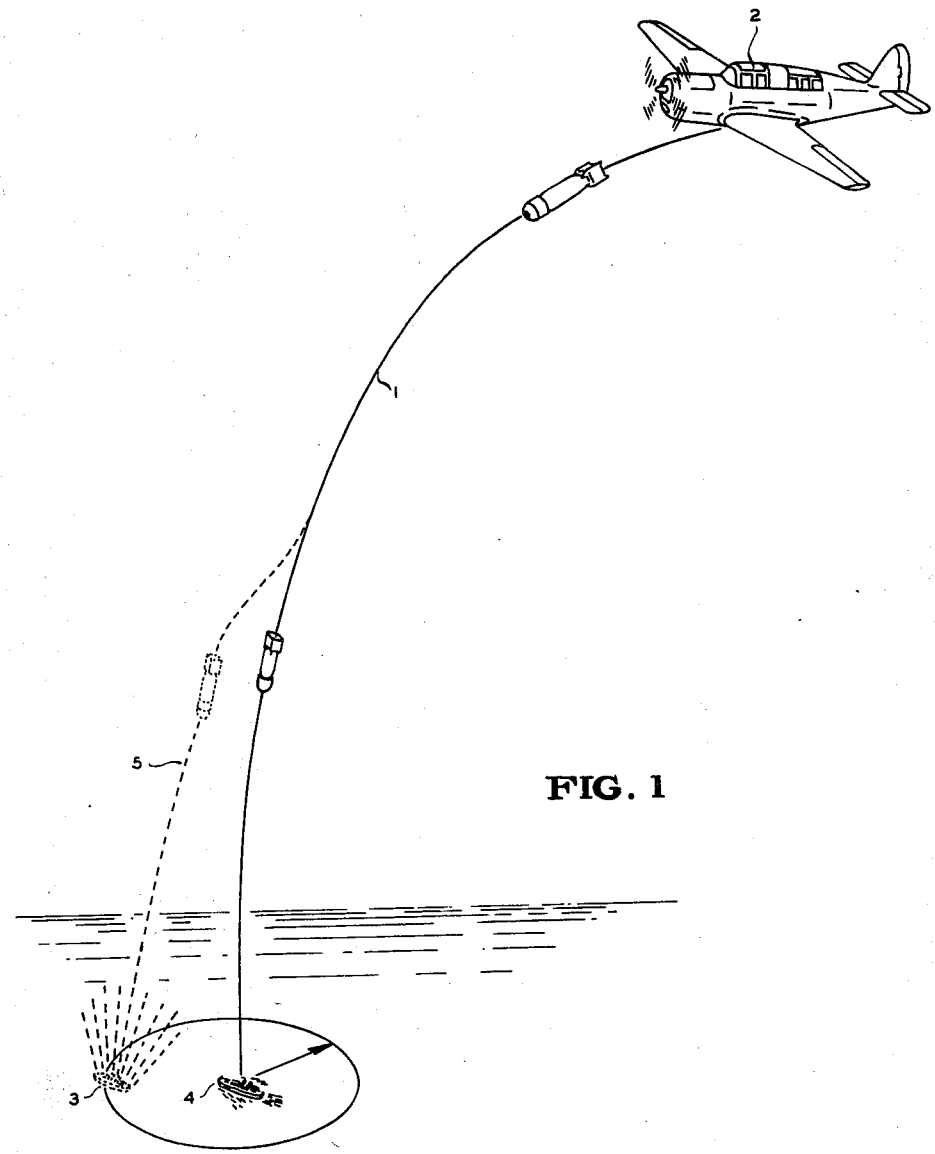
Figure 1 shows the path of a missile such as a standard bomb and the corrected trajectory of a directed or homing bomb designed and equipped in accordance with the disclosure given in more detail herein.

Referring now in more detail to the drawings, a particular parabolic trajectory, 1, Fig. 1, is predetermined by the information put into the bombsight of plane 2, Fig. 1, by the computing operations of the bombsight. Such variables as plane velocity, altitude, cross winds, target velocity and aerodynamic characteristics of the particular bomb are all considered by the bombsight in its determination of parabolic trajectory 1. If the speed of the target is accelerated so as to position the target at 3 instead of 4, a definite miss results in the case of the standard bomb. However, with the homing device of this invention attached to the bomb in the form of a nosepiece, as shown, Fig. 2, the trajectory is so modified as to follow path 5, Fig. 1, and score a direct hit.

The attachable nosepiece of the invention is provided with a nose mounting assembly by means of which the nosepiece is readily affixed to a standard bomb. The nose mounting assembly comprises a spindle housing 201, Figs. 2A and 5, having a threaded end 202 which screws tightly into the front fuse hole of the bomb 10. Flange 203, forming a part of the spindle housing, has a stationary ring gear 210 affixed thereon. Thus gear 210 and housing 201 rotate, if at all, as a unit with the bomb body whenever the bomb rolls axially. Nose spindle shaft 220 is mounted on bearings 224 for free axial rotation within the spindle housing 201 wherein it is held against axial displacement by a spindle retaining cap.

Mounting ring 114 is affixed to flange 225 which is a part of spindle shaft 220. Mounting ring 114 is the main supporting structure for the mechanical and electrical units which are enclosed within forward hemispherical cover plate 20, Fig. 3, and rear cylindrical cover assembly 21, Figs. 2, 5; the latter is affixed to the rear of the mounting ring 114, turning as a unit therewith, and streamlines the space between the mounting ring and the bomb body.

This type of nose mounting assembly results in a nosepiece which is free to rotate or roll axially and independently of the bomb body. However, for a homing bomb of the type herein contemplated to effect accurate directional control from the nosepiece, the latter must maintain a fixed angular orientation about the bomb axis and is stabilized against roll about this axis.

The stabilization of the nosepiece against roll is effected by a gyroscope unit 250, 270 (see also Fig. 7), and a reaction drive gear 209 (see Fig. 6 also) powered by a motor 100 through a magnetic clutch system and gear train, Fig. 6, to rotate the nosepiece either clockwise or counterclockwise with respect to the bomb body. Switching means actuated by the gyroscope unit, Figs. 7, 7A, 7B, controls the operation of stabilization through appropriate electrical control circuits.

The gyroscope unit comprises the free gyroscope 250, which maintains its orientation in space and the rate gyroscope 270, which indicates the angular velocity of the nosepiece's axial roll. Both gyroscopes are mounted or oriented with the axes of rotation of their rotors parallel to the ground and perpendicular to the line of flight of the airplane. With such an oriented mounting, the gyroscopes do not tumble as the bomb drops in its trajectory and its axial position changes from its original horizontal position in the airplane to a practically vertical position at the target. The free gyroscope is mounted in a pair of gimbals, an outer gimbal 232 and an inner gimbal 233, and hence maintains its original orientation in space. The rate gyroscope is mounted in a single gimbal 273, and hence precesses if the nose rolls. However, the precission is effected against a spring action 266 and hence is limited to a few degrees either side of its original orientation. The free gyroscope is mounted in two gimbals 232, 233 and hence is free to move, retaining its original orientation upon roll of the bomb in space. It is locked or caged in its original fixed orientation by pin 234 which locks or cages the gimbals of the free gyroscope until the bomb is released.

The reaction motor drive assembly, Fig. 6, the train of gears driving gear 209, is the mechanical means for effecting the stabilization control of the nosepiece against roll. It is powered by electric motor 100 through a driving sprocket 200 which engages a clockwise rotating idler gear 204, which in turn engages a counterclockwise rotating idler gear 205. Each idler gear has associated therewith a magnetic clutch 218, 219 selectively energizable through appropriate electrical control circuits to transmit its corresponding clockwise or counterclockwise rotation to the reaction drive gear train 206 or 207 to 208 which terminates in a spur gear 209 riding on stationary gear 210. The clutches each have directly associated therewith a driving gear 206, 207. Each gear 206, 207 meshes with the same gear 208 of the reaction drive and transmits its particular type of rotation to stationary gear 210 only upon energization of its immediately associated magnetic clutch solenoid.

The electrical control circuits for energizing the electromagnetic clutches are completed by switching means 268, Fig. 7, comprising a split silver contact ring of two segments 267 and 269, each approximately 180° in arc, separated by a dead spot 265. (See Figs. 7A and 7B.) The contact ring 268 is mounted in the support 230 for the gyroscope unit and hence moves with the mounting ring 114 of the nose framework. In addition, an anticipatory rotation within clamping segment 263 is imparted to the contact ring 268 by a linkage including bell crank 271 which transfers any precession undergone by the rate gyroscope 270 directly to the contact ring 268. For small angular deviations of the nose, this linkage mechanism anticipates the completion of circuits and the energization of a magnetic clutch solenoid (i.e. 218 or 219, Fig. 6) to effect the return of the nose to its former or stabilized position. A contact blade 251 affixed to, but insulated from, the outer gimbal 232 by washer 252 of the free gyroscope 250 bears against the contact ring 268 to complete a circuit from live lead 253 to one or the other of the segments 267 or 269 which function as switching means and are connected to energize one or the other of the clutch solenoids through contact blades 262 or 264, unless, of course, the dead spot 265 of the contact ring oscillates across the free gyroscope's contact arm 251.

In operation, the free gyroscope and the rate gyroscope have internally wound electric rotors which are energized through live lead 253 and are started and brought up to full speed a short interval before the bomb is released from the bomb bay. The free gyroscope remains caged and both gyroscopes are supplied with power from the air plane batteries until the moment of release of the bomb, whereupon the free gyroscope is uncaged by release assembly 290 and the power supply is switched to the nosepiece batteries which operate the gyroscope rotors and reaction drive motor throughout the fall of the bomb. Upon release, the dead spot of the contact ring is centered on the free gyroscope's contact spring 251. If during the fall of the bomb a torque imparting a clockwise or counterclockwise rotation causes the nosepiece to shift or roll from its stabilized position, the contact blade of the switching means is shifted off the dead spot in the contact ring to make contact with a conducting segment whereby one of the clutch solenoids is energized so as to cause the reaction drive to rotate the nose in a direction opposite to that of the applied torque.

In more detail, the movement of the contact blade off the dead spot of the contact ring when the nosepiece rolls or has a torque applied thereto is due to the combined motion of precession of the rate gyroscope transmitted by the linkage to the contact ring together with the movement of this contact ring itself in its mounting in the nosepiece while the contact blade attached to the outer gimbal of the free gyroscope maintains its orientation in space. This shifting of the relative positions of the split silver contact ring 268 and the contact blade 251 causes one or the other of the clutch solenoids 218, 219, Fig. 6, to be energized, whereupon the reaction drive rotates the nosepiece in a direction opposite to that of the applied torque.

The primary control of the stabilizer is effected by the alternate opening and closing of the contact between the contact blade 251 mounted on the outer gimbal 232 of the free gyroscope 250 and one of the silver sectors 269 of the contact ring 268. Supplementing this primary control is the anticipatory control of the rate gyroscope 270, the precession of which shifts the contact ring 268 in a direction opposite to that of the applied torque through a linkage mechanism comprising a bell crank 271 fulcrumed on one of the studs 272 which carry the rate gyroscope gimbal 273 and provided with a forked end 274 on one arm for engaging the extension lug 280 of the contact ring 268, while the other arm is actuated by the precessing movement of the rate gyroscope.

In addition to the precessing motion, an oscillating motion is transmitted to the forked end of the bell crank linkage by the free end of the bell crank 271 which is spring tensioned 275 against a cam 276 rotating on one end of a shaft 277 supported by bearings in the rate gyroscope's gimbal 273. This shaft is rotated by a small pinion 278 affixed to the other end of the shaft and driven by engaging a spiral worm 279 on the end of the rate gyroscope rotor 270.

The rapid oscillations imparted by the cam action 276 to the contact ring 268 serve as a proportioning control eliminating excessive hunting or overswing of the nosepiece during stabilization. For departures greater than 2 or 3 degrees from the stabilized position of the nosepiece, a continuous restoring force is called for by the switching device. When the departure is reduced to within the range of proportioning control, as occurs when the contact blade is near the boundary of the dead spot and a silver segment, the gyroscope unit calls for rapidly pulsating torques the mean value of which is of the proper magnitude and direction to hold the unit at its stabilized position without hunting or overswing. During this period of proportioning control, the forked bell crank 271 oscillates the contact ring 268 through a small arc, the center of which is the position determined by the precession of the rate gyroscope. Alternatively, dynamically unbalancing rotor 270 and affixing bell crank 271 to oscillate with gimbal 273 also effects a proportional control.

Each roll stabilization clutch drive such as 219, Fig. 6, and more clearly shown in sectional view through the axis of the clutch, in Fig. 6A, has a driving disc 240 affixed by screws 239 to rotate together with driven gear 205 of the roll stabilization gear train. When electromagnetic clutch 219 is not energized, gear 205 and driving disc 240 revolve freely on axle 241. Energization of electromagnet 242 frictionally drives disc 243 by driving disc 240 causing electromagnetic armature 244 to impress a torque on gear 205 and since armature 244 is keyed to shaft 241, rotation is transmitted through the gear train to stationary ring gear 210 to effect stabilization of the nosepiece.

Figure 2A:
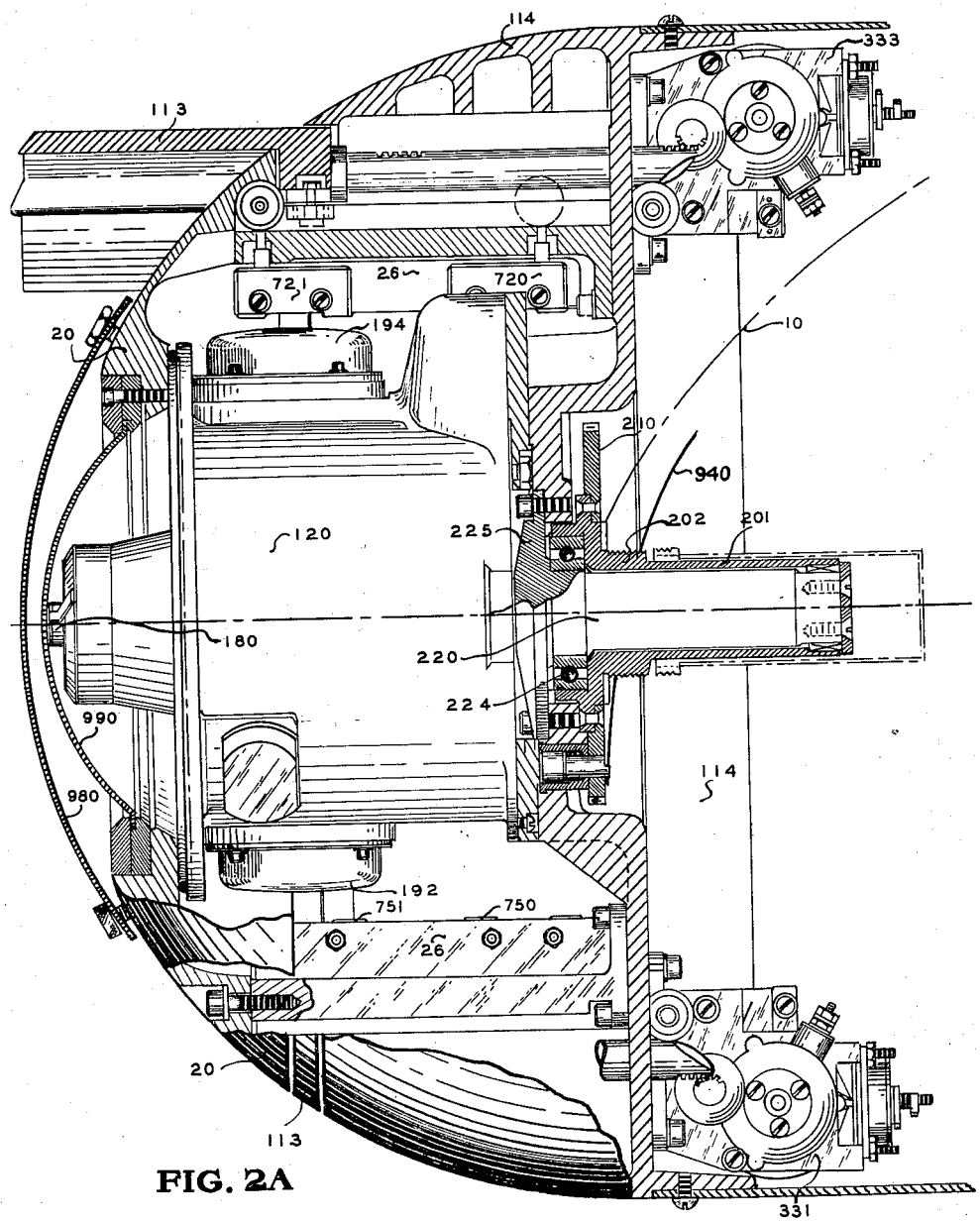
Fig. 2A is a vertical sectional view taken on the axis of Fig. 2.
Figure 2B:
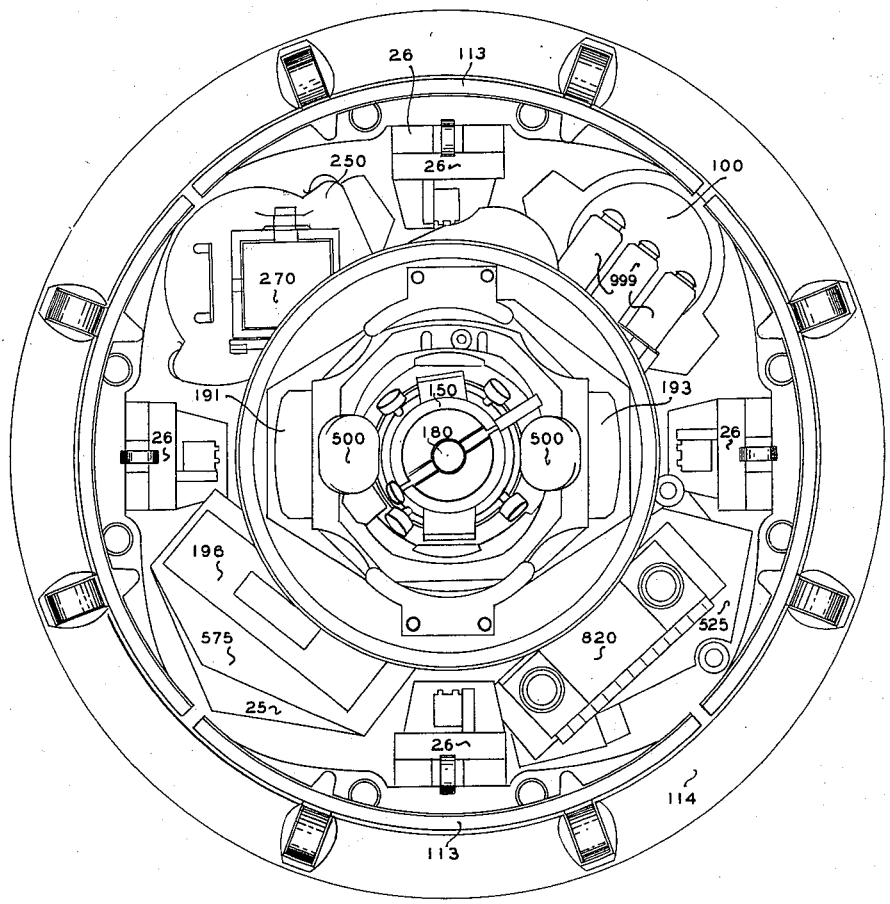
Fig. 2B is a front plan view with the cover plate removed.

The aerodynamic control of the homing bomb is effected by the guidance of the bomb from the nosepiece by means of axially extensible deflectors 113, Figs. 2, 4 and 8.

The mechanical means for effecting the operation of the deflectors 113 comprises a transmission assembly 311 powered by electric motor 100 and adapted by appropriate shafting to transmit rotational power to four deflector clutch drives in order to extend or retract the deflector 113.

The transmission assembly 311, Figs. 2, 5 and especially Fig. 8, comprises a deflector drive gear box including a gear train driven by reaction motor 100 through a groove-pin 301, Fig. 6, on the motor shaft 300 which engages a worm drive 302, Fig. 8. A worm drive 303, keyed to the worm shaft 304, transmits power through reduction gearing 305, 306, 307 to shafts 310 including universal joints 312, 313 and flexible cables 314, 315 to furnish continuous rotational power in one direction to the four deflector clutch drives 331, 332, 333 and 334.

Each deflector clutch drive such as 334, Fig. 8, has a gear train which is adapted to receive a continuous power input having one direction of rotation and to furnish power output in either of two directions to the deflector drive pinions. To effect the selection of clockwise or counterclockwise rotation for the deflector drive pinions, a pair of electromagnetically operated clutches 350, 360 is provided for each deflector clutch drive, i.e. 334, one clutch 350 for coupling clockwise rotation, the other 360, counterclockwise rotation, to the deflector drive pinions 390, 391 engaging the two racks 392, 393 of each deflector 113 to extend or retract the deflector. Each clutch 350, 360 (see Fig. 8A) has a driving disc 351 affixed to the armature 349 which is keyed to the clutch drive shaft 352 at 348 and capable upon energization of its solenoid of magnetically coupling power from the freely turning shaft 352 to a driven disc 353 which is free to rotate co-axially on the clutch drive shaft except when its corresponding solenoid is energized and couples it with the driving disc.

Each driven disc has a brake drum 340 and a driving gear 354 or 364 keyed thereto. One of these driving gears 354, Fig. 8B, transmits power directly to the deflector drive gear 355 which is keyed to a shaft 389 rotating the deflector drive pinion 390, 391; the other driving gear 364 (associated with clutch 360) transmits power indirectly through an intermediate idler gear 365 to the deflector drive gear 355 in order to obtain reverse rotation. Each brake drum 340, Fig. 8B, has its brake arms 341 which are spring tensioned by spring 342 and released by wedge shaped armature 343 actuated by electromagnet 344.

The eye assembly is the signal receiving or detecting unit of the nosepiece. It contains means responsive to the signal received from the target to maintain the eye axis pointing directly at the target irrespective of the deviation of the bomb body axis therefrom, and from the signal received it is capable of initiating the control of the deflectors in such a way as to effect a change in the trajectory of the bomb necessary to cause a direct hit.

The eye assembly is preferably a self-stabilized unit and is mounted in a gimbal housing 120, Figs. 3, 9, 9A, axially disposed in the nosepiece by being rigidly affixed with base plate 121 to the fore part of mounting ring 114. Self-stabilization is effected by a gyroscope rotor which is brought up to speed while caged and uncaged when it is most likely to have the axis of its rotor pointing at the center of the region where the target is most likely to be.

The mechanical parts of the eye comprise a gyroscope rotor 130, a caging assembly 140, a pair of gimbals for the free suspension of gyroscope rotor 130 and comprising a rotor housing 150 and a gimbal ring 151, the studs or spindles of the gyroscope suspension having torque motors 191, 192, 193 and 194 associated therewith to precess the rotor about either of its two gimbal axes 190, Fig. 9, a rotating mirror 160 to scan the field of view or region where the target is most likely to be, a commutator 170 to allocate the signal or signals received from the target to operate apparatus adapted to guide the bomb on-target and a thermosensitive unit or eye 180 for receiving signals from the target.

The gyroscope rotor 130 is brought up to speed while still caged by a gear train 131, 132, 133 and 134 powered by motor 100 when the bomb is released from the airplane. Gear 133 containing a centrifugally operated declutching mechanism is disengaged from the motor driven gear train when the rotor 130 reaches its limiting speed. The rotor 130 continues to spin under its own momentum for the duration of the bomb's flight. The caging assembly 140 holds the gyroscope rotor axis and hence the eye unit pointing approximately along the axis of the bomb or preferably several degrees off axis so as to be aimed at the center of the target area toward the region where the target is most likely to be found. After the lapse of a predetermined time interval, a timing device uncages the gyroscope by energizing magnet 141 which trips an armature, causing spring-tensioned caging arm assembly 140 to release gyroscope shaft 142. Uncaging the gyroscope results in a free gyroscope suspension which is self-stabilizing and can only be made to shift the direction in which its axis points by the application of a torque to the gimbal studs or gimbal bearing shafts 190 and thereby precess the gyroscope rotor about either of its two axes of suspension. The necessary torque is applied to the gimbals through gimbal studs or gimbal bearing shafts 190 by left-right rotor precessing torque motors 191 and 193 and up-down precessing torque motors 192 and 194. Since the rotor 130 precesses at a rate proportional to the torque applied to its gimbals by the torque motors, the eye gyroscope functions as a rate measuring gyroscope as well as a self-stabilizing gyroscope.

Mirror 160 is an eccentrically mounted concave mirror which focuses an image of the target on the thermally responsive elements in the thermosensitive unit 180. Since mirror 160 is eccentrically mounted and rotated by a gear train including gear 161 affixed to rotor 130 and reduction gearing 162, 163 and 164, the image of the target describes a circle on the thermosensitive unit 180, Figs. 9, 9A, 9D. The impulses produced are amplified, otherwise processed and allocated to various sections or channels of the apparatus by a commutator 170.

The commutator 170 is rotated synchronously at mirror speed by gear train 171 on the axle of rotor 130 and gear 172 and allocates the impulses originating in the corresponding thermosensitive elements of the thermosensitive unit 180 to their appropriate circuits in order to determine which way the eye-mirror-gyro axis should precess so as to actually point at or follow the target. The actual angular movement (precession) of the eye-mirror-gyro axis is accomplished by energizing the appropriate torque motor ring magnets 195 in accordance with the impulses received by the information circuits from the thermosensitive unit 180 and as allocated by commutator 170.

The apparatus herein disclosed utilizes the infrared radiations emanating from a target or object as a source of signals for the detection and location of the target and also for the determination of the "line of sight" of the target or object in the field of view. A definite optical or scanning system is therefore necessary in order to locate the object in the field of view. A rotating mirror 160, Fig. 9A, projecting the image of the target on a sensitive element provides the scanning system, Fig. 9D, which collects, concentrates and detects the infrared radiation from a source or target and makes possible the determination of the direction of the target or the "line of sight" of the target.

The rotating mirror scanning system comprises a concave mirror 160, the optical axis of which (or the axis of symmetry, if spherically concave) is parallel to, but offset from its axis of rotation, Fig. 9A, by a distance determined by the length of the thermosensitive legs of the thermistor. Since the four legs forming the thermosensitive elements of the thermistor are located in front of and facing the concave mirror, with the cross point of the legs on the axis of rotation, each element being perpendicular to this axis, each element will be swept over by the image in its circular scanning path once for each revolution of the scanning mirror when the eye unit (i.e. eye-mirror spin axis) is in its "on-target" position. This collection and concentration of radiation energy from the target by the mirror and its projection across a thermosensitive element heats the element and causes a change in resistance of the element as compared with its resistance in the absence of radiation and hence effects a change in the potential of the input to the succeeding circuits. This change in potential is then amplified to a level suitable for the operation of apparatus for maintaining the eye unit "on-target." The amplification and further processing of this signal are effected by the thermionic equipment shown in block diagram form in Fig. 10. When the target is in the field of view of the eye unit, a sharp "pip" or pulse signal is obtained when the image of the target is projected in the form of a circular image-path across the thermistor elements or legs by the rotating mirror which scans the field of view. It is these pulse signals which are subjected to some modification and thereafter operate the thermionic apparatus and subsequent control apparatus.

The signals originating in the thermistor 180 are impressed upon the input of the preamplifier 500. The preamplifier 500, Figs. 10 and 10A, is located on the eye unit assembly as closely as possible to the thermistor 180 (see Fig. 9A) in order to exclude the possibility of excessive induction currents being generated in the connecting wires. After this preliminary amplification, the signal pulses go to information circuit 525, Figs. 10 and 10B, for further amplification, phase inversion and rectification, as a result of which the output of circuit 525 consists of positive pulses. These pulses are applied to an automatic volume control (AVC) and are then allocated by commutator 170 to torque motor bridge circuit 575, Figs. 10 and 10C. (A separate and complete duplicate of the above preamplifier circuit 500, information circuit 525 and torque motor bridge circuit 575 and deflector circuit 600, Figs. 10 and 10D, is used for the left-right thermistor signals.)

The commutator 170 is located on the back of the eye unit, Figs. 9 and 9A, and is driven synchronously with the rotating off-center mirror by the rotor of the eye gyroscope. The commutator controls the allocation of the positive signal pulses to the input or control arms of the up-down torque motor bridge circuit 575 and the left-right unit which in turn functions as a switching device to control the polarity as well as the total voltage applied to the torque motors and the input of the deflector circuit 600. By controlling the polarity, the commutator determines the upward or downward orientation (precession) of the eye in accordance to the respective upward or downward position of the target with respect to the line of sight of the eye-mirror axis.

The commutator segments and brushes are oriented so as to ground out the input signals alternately from one or the other of the two channels 510 and 512. Thus, the commutator grounds out the input positive signal to channel 512 when the upper half of the circular image-path cuts the up-down legs of the thermosensitive element and grounds out the input positive pulse signal to channel 510 when the lower half of the circular image-path cuts the up-down legs of the thermosensitive element.

Thus, when the eye is on-target, alternate positive signal pulses are grounded out in channel 512 and in channel 510. The pulses passed through these channels, however, are smoothened out by peak reading circuits 580 and 582 in each channel to give steady D.C. potentials, each of which is fed into separate control arms of the torque motor bridge circuit 575 (shown in standard bridge circuit arrangement in Fig. 11). Under these conditions, the target being on the eye-mirror axis, equal R.M.S. positive potentials are applied to the grids of tubes V15 and V17 forming the control arms of the bridge circuit of Fig. 11; this results in a balanced bridge circuit and, therefore, there is no potential difference in, and no current flowing between leads 585 and 586. As a result the torque motors 192 and 194 connected to leads 585 and 586 are not energized and the eye-mirror axis remains fixed in its on-target position, being held in its stabilized position by the eye gyroscope.

When, however, the target is off center and for simplicity of description is in a position above the line of sight of the mirror-eye axis, then because of the inversion of the image by the concave scanning mirror, the circle of scan will be dropped with respect to its position when the object is directly on-target, and thus only the upper half of the circle of the image path will cut the up-down thermosensitive element. The commutator operating as described above therefor grounds out the positive pulse from channel 512 and since the lower half of the circle of the image path does not cut the up-down thermosensitive element (the lower half of the circle of the image path being below the bottom end of the up-down thermosensitive element) no signals go through to the torque motor bridge circuit on the lower half of the circle of the image path. As a result, tube V15, Fig. 11, has a positive voltage of, say, 40 volts applied to its grid while tube V17 has ground or zero voltage applied to its grid. The unbalance effected results in a greater flow of current through tube V15 and hence a greater drop across resistance R which causes the grid of tube V16 connected across R to go more negative, and hence cuts off the leg in which V16 is positioned. This leaves tube V18 as the only leg to conduct current and since the grid of V18 is not affected by any potential from V17 a current flows in the direction 585 through the torque motors 192, 194 to 586. As a result a continuous current is applied to the torque motors and of the correct polarity to precess the eye gyroscope upwards.

From the above, it may be seen that the torque motor bridge, Fig. 11, is actually an electronic switching circuit effecting the placement of a voltage of a predetermined polarity and amount on the terminals of the torque motors so as to effect a precession of the eye gyroscope in such a direction as to follow the motion of a moving target (i.e. to lock-on to the moving target).

In this manner the signals received from the target are passed on to the input of the torque motor bridge circuit 575 and then through an output circuit to energize the torque motors 192 and 194, Fig. 9, for down-up precession of the eye (left-right precession is effected by torque motors 191 and 193 by way of the left-right thermistor elements and associated signal channels). This enables the eye to lock-on to the moving target in any position of its field of view. These same torque motor bridge circuit output signals are also transmitted to the deflector circuit 600, Fig. 10, in order to effect the ultimate extension of an associated deflector and thus to vary the trajectory of the bomb, thereby causing the bomb to be guided toward the target and register a hit.

Referring now to the more detailed circuit shown in Fig. 10A, radiations from a target fall on the eccentrically mounted rotating concave mirror (160, Fig. 10) which projects the image of the target across the thermosensitive elements of the heat detecting unit 180 describing a circle on the unit. The detecting unit 180 comprises thermosensitive elements in the form of 4 legs 181, 182, 183 and 184, Fig. 10A, mounted in the same plane facing the mirror and perpendicular to each other and in line with the eye gyroscope gimbal axes. The diametrically opposite legs 181 and 183 are connected to each other at the center, idem 182 and 184. The outer terminals of the legs are at the same absolute electrical potential to ground, two adjacent legs, i.e. 181 and 182, being connected together and at a positive potential of +500 volts and the other two, i.e. 183 and 184, at a negative potential of —500 volts. Thus when no signal is received, the junction of each pair of legs is at a constant potential near zero.

The material comprising the legs 181, 182, etc., is such that when its temperature is increased as by being illuminated by a target image, its resistance is no longer equal to that of its opposite leg and hence the voltage at its center is no longer zero. The resultant current pulse at this center point is impressed across a resistance 501, Fig. 10A, in order to convert the current pulse to a potential or voltage drop for the input circuit of a resistance-capacitance coupled amplifier (preamplifier 500) comprising two tubes V1 and V2, Fig. 10A, in cascade connection. (Only one complete circuit, for the up-down channel, is shown.)

From the preamplifier 500, the output signal goes to the information circuit 525, Fig. 10, which comprises a post amplifier also resistance capacitance coupled and comprising two tubes V3 and V4, Fig. 10B, in cascade connection. The output of the last stage of amplification is sent to a phase inverter circuit V5 and V6, in which the phase reversal is accomplished by means of an extra tube V6, the grid voltage of which is obtained from the plate load resistance of the first tube V5, the voltage therefore being opposite in phase to that impressed upon the grid of the first tube. The output of these tubes V5 and V6 is each separately amplified in tubes V7 and V8, respectively. In this manner each signal, whether a positive or a negative pulse, is passed on as the original signal and its mirror image. With such a circuit, the eye will respond to both hot and cold targets.

The signal is then sent to the signal rectifier circuit V9 and V10, where a resistance-capacitance coupled rectifier tube cancels out the negative signal pulses coming from each division (original pulse and mirror image or inverted pulse), thus leaving positive pulses alone to be transmitted to the torque motor bridge circuit 575, Figs. 10C, 11.

These same positive pulses also go to the automatic volume control circuit, including tubes V11 and V12, Fig. 10B, the direct voltage output of which controls the voltage of one or more grids of the post amplifier tubes V3 and V4 in such a manner as to either increase or decrease the volume of all signals proportionately so that there is no loss of signals or distortion because of their extreme weakness or excessive strength, respectively.

The circuits described above are energized by appropriate loads coming from a power supply including a dynamotor 25, Fig. 10F, provided with a thermionic voltage regulator and adapted for supplying, through appropriate relays, the + or —500 volts necessary to charge condensers 505, 506, Fig. 10A, for operating the thermistor 180. (See Fig. 10F showing a conventional voltage regulator circuit.) The timer switch 800, Fig. 5, disconnects condensers 505, 506 from the circuit and connects them in parallel to be charged by dynamotor 25 for a period of a second or so and then connects the condensers in series to the thermistor, as shown in Fig. 10A.

The positive signal pulses from the output of the information circuit are allocated by the commutator 170, Fig. 10C and Fig. 11, and are impressed upon the torque motor bridge circuit 575 after passing through a peak reading circuit 580 and 582, each comprising a tube, such as V13 and V14, which transforms the series of direct current pulses into a continuous direct current voltage (see graphical representation below corresponding tubes, Figs. 10C and 11) which is then fed to the appropriate grids of tubes V15 and V17 in the control arms of torque motor bridge circuit 575 in order to pass the necessary current and necessary polarity to energize the torque motors 192 and 194. This selective energization of the appropriate torque motors with a current having the necessary polarity and voltage to effect the precession of the eye gyroscope for maintaining the eye locked on the target irrespective of the pitch and yaw of the bomb body is one object of the electronic circuit. In addition, the output differential and polarity from the torque motor bridge circuit is also used to energize the deflector circuits 600, Figs. 10 and 10D, in order to extend the appropriate deflectors for changing the trajectory of the bomb so as to register a hit on target.

The small graphical diagrams directly below each of the thermionic tubes schematically shown in Figs. 10A, 10B, 10C, etc., show the variations and modifications undergone by the signal during the various amplification, phase inversion, rectification and peak reading steps, starting from the original "pip" or signal pulse generated in the particular thermistor legs. The peak reading circuits of Figs. 10C and 11 result in a transformation of the signal pulse into a practically steady current as shown by the dotted line extending between peaks immediately below tubes V13 and V14, Fig. 10C, and 580, 582, Fig. 11.

The output from the torque motor bridge, Fig. 10C, is connected to the input of the deflector circuit, Fig. 10D, by terminals 585 and 586. The deflector circuit is fundamentally a bridge circuit, the input of which is controlled by tubes V81 and V82, Fig. 10D, and operates polarized relay 610 across its arm. A clearer conception of the operation of the deflector circuit is obtained by a study of Fig. 12. There it is shown that the deflector circuit is a mixer and differential amplifier in each of two channels (the down-up channel and the left-right channel, only the former of which is shown) with a voltage regulator tube V87, Fig. 10D, common to both channels. In each channel the differential voltage coming from the torque motor bridge circuit through 586 and 585 to A1 and A2, respectively, is combined with the voltage to ground coming from the potentiometers 681 and 682 operated by the extension of the deflectors.

In addition, a voltage derived in the RC unit used for gravity compensation is also combined therewith and the net voltage is applied to the grids of tubes V81 and V82 in the up-down deflector circuit and used to drive micropositioner relay 610 which in turn energizes circuits to operate the control surfaces (up deflector, down deflector) for the aerodynamic guidance of the bomb.

The incoming voltage differential coming from the torque motor bridge circuit has a mean value which may vary from 160 to 295 volts D.C. and a differential voltage which may be as high as 225 volts, D.C. Any excessive voltage pulses are smoothed out by transmission through a circuit having a short time constant before being led to the grids of tubes V81 and V82

The voltage from the potentiometers 681 and 682 can be varied between 60 and 210 volts by the deflectors in each channel. This voltage flows through a pad circuit to be combined on one side with the voltage coming from A2, one of the input connections to the grid of tube V82, and supplying a voltage coming from the torque motor bridge channel. The pad, which introduces an attenuation factor of 2, is inserted in this potentiometer voltage line to provide for such overcompensation by the control surfaces as may be necessary in accordance with the trajectory theory described below in order to correct any errors made in the computing circuits of the bomb. The voltage coming from the potentiometer also operates an RC integrating circuit having an output to the grid of tube V83 and then through the cathode of cathode followers V83 is combined with the voltage coming from A1, the other input connection from the torque motor bridge channel.

The integrating circuit is a resistance capacitor (RC) circuit having a long time constant of approximately 23.4 seconds feeding into a cathode follower tube V83. Such a circuit is found in each channel and is composed of a 2-microfarad capacitor charging and discharging through a 12-megohm resistor. In the up-down channel a bias of approximately 90 volts is introduced into the integrating circuit to take care of the angular position (assumed to be about 21° from the vertical) of the bomb at the moment this circuit begins to operate. In the left-right channel the bias is approximately 135 volts. In each case it is about 5 volts higher when carried by the cathode of the cathode follower tube to the input tube of the deflector bridge circuit.

The tubes V81 and V82 form the arms of a bridge circuit and the output of these tubes operate a differential relay (micropositioner 610) which closes a circuit which in turn operates a relay 710 or 740, Fig. 10E, which causes a deflector to move until the torque motor differential voltage is balanced by the potentiometer voltage.

Figure 2C:
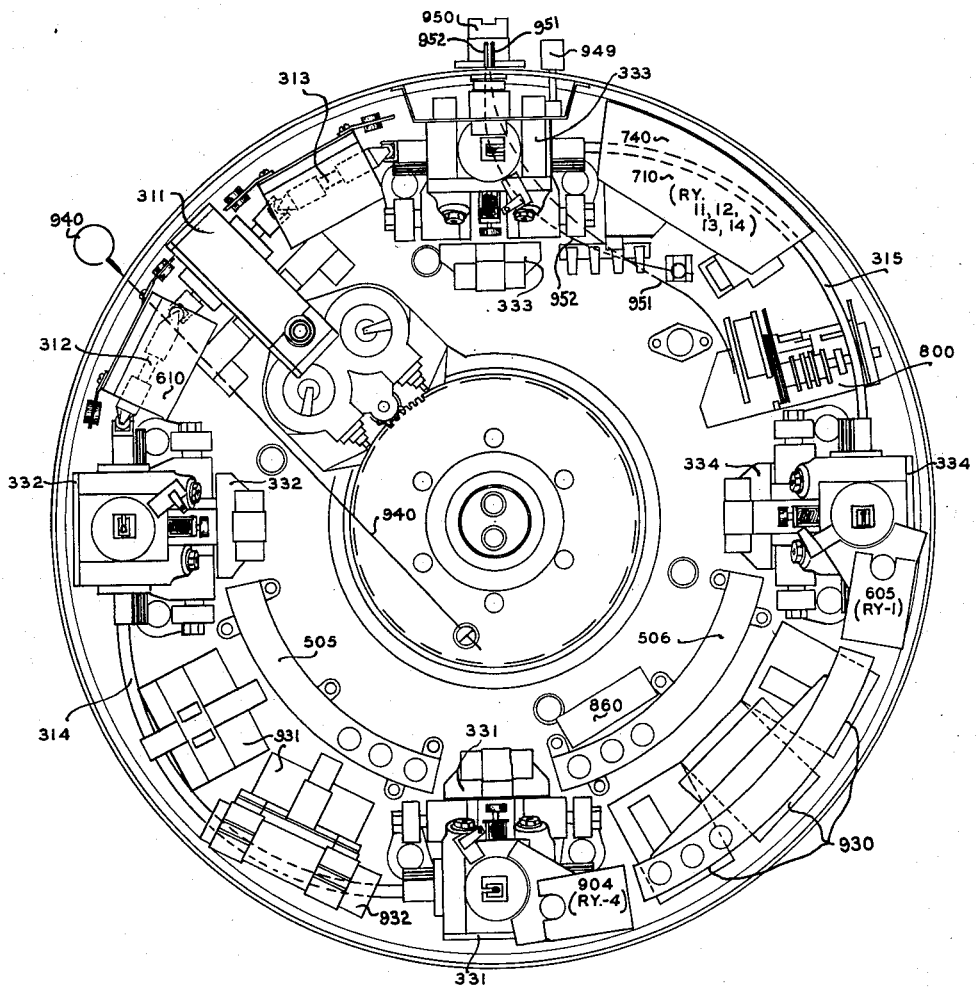
Fig. 2C is a rear plan view of the nosepiece removed from a bomb nose.

The voltage supplies to the various portions of the circuit are obtained from appropriate terminals of the dynamotor and in addition a voltage regulator tube V87 is used to maintain a more uniform voltage source. The cathodes of all the tubes are heated by 24 volts coming from the nose batteries after being heated by the bombing plane batteries prior to the bomb's release. The sequence of operations as fixed by the timer 800, Fig. 2C, are approximately:

The unit starts to function after $x$ seconds where $x$ may be from 0 to approximately 22.5 seconds; the 400 volt supply starts at $x+1.5$ seconds; the torque motor differential voltage may start at $x+3$ seconds; and the deflector potential different from 135 volts may start as soon as $x+4$ seconds.

The operation of the deflector circuit and associated relays is best understood by a simple qualitative description of the up-down deflectors after which a more complete theoretical discussion with quantitatively developed examples may be more readily understood.

Thus, assuming both up and down deflectors are retracted, then if a higher positive potential is applied by the torque motor bridge circuit to the grid of tube V82 by way of line 585 than that applied to the grid of tube V81 by the way of line 586, an unbalanced condition results in the deflector bridge circuit and a current flows through the coils of the micropositioner relay switch 610 of the up-down channel in such a direction as to cause the relay 610 to complete a circuit energizing the appropriate relay 710, Fig. 10E, to energize electromagnetic clutch magnet 711 for the extension of the up deflector; the extension of the up deflector simultaneously changes (lowers) the potential on the up potentiometer 682, Fig. 10D, thereby balancing or equalizing the potentials on the grids of tubes V81 and V82.

The balancing potential is applied practically immediately to the grid of tube V82 whereas the application of the resultant potential to the grid of tube V81 is effected over an extended time interval dependent upon the circuit characteristics of the RC circuit associated therewith and described in detail below, and hence it is applied as a slow reinforcement of the potential on the grid of tube V81.

It is to be noted that if the upper deflector, however, is already extended and a down deflection is called for, the up deflector is first immediately retracted and then the inner limit switch on the deflector guide runway of the up deflector conditions a circuit through the lower contact on inner limit switch 720 and outer limit switch 751 for the energization of extensor electromagnet 741 of the down deflector electromagnetic clutch. The lower or down deflector then extends until the potentiometer 681, Fig. 10D, associated therewith causes the proper bucking or matching potential (i.e. above 135 volts), such as 150, 160 or more volts, to be applied to the grid of tube V82 until the grids of tubes V81 and V82 are again at the same potential, whereupon the deflector bridge circuit is again balanced and relay 610 is de-energized, and thus the circuits calling for deflector extension are de-energized since the armature of relay 610 opens the corresponding circuits.

In accordance with the above description of the operation of the deflector circuit, any deflector if once extended remains in its extended position until extension of the opposite deflector is called for by a change in polarity of the input to the micropositioner switch (e.g. 610) of the appropriate deflector bridge circuit. Thus, the movement of the eye-mirror-gyro unit in a direction opposite to that in which it has theretofore been processed, in order to cause the eye unit to follow or lock-on to a moving target, is accompanied, first, by the retraction of any extended deflector capable of effecting acceleration in a direction opposite to that called for (i.e. if the extension of a down deflector is called for and an up deflector is already extended as the result of a previously received signal, the up deflector is retracted first and the complete retraction of the up deflector conditions a circuit through the inner limit switch of the up deflector for effecting the extension of the lower deflector), and thereafter the extension of the deflector called for is effected.

The RC circuit included in the grid circuit of tube V83 serves as the gravity compensation element, the tube V83 functioning as a cathode follower tube and effecting the placement of such potentials on the grid of tube V81 as may be necessary to provide for the required corrections, thus automatically subtracting the acceleration of gravity from the total desired acceleration. Thus, gravity compensation is obtained by a quasiintegration of deflector position.

Tube V83 effects this transfer of the necessary gravity compensation from the RC circuit without introducing any changes in the status of the RC circuit itself. It couples the necessary voltage to the grid of tube V81 and renders the gravity compensation more exact than otherwise possible, because it depends on the actual behavior of the deflectors and is automatically inserted into the circuit throughout the period during which the missile is in the air.

With reference to the actual working of the deflectors and the various relays and limit switches it is to be noted that in more detail, as the up deflector extends, under the above conditions, the potentiometer circuit 682 operatively associated with the extending up deflector causes a lower and lower potential to be applied to the point 680, and hence to the grid of tube V82. When the potential on the grid of tube V82 is reduced approximately to that applied to the grid of tube V81, then the bridge circuit across which the relay coils of relay 610 are connected is balanced and relay 610 has no potential difference applied across its terminals. This breaks the circuit energizing the up deflector extension clutch relay 710 (Fig. 10E) and since the brake release magnet 712 (Fig. 10E) associated therewith is simultaneously de-energized, the spring actuated brakes hold the up deflector locked in its extended position.

If the missile now proceeds to overshoot the target, thereby causing the line of sight of the eye unit to point above the target (since the inversion of the concave mirror causes the circular image path to move up and thus only the lower half of the image circle cuts the up-down thermistor elements, signal pulses received in the electronic circuits effect an unbalance in the torque motor bridge), a down deflection will be called for because the eye in locking onto the target and following the target in order to maintain the line of sight of the eye unit on-target must be precessed to a new position where it is pointing below its former lock-on position and farther below the axis of the missile (i.e. tangent to the trajectory).

Thus, the off-axis signal pulses effect such an unbalance of the torque motor bridge circuit as to cause the torque motors to precess the eye-mirror-gyroscope axis downward. Briefly, this is effected by the unequal signal pulses received which unbalance the torque motor bridge so that a current of the required polarity and strength is transmitted to the torque motors which precess the eye unit in the appropriate downward direction. Simultaneously this same current is impressed upon the deflector circuit 600 so as to likewise unbalance the deflector bridge circuit and cause the micropositioner switch 610 to close a circuit to energize the following sequentially operated circuits:

First, through a circuit completed by the release of the inner limit switch 720, Fig. 10E, of the up deflector (released upon the extension of the upper deflector) to energize the electromagnetic clutch 713 for retracting the upper deflector; then, the full retraction of the upper deflector operates this same inner limit switch 720 to open the circuit above completed and simultaneously to close a circuit to energize the electromagnetic clutch 741 for extending the lower deflector (down deflector).

As the down deflector is extended more and more, the movable arm 683, Fig. 10D, of the potentiometer 681 affixed to the down deflector and operated thereby applies higher and higher potentials (starting from 135 volts) to the point 680 through a resistance, and consequently to the grid of tube V82. When the potential applied to the grid of tube V82 equals that applied to the grid of tube V81 which latter voltage consists of the combined potential applied to A1 from the torque motor bridge circuit and tube V83, the deflector bridge circuit is again balanced and relay 610 is de-energized. This de-energizes the down deflector relay 740 and its associated extensor electromagnetic clutch 741 and simultaneously releases the electromagnetically released spring brake, thus holding the down deflector in its outwardly extended position.

A circuit almost exactly like that shown in Fig. 10D is provided for the left-right deflector operation except that the tube corresponding to tube V83 of Fig. 10D has 135 volts applied to its grid which is connected through a condenser to point 631, Fig. 10D (instead of to point 630 which applies approximately 92 volts to the grid of tube V83). Thus when on-target in the left-right direction (i.e. the left-right deflectors being both retracted), the 135 volts supplied by the potentiometer to V84 and V85 (correspond to V81 and V82, respectively) result in potentials on V84 and V85 which match each other exactly. When one or the other of the left-right deflectors are extended and a left or right acceleration results, then gravity compensation is automatically introduced into the desired circuit in accordance with the excess or deficiency of voltage applied by the potentiometer corresponding to V83 but in the left-right channel, which up until then still maintained its grid at approximately 135 volts, i.e. deflector extension results in 145, 155, etc., or 125, 115 volts, according whether the left or right deflector, respectively, is extended.

Briefly, if the torque motors are energized in response to a signal received to effect an upward precession of the eye unit in order to keep the eye-mirror-gyro locked on-target then simultaneously an excess of potential over and above that applied to the grid of tube V81 is applied to the grid of tube V82 via the torque motor bridge circuit. This indicates that the target is beyond or above the actual trajectory of the missile and that therefore an up deflection must be effected to secure a hit on the target.

Conversely, if the torque motors are energized in response to a signal received to effect a downward precession (in excess of that for which it has been previously biased upwardly, i.e. 90 vs. 135 volts) of the eye unit in order to keep the eye-mirror-gyro unit locked on-target, then an excess of potential is applied to the grid of tube V81 over that applied to the grid of tube V82 via the torque motor bridge circuit. (In both cases the excess of potential is matched by the extension of the appropriate deflector, i.e. in the latter case the down deflector potentiometer 681 cuts in more and more potential until the resultant potential on the grids of tube V81 is equal to the resultant potential on the grid of tube V82.)

The eye comprises an optical system including a gyroscopically stabilized rotating spherical mirror eccentrically mounted and geared to rotate at a reduced speed coaxially with the gyroscope rotor which is mounted in a pair of gimbals. The mirror scans the field of view and projects an image of the scanned area on a sensitive detecting element lying in the focal plane of the mirror and also on the gyro-mirror axis. If a ship or similar target which is in thermal contrast with its background lies in the field of view of the eye, the function of this unit is (1) to detect the presence of the target, (2) to move the detecting unit in such a way as to center the circular image-path of the target on the detecting unit and (3) to keep the axis of the mirror-gyro detecting unit pointing in the direction of the target independently of the movement of the bomb body.

As a preliminary step, the axis of the mirror-gyroscope unit, on which the sensitive element is also mounted, is caged to point approximately at the target. When uncaged, the above steps are effected in the order given and thereafter the position in space of the mirror-gyro axis is controlled by pairs of torque motors operating at the gimbal axes. As a result, the mirror-gyro axis is caused to point continuously at the target independently of the bomb body itself by the energization of the torque motors which effects a precession of the gyroscope.

This type of control is called the lock-on operation. It is effected essentially as follows: A heat target in the field of view is projected upon and produces resistance changes in the detecting elements; these changes are amplified by a high gain voltage amplifier and the pulses are fed into four commutated channels so that the quadrant position of the target in the field of view is determined; as a result of the quadrant indicating signals, off-axis targets yield signals which cause voltage to be applied to or to operate the torque motors. As a result the mirror-gyro eye axis is precessed so as to always maintain the optical axis centered on or pointing at the target.

The lock-on operation enables the mirror-gyro unit to maintain the line of sight or mirror-gyro axis constantly pointing at the target. The rate of change of the angle subtended by this sweeping line of sight (the precessional velocity of the gyro system) is a function of the current through the torque motors and, moreover, as shown below in the theoretical discussion this current drain is a direct measure of the lateral forces which should be applied to the bomb in order to maintain a collision course terminating on the target. Thus, it is possible to measure and evaluate the angular rate of change in space of the line of sight from the bomb to the target; i.e. the value of the torque motor current drain is therefore used to determine the aerodynamic forces to be applied to the bomb.

Briefly, the precessional torque applied to the eye gyroscope is proportional to the angular rate of change in space of the line of sight from the bomb to the target. This angular rate, in turn, is approximately proportional to the total acceleration which must be continuously applied to the bomb, normal to its trajectory in order that the bomb hit the target. From the total acceleration normal to the trajectory, the component of gravity normal to the trajectory is subtracted, the difference being the aerodynamic force to be effected.

This method of computing the accelerating force to be applied to the missile takes into account the bomb sight error, target motion, winds and gravity. From the time the guiding device becomes operative, the minimum aerodynamic force required to score a hit is continuously recalculated.

The guiding forces are applied to the bomb in flight by extending one or more of the quadrant nose deflectors. By applying more than the minimum force necessary, the bomb is reaimed onto a trajectory of smaller curvature and the required minimum acceleration decreases as the bomb approaches the target. In this manner, the high accelerations necessary at the end of trajectories which do not take account of wind, target motion and gravity are avoided. Furthermore, it is possible with this type of control to obtain sufficient aerodynamic force without resorting to excessively large aerodynamic control surfaces.

From the above discussion it is clear that the ultimate function of the scanning system and its associated computing circuits is (1) to keep the eye locked on the target and (2) to observe the effort required to maintain this lock-on operation. The second function measures the rate of change of the line of sight in space from the bomb to the target (actually the rate of precession of the mirror-gyro axis) and is therefore a measure of the amount of control necessary to obtain or to retain a collision course. Since the rate of precession of the gyroscope axis is readily measured by the torque motor current, this latter current drain is used to control the deflector mechanism.

In the measurements and calculations made, the angular velocity of the target is observed from a nonrotating coordinate system whose origin moves with the bomb. This measurement is made possible by the stabilization of the nose against roll in accordance with the disclosure of apparatus utilizing the stationary gear 210 affixed to the nose of the bomb to serve as a mechanical device for preventing nose roll when the bomb body rolls.

The heat-homing bomb described above has been designed for operation in accordance with a trajectory theory which will now be explained. The bomb contains elements of construction which are founded upon certain fundamental principles of gyroscopic action, circuit theory and equations of aerodynamic control.

Fundamentally, the rate of change of the angle (i.e. the derivative) swept out by the eye unit in maintaining its lock-on orientation with respect to the target is interpreted by appropriate circuits to operate the aerodynamic deflectors in order to secure a hit even though the trajectory of the missile may at that moment be on a path which terminates off-target as a miss. Moreover, additional means are provided whereby the effect of gravity is automatically computed and the required aerodynamic control includes a value compensated for the effects of gravity.

Gravity compensation may be secured in a number of different ways. Thus it may be obtained by integrating the angular rate of the target as measured by the derivative (i.e. rate of change) of the angle swept out by the line of sight from the eye unit to the target (this is preferably called the rate of precession of the eye with respect to time), or it may be obtained by a quasi-integration of deflector position. The integration of this gravity component may be effected by mechanical motion, heat, or by the charging or discharging (growth or decay of charge) of a condenser circuit. The difficulties of mechanical motion and the physical difficulty of obtaining a quantity of heat proportional to a definite voltage as well as the practical impossibility of setting a zero level therefor leave as the simplest solution the use of a condenser circuit. Such a circuit comprises a condenser charged or discharged through a resistance and hence is called an RC circuit. The RC circuit may be used either to integrate the rate of precession of the eye with respect to time or to integrate deflector extension with respect to time.

By using a quasi-integration of the deflector position to secure gravity compensation in the bomb it is possible to have a much simpler and more reliable design of the control circuits, permitting use of a much shorter time constant in the RC circuit (approximately 24 seconds) and furthermore has the advantage that a delayed lock-on does not introduce any permanent error in the gravity compensation. Integration of deflector extension, however, requires a potentiometer in order to utilize a voltage to indicate deflector position. Such a potentiometer makes available a voltage which is proportional to deflector position and, taking the mid-point (135 volts) as a zero position, may be considered as giving a positive voltage for the extension of one deflector (down or left deflector potentiometer reading from 135 volts to 210 volts with the upper end of the potentiometer at 270 volts), and a negative voltage for the extension of the opposite deflector (up or right deflector potentiometer reading from 135 volts to 60 volts with the lower end of the potentiometer at ground or 0 voltage). This type of gravity compensation, comprising a proportional control of the deflectors, is more exact and any error caused by delayed lock-on is not introduced into the circuits since it depends on the actual behavior of the deflectors and not on the behavior they would have if they followed the angular rate exactly.

The computing nosepiece of the bomb contains a gyroscopically stabilized eye unit which is controlled (precessed) by torque motors linearly responsive to input voltage (torque applied to precess the eye unit is linearly proportional to the voltage applied) so that the eye always points directly or approximately at the target. This is called the "lock-on" of the eye unit.

The only information which is actually used in the computation of the trajectory is the two angular velocities (one in what will be shown to be the $x$ direction, the other, the $y$ direction) of the straight line drawn from the bomb to the target. These angular velocities are the angular velocities of the target as observed from a nonrotating coordinate system whose origin moves with the bomb.

In Part I it will be shown how the knowledge of these two angular velocities is sufficient to direct the bomb so that it approaches the target along a path which requires the minimum use of forces perpendicular to the trajectory of the bomb.

In Part II it will be shown that if the bomb is under-controlled (that is to say, if the lateral accelerations are less by a constant factor than those specified by the theory of Part I), then the bomb will always miss a point target. On the other hand, it will be shown that if the bomb is over-controlled, the bomb is able to hit point targets.

In Part III it will be shown how the effect of gravity is computed and how the control is compensated for the effects of gravity.

*Part I.—Fundamental theory*

The development in this part consists of two separate channels which merge only toward the end of the section. In the first channel, expressions will be derived for the accelerations perpendicular to the trajectory (lateral accelerations) which must be experienced by the bomb if it is to approach the target along a path such that the lateral accelerations are constant. In the second channel, expressions will be derived for the two angular velocities of the target as seen from the gyro-stabilized element located in the computing head. Comparison of the end results of the two channels then shows that the required accelerations are just constant multiples of the angular velocities, the multiplying constant being twice the speed of the bomb.

Let P, Fig. 16, be a fixed point which lies along the actual trajectory of the bomb, and let $x$, $y$, $z$ be a fixed coordinate system with its origin at P. The $z$ axis points downward along the tangent to the trajectory at the point P, and the $x$ and $y$ axes are perpendicular to $z$ and to each other. Furthermore, let X, Y, Z be a moving but non-rotating coordinate system with its origin at the moving bomb. The X, Y, Z axes are parallel to, and have the same positive directions as, the fixed $x$, $y$, $z$ system.

Thus there are two nonrotating and parallel coordinate systems, one with its origin anchored in the moving bomb, and the other fixed in space at a point which is along the trajectory of the bomb.

Let the subscript $t$ denote that the coordinates are those of the target, which is indicated by Q in Figure 16. Thus $x_t$, $y_t$ and $z_t$ are the coordinates of the target, and $\dot{x}_t$, $\dot{y}_t$ and $\dot{z}_t$ are the velocity components of the target in the $x$, $y$ and $z$ directions.

Let T denote the time required for the bomb to reach the target from the point P. Then the point which the bomb should strike to produce a hit has the coordinates $$x_t + T\dot{x}_t$$
$$y_t + T\dot{y}_t$$
$$z_t + T\dot{z}_t \quad (1)$$

on the basis of the assumption that the velocity components of the target are constant.

In order that the trajectory of the bomb intersect the point just specified, it is necessary to deflect the bomb from its natural path, which is a straight line if the lateral forces on the bomb, including the force of gravity, are zero. The desired deflection will be accomplished with a minimum value for the maximum force required, if the forces applied are constant in time. If the total lateral force is constant, the force should produce the following constant accelerations $$\ddot{x} = \frac{(x_t + T\dot{x}_t)}{\frac{1}{2}T^2}$$

$$\ddot{y} = \frac{(y_t + T\dot{y}_t)}{\frac{1}{2}T^2} \quad (2)$$

since a constant acceleration is equal to the distance divided by half the square of the time when the initial velocity is zero. These accelerations are the total accelerations experienced by the bomb, including the lateral components of the acceleration of gravity.

Let $v$ be the average speed of the bomb's fall between the point P and the end of the fall. Then the time T is given approximately by $$T = \frac{z_t}{v} \quad (3)$$

whence the required accelerations may be written $$\ddot{x} = 2v \frac{z_t \dot{x}_t + v x_t}{z_t^2}$$

$$\ddot{y} = 2v \frac{z_t \dot{y}_t + v y_t}{z_t^2} \quad (4)$$

This is the end of the first channel of investigation. Expressions for the angular velocities of the target as observed by the head will now be derived.

Let $F_x$ be the angle between the YZ plane and a line drawn from the bomb to the target; similarly, let $F_y$ be the angle between the XZ plane and the direction of the target as observed from the bomb. When these angles are both small, as they will be in practice, they may be written $$F_x = \frac{X_t}{Z_t}$$

$$F_y = \frac{Y_t}{Z_t} \quad (5)$$

The time derivatives of these angles are obtained simply by differentiating (5) with respect to time:

$$\dot{F}_x = \frac{Z_t \dot{X}_t - \dot{Z}_t X_t}{Z_t^2}$$

$$\dot{F}_y = \frac{Z_t \dot{Y}_t - \dot{Z}_t Y_t}{Z_t^2} \quad (6)$$

In order to express these results in terms of the $x$, $y$, $z$ coordinates, it is necessary to observe that when the bomb is at the point P, the two coordinate systems are superposed, and that the $x$ and $y$ components of the target's velocity are equal to the X and Y components of the target's velocity. The relation between the $z$ and Z components of the target's velocity is $$\dot{Z}_t = \dot{z}_t - v \quad (7)$$

whence the expressions for the angular velocities may be written $$\dot{F}_x = \frac{z_t \dot{x}_t + v x_t - \dot{z}_t x_t}{z_t^2}$$

$$\dot{F}_y = \frac{z_t \dot{y}_t + v y_t - \dot{z}_t y_t}{z_t^2} \quad (8)$$

In these expressions, the first term in the numerator is the product of a large distance and a small velocity, the second term is the product of a large velocity and a small distance, whereas the third term is the product of a small velocity and a small distance. Accordingly, the third terms are of second order and may be omitted in the present approximate treatment. The final expressions for the angular velocities are $$\dot{F}_x = \frac{z_t \dot{x}_t + v x_t}{z_t^2}$$

$$\dot{F}_y = \frac{z_t \dot{y}_t + v y_t}{z_t^2} \quad (9)$$

This is the end of the second channel of investigation. By comparison of Equations 4 and 9, it now follows directly that the constant lateral accelerations are given by $$\ddot{x} = 2v \dot{F}_x$$
$$\ddot{y} = 2v \dot{F}_y \quad (10)$$

Thus the required accelerations depend only on the angular velocities of the target as seen by the bomb.

These angular velocities are obtained by measuring the current which must be supplied to the gyro torque motors in order to keep the gyroscope axis pointing at the target.

The path of a bomb subject to a constant lateral force is an arc of a circle, provided that the speed of the bomb is constant. The path of a freely falling bomb, however, is parabolic rather than circular. In the natural fall, the lateral acceleration decreases during the fall, whereas in the controlled fall, the lateral acceleration is constant during the controlled part of the fall. Thus in a case in which the bomb would hit the target without any intervention by the controls, the effect of the controls is to distort the parabolic path into a circular path which has the same end points. The lateral acceleration during the first part of the controlled fall will be less than the lateral component of gravity. Therefore, that part of the total lateral acceleration which is not due to gravity (the part of the total lateral acceleration which must be obtained by use of the control surfaces of the bomb and which will, therefore, be called the aerodynamic acceleration) will be of one sign during the first part of the controlled fall, will decrease to zero, and will then have the opposite sign during the remainder of the fall. In any event, however, the circular path will differ only slightly from the parabolic one, so that the aerodynamic acceleration will be a very small fraction of $g$ in the case here discussed.

*Part II.—Effect of under-acceleration and over-acceleration*

In Part I it was shown that the accelerations which should be experienced by the bomb, if the path is to be one of constant acceleration, could be expressed as constant multiples of the angular velocities of the target, the multiplying constant being twice the average velocity $v$ of the bomb.

In this section, the consequences of a multiplying constant which differs from $2v$ will be examined. Let the multiplying constant $2v$ in Equation 10 be replaced by $2nv$, where $n$ is a positive constant which may be greater or less than unity.

In the case discussed in Part I, in which the lateral accelerations were constant during the fall of the bomb from the point P to the surface of the earth, it was not necessary to set up a differential equation for the path of the bomb because its behavior was determined directly from the rule that the lateral displacement of the bomb was equal to half the acceleration times the square of the time. In the present part, however, we are concerned with a bomb which at each point on its trajectory determines the constant acceleration required to make its trajectory intersect the target, but then, instead of moving its control surfaces so that this acceleration is obtained, rather chooses to move the control surfaces so that $n$ times this acceleration is obtained.

In order to study the trajectory of the bomb under these circumstances, it is necessary to set up the differential equations for the path of the bomb. The equations written in this part will be those for the $x$ component of the motion; the equations for the $y$ component are identical in form.

In references to Figure 17, let P be the origin of the fixed $x$, $y$, $z$ coordinate system, let R be the position of the bomb at $t$ seconds after the bomb passes through P, and let Q be the position the target will occupy at the moment the bomb strikes the surface of the earth or sea. As in Part I, let T be the time required for the bomb to fall from P to Q.

Consider the bomb at the point R; if it suffered no acceleration after passing through R, it would strike the earth at the point whose $x$ coordinate is $x+\dot{x}(T-t)$, where $t$ is the time required for the bomb to fall from P to the moving point R. Then, by the same argument used to establish Equation 2, the constant acceleration which is required if the bomb is to strike the target at Q is $$\ddot{x} = \frac{x_Q - x - \dot{x}(T-t)}{\frac{1}{2}(T-t)^2} \quad (11)$$

The actual acceleration which should be obtained is $n$ times this acceleration, as explained in the introduction to this part. Thus the differential equation of the bomb's path is $$\ddot{x} = 2n\frac{x_Q - x - \dot{x}(T-t)}{(T-t)^2} \quad (12)$$

By use of the substitutions $$u = \frac{x - x_Q}{T-t}$$

$$w = T - t \quad (13)$$

Equation 12 may be written $$wu'' - 2(n-1)u' = 0 \quad (14)$$

where the primes indicate differentiation with respect to $w$. This differential equation is of standard form, and its solution is $$u = k_1 w^{2n-1} + k_2 \quad (15)$$

whence $$x = x_Q + k_1(T-t)^{2n} + k_2(T-t) \quad (16)$$

where $k_1$ and $k_2$ are constants of integration. The constants are determined by the condition that $x$ and $\dot{x}$ are both zero when $t$ is zero. The final result is $$x = x_Q\left[1 + \frac{(1-t/T)^{2n}}{2n-1} - \frac{2n(1-t/T)}{2n-1}\right] \quad (17)$$

From this expression, it follows by differentiation that the $x$ component of the velocity is given by $$\dot{x} = \frac{2n}{2n-1}\frac{x_Q}{T}[1 - (1-t/T)^{2n-1}] \quad (18)$$

and that the lateral acceleration is $$\ddot{x} = \frac{nx_Q}{\frac{1}{2}T^2}(1-t/T)^{2(n-1)} \quad (19)$$

Our interest will center in the last equation. First of all, it should be noted that when $n$ is equal to unity, the acceleration is equal to the value consistent with the treatment in Part I, namely, $2x_Q/T^2$. When $n$ is greater than unity, that is to say, when the controls are adjusted so that the bomb is over-accelerated, the initial acceleration is $n$ times $2x_Q/T^2$, but steadily decreases to zero as the bomb approaches the target. On the other hand, when $n$ is less than unity (bomb under-accelerated), the initial acceleration is less than $2x_Q/T^2$ but the acceleration steadily rises and becomes infinite as the bomb approaches the target.

In the latter case, because of the finite acceleration capability of the bomb, the full required acceleration could not be applied toward the end of fall, and the bomb would fail to reach the target. To be sure, the error would be small if $n$ were only slightly less than unity, but the error is always finite, and it seems wise to insure against trouble in this respect by using a value of $n$ which is substantially greater than unity, perhaps of the order of two. Furthermore, the use of such a factor will tend to overcome the other sources of error which exist in the computing mechanism.

When $n$ is equal to unity, the path of the bomb is a circular arc of constant curvature. When $n$ is less than unity, the curvature increases as the bomb falls, whereas when $n$ is greater than unity, the curvature decreases as the bomb falls.

In passing, it is of interest to note that the lateral component of velocity at the moment the bomb hits the target is given by $$\dot{x} = \frac{2n}{2n-1}\frac{x_Q}{T} \quad (20)$$

This velocity actually decreases as $n$ is increased.

Part III.—Gravity compensation

The lateral accelerations which have been discussed in the preceding two parts are the total lateral accelerations which the bomb experiences. When the trajectory is not purely vertical, the acceleration of gravity contributes to the lateral acceleration an amount $g$ times the sine of the angle between the tangent to the trajectory and the vertical direction. In calculating the amount of acceleration to be applied by means of the control surfaces, it is necessary to subtract the acceleration of gravity from the total desired acceleration.

Just as in Part I, the lateral components of the acceleration of gravity must be compensated for in both the $x$ and the $y$ directions. In order to avoid writing all of the equations twice, however, the treatment will be carried through for only the $x$ component. The equations for the $y$ component are identical in form.

Let it be assumed that it is desired to operate the control surfaces of the bomb so that the total acceleration in the $x$ direction is a specified function of time. The source of this function does not matter for the present argument; it may be equal to $2nv\ddot{F}_x(t)$, as in the present application; it could be determined by an external control, such as a radio link; or it might be predetermined by means of cams. All we need to known in this treatment is that the acceleration is to be controlled in conformance with some source of information. Our problem is to move the control surfaces of the bomb so that the sum of the aerodynamic acceleration and the gravitational acceleration is equal to the desired acceleration at each moment of time.

Let the total lateral acceleration in the $x$ direction be written $a_t$; let the $x$ component of the acceleration of gravity be denoted by $a_g$; and let the $x$ component of the aerodynamic acceleration be denoted by $a_a$. Each of these three accelerations is a function of time. One has at once $$a_a = a_t - a_g \quad (21)$$

The first term on the right is specified, and it will now be shown how it is possible to express the second term as an integral.

Let A be the $x$ component of the trajectory angle at the time $t$; the angle A is defined as the angle between the vertical direction and the $yz$ plane of the bomb. Then the rate of change of this angle is related to the total acceleration $a_t$ as follows (centrifugal acceleration in terms of the angle swept out is expressed as $a_t = a_{cent} = v\dot{A}$)

$$\dot{A} = \frac{a_t}{v} \quad (22)$$

The $x$ component of the lateral acceleration of gravity is equal to $-g \sin A$, which for small values of A may be written $$a_g = -gA$$

or $$a_g(t) = -gA(t) \quad (23)$$

By eliminating $a_g$ and $a_t$ among the last three equations, the following differential equations for the trajectory angle A is obtained:

$$gA + v\dot{A} = a_a(t) \quad (24)$$

The general solution of this differential equation is $$A(t) = A_0 e^{-\frac{gt}{v}} + \frac{1}{v}\int_0^t e^{-\frac{g(t-s)}{v}} a_a(s)\, ds \quad (25)$$

where $A_0$ is the value of the trajectory angle at $t=0$, (calculations show $A_0$ to be 21° at 10,000 feet, when the eye begins to function, for level bombing).

If now the specified function $a_t$ is equal to $2nv\dot{F}_x$ Equation 21 may be written $$a_a(t) = 2nv\dot{F}_x(t) + gA_0 e^{-\frac{gt}{v}} + \frac{g}{v}\int_0^t e^{-\frac{g(t-s)}{v}} a_a(s)\, ds \quad (26)$$

In the application of this equation to the control of the bomb, the value of $A_0$, the $x$ component of the trajectory angle at the moment the bomb begins to be controlled, must be inserted into the electrical circuits of the bomb before the bomb is loaded into the plane. $A_0$ can be estimated quite closely from a knowledge of the speed of the plane, the diving angle of the plane, and from the distance the bomb will fall before the bomb begins to be controlled.

Equation 26 is the control equation which would be used of it were desired that the total lateral acceleration be $n$ times the acceleration required to approach the target along a circular path. As shown in the last paragraph in Part I, the circular path has the advantage that if the bomb is aimed perfectly so that it would hit the target without the intervention of the controls, then the aerodynamic accelerations are very small. This is no longer true if the total acceleration is to be $n$ times the value specified by the theory of Part I. It is possible, however, to retain the advantage just mentioned without giving up the advantages of a factor $n$ which is greater than unity, if the controls are adjusted so that only the aerodynamic part of the total acceleration is $n$ times that specified by the theory of Part I. This adjustment may be accomplished by appending the factor $n$ to all of the terms in Equation 26:

$$a_a(t) = n\left[ 2v\dot{F}_x(t) + gA_0 e^{-\frac{gt}{v}} + \frac{g}{v}\int_0^t e^{-\frac{g(t-s)}{v}} a_a(s)\, ds \right] \quad (27)$$

This is the equation which is used as the basis of the aerodynamic control of the bomb. The control is accomplished by extending a deflector the distance required to secure the acceleration required by Equation 27.

The integration involved in the control equation is accomplished very simply by passing a voltage which represents the deflector extension through a resistance-condenser low pass (RC circuit) filter with a cross-over frequency equal to $g/v$ divided by $2\pi$. The constant $A_0$ is introduced by placing an initial charge on the condenser.

In order to facilitate the analysis of the deflector circuit of the up-down channel shown in Fig. 10D, the schematic circuit of Fig. 12 is provided. The voltage regulator tube V87 of Fig. 10D and a number of other elements are omitted for further simplification.

As shown, it is an object of the circuit of Fig. 12 to produce a voltage across A, B (the grids of tubes V81 and V82, respectively) proportional to the sum of three voltages, namely:

(a) Torque motor voltage,
(b) Gravity compensation voltage,
(c) Voltage due to deflector position.

These voltages must be balanced so that the voltage at A, B, namely A–B, will be adjusted to zero in order to maintain an "on-target" position, and simultaneously register a hit with the aerodynamically controlled bomb.

In the simplified circuit, A, being at the mid-point in terms of resistance from $A_1$ to E, has a voltage thereon of:

$$A = \tfrac{1}{2}(A_1 + E) \text{ volts}$$

likewise $$B = \tfrac{1}{2}(A_2 + F) \text{ volts}$$

What is really wanted is $A - B$ which is to be made $=0$ in order to maintain an "on-target" position, thus $$A - B = 0 = \tfrac{1}{2}(A_1 + E) - \tfrac{1}{2}(A_2 + F)$$

or $$0 = (A_1 - A_2) + (E) - (F)$$

However, circuit values are so arranged that $$F = \tfrac{1}{2}(145 + B5)$$

Thus as B5 varies, F also varies and hence it is possible to utilize a variation of B5 (deflector potentiometer position) in order to effect the balance of $A - B = 0$. Thus the voltage placed on B5 due to deflector position can be used to position (proportionately) the appropriate deflectors so as to make the bomb body pitch and yaw (accelerate) in the direction of the target as called for by the eye assembly via the torque motor voltage. The result is a deflector state or position which is the sum of the two voltages (a) and (b).

The equation becomes:

$$0 = (A_1 - A_2) + (E) - \tfrac{1}{2}(145 + B5)$$

Subtracting and adding 140 in this equation gives:

$$= (A_1 - A_2) + (E - 140) + 140 - \frac{145}{2} - \frac{B5}{2}$$

$$= (A_1 - A_2) + (E - 140) + \frac{280 - 145}{2} - \frac{B5}{2}$$

$$A - B = 0 = (A_1 - A_2) + (E - 140) + \tfrac{1}{2}(135 - B5)$$

Thus a simplified analysis of the circuit of Fig. 12 leads to the following:

(a) $(A_1 - A_2)$ is the torque motor voltage
(b) $(E - 140)$ is the gravity compensation voltage
(c) $\tfrac{1}{2}(135 - B5)$ is the deflector position voltage.

Tubes V81 and V82 both have a voltage applied to their grids from the potentiometer circuit. However, the voltage is transmitted to the grid of tube V82 almost immediately, whereas the application of this voltage to the grid of tube V81 is delayed, this voltage being applied through the RC circuit, and hence is subject to a time delay. In any event the unbalance at A and B is soon overcome and relay 610 in the unbalanced bridge circuit finally opens and the deflector (extension of which was called for) comes to rest.

It is to be noted that the value of E, which may be written E(t), is actually a function of time. B5 is arranged so as to have 210 volts applied thereon when the down deflector is all the way out, 135 volts when both deflectors are all the way in and 60 volts when the up deflector is all the way out. These voltages are applied over a number of intermediate steps. Such a circuit as this effects a quantitative measuring of values and not a qualitative measuring as in most other circuits. Thus any error introduced in the deflector circuits cannot be subsequently corrected.

The 92 volts applied to the up-down gravity compensation circuit is based on the assumption that the angle between the vertical and the tangent to the trajectory is 21° when the circuit starts to function at approximately 10,000 feet. The left-right unit has its gravity compensation effective only when a left or right deflection occurs by extension of the appropriate deflector; this is taken care of by the voltage of 135 applied to the 2 mf. condenser and slow leak (decay or growth of charge) through the 12 mg. resistor.

The equation used as the basis for the aerodynamic control of the bomb is:

$$a_a(t) = n\left[2v\dot{F}_x(t) + gA_0 e^{-\frac{gt}{v}} + \frac{g}{v}\int_0^t e^{-\frac{g(t-s)}{v}} a_a(s)ds\right] \quad (27)$$

In this equation $n$ is taken as having the value 2 in order to overcome any sources of error which may enter the computing mechanism.

In setting up and designing the deflector circuit to operate in accordance with this equation it is to be noted that:

$2v\dot{F}_x(t)$ corresponds to $(A_1-A_2)$, the voltage supplied to the torque motor, since a linear torque applied to the eye gyroscope unit is automatically converted into a derivative as a result of gyroscopic precession (i.e. the rate of change of the angle swept out by the mirror-eye-gyro axis in maintaining its lock-on position or orientation);

$$gA_0 e^{-\frac{gt}{v}} + \frac{g}{v}\int_0^t e^{-\frac{g(t-s)}{v}} a_a(s)ds$$

corresponds to $(E-140)$, the voltage which represents gravity compensation; $\frac{1}{2}a_a(t)$ corresponds to $\frac{1}{2}(B5-135)$, the voltage which depends on deflector position.

Thus, substituting and transposing in Equation 27, its values in terms of voltages give the simple equation in terms of voltages:

$$0 = (A_1-A_2) + (E-140) - \frac{1}{2}(B5-135)$$

or changing the sign of the last term $$0 = (A_1-A_2) + (E-140) + \frac{1}{2}(135-B5) \quad (28)$$

which corresponds exactly to Equation 27.

In this equation $(A_1-A_2)$ is the potential supplied by the torque motor bridge; E is a function of time, i.e. $E(t)$, and may be found exactly by solving the equation:

$$[E(t)-140] = gA_0 e^{-\frac{gt}{v}} + \frac{g}{v}\int_0^t e^{-\frac{g(t-s)}{v}} a_a(s)ds$$

where $v = 750$ ft./sec.

$g = 32$ ft./sec./sec. or in mils per second since $1g = \ddot{x} = 2v\dot{F}$ $32 = 2 \times 750 \dot{F}$ radians/sec.

$\frac{32}{1500} = \dot{F}$ radians/sec.

$\frac{32}{1.500} = 21.3$ mils per second (m.p.s.)

$A_0 = 21° = \frac{21}{57.3} = .366$ radians and since $A_0$ is really a negative bias $A_0 = -21°$
$A_0 = -.366$ radians since acceleration $= g \sin A_0 =$ approx. $gA_0$ $= g \times$ angle in radians $= 21.3$ m.p.s. $\times (-.366)$ $= -7.8$ m.p.s.

In our specific eye unit a voltage of 200 (potential difference) on the torque motors produces an acceleration of 40 m.p.s.; hence $$\frac{200}{40} = 5 \text{ volts/per mil. per sec.}$$

is the conversion factor between m.p.s. and volts. Thus the 21° angle calls for a bias of $-7.8 \times 5 = -39$ volts or approximately $-40$ volts.

Thus $$gA_0 e^{-\frac{gt}{v}} = -40 \text{ volts} \times e^{-\frac{t}{23.4}}$$

The portion $$\frac{g}{v}\int_0^t e^{-\frac{g(t-s)}{v}} a_a(s)ds \text{ of } (E-140)$$

is important only when deflector action is called for, since the function $a_a(s)$ is proportional to deflector action and hence if the deflector remains at 135 volts (i.e. the zero midpoint) this integral remains of 0 value. With deflector extension, however, this integral portion makes possible a quasi-integration of the deflector action and operates in the deflector circuit by means of an RC circuit. This function corresponds in operation to the typical condenser charge or condenser discharge formula in a resistance circuit:

$$\text{output voltage } (t) = \frac{1}{T}\int_0^t e^{-\frac{t-s}{T}} \text{ input voltage } (s)ds$$

Thus, evaluating $$\frac{g}{v}\int_0^t e^{-\frac{g(t-s)}{v}} a_a(s)ds$$

of our equation, since $$\frac{v}{g} = \frac{750}{32} = 23.4 \text{ seconds (half time is 16.2 sec.)}$$

reduces this complex formula to:

$$\frac{1}{23.4}\int_0^t e^{-\frac{(t-s)}{23.4}} a_a(s)ds$$

wherein $a_a(s)$ is a function of the deflector position. Since the potentiometer values change with the extension of a deflector, we are able to determine its value by supplying a voltage to the RC circuit varying from 60 volts through 135 volts to 210 volts in appropriate stages. With the up deflector all the way out, 60 volts is applied; with both deflectors in, 135 volts is applied; and with the down deflector out all the way, 210 volts is applied. Thus the voltage contributed by this portion of the circuit is capable of varying the value of $E(t)$ by approximately $-30$ volts through 0 volts to $+30$ volts over the time interval it takes the bomb to fall from 10,000 feet to ground, a time interval of approximately 13 seconds ($-30$ volts if the up deflector is out all the way for the whole time interval, 0 volts if no deflector action occurs, and $+30$ volts if the down deflector is out all the way for the whole interval). However, application of the maximum voltage over the entire time interval is unusual.

The aerodynamic acceleration capable of being effected by the deflectors when fully extended, assuming a constant speed for the missile of 750 feet per second, is approximately .70 $g$. The acceleration provided by operation of the gravity compensation circuit is approximately .46 $g$. This makes a total of 1.16 $g$. Thus, by using a multiplying constant $n$ in our formula equal to 2, any under-compensation and misses by the bomb are avoided.

The value .46 g above comprises a portion of .21 g from $$gA_0 e^{-\frac{gt}{v}}$$

and a second portion of .302 g coming from the integral. When these portions are transmitted through tube V83 (approximately .9 efficient) we have a total of .46 g.

Thus, with $A_0$ being 21° (bias angle) or .366 radians, the first portion of $(E-140)$ becomes $$= gA_0 e^{-\frac{gt}{v}}$$

$$= g(.366)e^{-\frac{13}{23.4}} \text{ (over a full 13 second period which is the interval of fall from 10,000 feet to ground)}$$

$$= .21 \, g.$$

The second portion of .302 g comes from the integral portion of $(E-140)$. Thus in $$\frac{g}{v}\int_0^t e^{-\frac{g(t-s)}{v}} a_a(s)ds$$

$a_a(s)$ is a function of deflector position and has input values ranging from 60 through 135 to 210 volts or when considered as if the 135 volt point were zero may be looked at as ranging from $-75$ volts through 0 to $+75$ volts. When this is integrated over a 13 second period, it has values ranging from $-.302\,g$ to $+.302\,g$.

These values may be converted from $g$ units to volts in view of our fundamental equation:

Acceleration of 32 ft./sec./sec.

$$= \ddot{x} = 2v\dot{F}_x \quad \text{(Equation 10)}$$
$$32 = 2 \times 750$$
$$\dot{F}_x = \frac{32}{1500} \text{ radians}$$
$$= \frac{32}{1500} \times \frac{1}{1000} \text{ mils per second}$$
$$= 21.3 \text{ m.p.s.} = 1\,g.$$

Thus .21 $g = .21 \times 21.3$ m.p.s. $= 4.47$ m.p.s., and since 40 m.p.s. correspond to 200 volts in the torque motor circuits, 4.47 m.p.s. × a conversion factor of 5 volts per mil give 22.3 volts.

Similarly, $\pm.302\,g$ gives $\pm.302 \times 21.3$ m.p.s. $\times 5 = 32.2$ volts—the sign depending on which deflector was extended, up deflector giving—, down deflector giving+.

At the grid of tube V83 we have a gravity compensation at the end of the 13 second drop of .21 $g + .302\,g = .512$ $g$ at most, and since the grid follower tube V83 gives an amplification of approximately 1 (e.g. about .9), we have .512 $g \times .9 = .4608\,g$.

Thus the .70 g of the deflectors $$\underline{+.46 \, g \text{ of the gravity compensation circuit}}$$
gives
$$116 \, g \text{ total acceleration}$$

and in order to provide for any errors that may enter the calculating devices, it is necessary to make $n=1.1$ and for simplicity it is taken as $n=2$. Thus, $$a_a(t) = n\left[2v\dot{F}_x(t) + gA_0 e^{-\frac{gt}{v}} + \frac{g}{v}\int_0^t e^{-\frac{g(t-s)}{v}} a_a(s)ds\right]$$

or $$\tfrac{1}{2}a_a(t)\left[2v\dot{F}_x(t) + gA_0 e^{-\frac{gt}{v}} + \frac{g}{v}\int_0^t e^{-\frac{g(t-s)}{v}} a_a(s)ds\right]$$

Since $\tfrac{1}{2}a_a(t)$ corresponds in the circuit to $\tfrac{1}{2}(B5-135)$ and substituting the values above found, we have:

$$\tfrac{1}{2}(B5-135) = [(A_1-A_2) + (E-140)]$$
$$0 = [(A_1-A_2) + (E-140)] - \tfrac{1}{2}(B5-135), \text{ or}$$
$$0 = \left[2v\dot{F}_x(t) + gA_0 e^{-\frac{gt}{v}} + \frac{g}{v}\int_0^t e^{-\frac{g(t-s)}{v}} a_a(s)ds\right]$$
$$+ \tfrac{1}{2}(135-B5)$$
$$0 = (A_1-A_2) + (E-140) + \tfrac{1}{2}(135-B5) \quad (28)$$

The eye in attempting to maintain its lock-on orientation by following a moving target and thereby keep its line of sight or mirror-gyro axis pointing at the target is almost always in a position such that a potential of one polarity or its reverse is applied to the torque motors. This potential is simultaneously impressed upon the input of the deflector circuit, Fig. 10D, namely on the grids of tubes V81 and V82.

As the simplest possible case illustrating a bomb flight, assume the eye unit directly "on-target" upon being uncaged, no immediate signal is passed on to the deflector circuit but a short interval later, due to the lateral motion of the missile in its "on-target" trajectory path, the eye shifts laterally a distance 51—52, Fig. 13, and the line of sight of the eye unit alone is off-target, and therefore transmits a signal calling for precession sufficient to keep the eye "on-target." This signal energizes the torque motor bridge circuit 575 and is passed on to the deflector circuit 600. This false signal is corrected in the deflector circuit through the provision of appropriate circuits.

In the deflector circuit the values of the various biases, resistances, capacitances, etc., of the circuit elements, tubes, etc., are such as to enable gravity compensation to be always effected in the up-down channel. With no deflector extended in the up-down channel, the circuit constants are such as to apply approximately 92 volts to the grid of tube V83 (for this purpose the deflectors in the up-down channel are both retracted and the sliding contacts on the associated potentiometers are at the midpoint applying 135 volts to the RC circuit at B5).

This is equivalent in the up-down channel to applying approximately 100 volts at the cathode of tube V83 which is $(E, \text{Fig. 12})$ therefore applied to the grid of tube V81 while approximately 140 volts is simultaneously applied to the grid of tube V82. This bias of approximately 40 volts has been determined and the constants of the associated circuits, the values of the RC circuits, etc., in the up-down gravity compensation circuit depend upon the angle between the vertical and the tangent to the trajectory at the 10,000 foot altitude (when the circuits begin to function and the eye is uncaged, the voltage of 92 on the grid of tube V83 is based on the assumption that this angle is 21° at the time the eye opens or actually begins to function).

Considering, now, the up-down channel and circuit as functioning in the missile, the motion of the missile in its parabolic trajectory causes a horizontal shift 51—52, Fig. 13 (as well as a downward shift 50—51) of the eye unit as a whole, and since the eye is independently gyroscopically stabilized, the line of sight of the eye 50—54 tends to remain fixed in space and parallel to its uncaged orientation, and therefore in position at 52, the eye points in a direction 52—55 above the target. This results in a down signal and the eye is precessed downward approximately through angle 54—52—55 as the missile goes from 50 to 52. This signal, however, with the missile in a parabolic "on-target" path exactly matches the up bias in the deflector circuit gravity compensation unit (but nevertheless precesses the eye through energization of the torque motor circuit to maintain its eye-mirror-gyro axis locked-on to the target). Assume that as a first example the input signal in this case (parabolic trajectory terminating exactly on the target) amounts (for the sake of an illustrative arithmetical example) to 240 volts applied to $A_1$ and 200 volts applied to $A_2$. Thus we have $$(A_1-A_2)+(E-140)+\tfrac{1}{2}(135-B5)=0$$
$$(240-200)+(100-140)+\tfrac{1}{2}(135-135)=0$$
$$+40-40+0=0$$

Thus the deflectors remain in their retracted positions.

As the missile drops (assuming in this first example that it was dropped with an "on-target" trajectory) the rate of change of the line of sight and hence the rate of change of the angle marked out by the eye-mirror-gyro axis becomes smaller and smaller, and hence the potential $(A_1-A_2)$ becomes less and less. Therefore we can assume that upon falling an additional few thousand feet (a period of a few seconds) the voltage $(A_1-A_2)$ becomes $(230-200)=30$ volts approximately. Simultaneously the value of E (which is really a function of time and hence may be written $E(t)$) varies. Its value is determined by a bias of 12 volts applied through a resistance and in addition by the cathode of cathode follower tube V83, the grid of which is biased through a condenser by 92 volts applied from point 630, Fig. 10D, on a tap resistor and simultaneously the grid is supplied an exponentially varying potential from the RC circuit to which B5 supplies 135 volts (all deflectors retracted).

Thus, the grid of tube V83 builds up a voltage over a time interval, exponentially approaching 135 volts and since the cathode of V83 is always slightly higher (approximately 5 volts higher to avoid drawing any grid current) than the grid, the cathode and hence point E, Fig. 12, approaches 140 volts. Assume that after several seconds E reaches 110 volts; our equation then becomes:

$$(A_1-A_2)+(E-140)+\tfrac{1}{2}(135-B5)=0$$
$$(230-200)+(110-140)+\tfrac{1}{2}(135-135)=0$$
$$30-30+0=0$$

and no deflector action is necessary with a trajectory terminating on the target, the bomb striking the target as in ordinary flight.

In this particular example, since no deflector action was called for, the integral portion of $(E-140)$, namely $$\frac{g}{v}\int_0^t e^{\frac{g(t-s)}{v}} a_a(s)ds$$

contributes 0 volts because no deflector action results in $a_a(s)$ being zero. Therefore, only the first portion of $(E-140)$ is effective, namely $$gA_0 e^{-\frac{gt}{v}}$$

which has the value $$-40e^{-\frac{t}{23.4}}$$

and amounts over the time interval of a few seconds to approximately $-30$ volts, giving a value to E of $140-30$ or $E=110$ volts.

As the next example of the action of the bomb, let us assume that the missile in its natural trajectory (without benefit of deflector action and its accompanying aerodynamic acceleration) is following a trajectory, which is falling short of the target (as in Fig. 14). Since the eye is gyroscopically stabilized as described in the first example and when moving in the trajectory of the bomb is shifted forward a distance 61—62, it tends to point at 64; but with the target at 65 the eye transmits an up signal in order to precess itself upwards through an angle approximately equal to 64—62—65. As the missile continues on its trajectory the locked-on eye continues to transmit the necessary up signal via the torque motors in order to maintain its "lock-on" relationship to the target. This signal is of opposite polarity to that of the first example (in order to precess the eye upwardly). Thus there is a reversal of voltage through the torque motors (opposite to that in the first example), and likewise to the deflector circuit. Assume for the purposes of this example that the voltage is 200 volts on $A_1$ and 220 volts on $A_2$, our equation becomes:

$$(A_1-A_2)+(E-140)+\tfrac{1}{2}(135-B5)=0$$
$$(200-220)+(100-140)+\tfrac{1}{2}(135-135)<0$$
$$-20-40+0<0$$

or $-60$ volts, the voltage being in a direction calling for the extension of an up deflector.

It is to be noted, in passing, that even if the eye in its forward motion as carried by the missile happens to lock-on to the target simply because its line of sight is gyroscopically stabilized and thus maintained in its orientation in space, thereby transmitting a null signal (i.e. $A_1=200$ volts and $A_2=200$ volts), nevertheless this would still result in an up deflector being called for extension in view of $(E-140)$ which is $(100-140)$ and hence is a $-40$ volt bias for up deflector action.

In our particular case, up deflection is called for and micropositioner switch 610, Fig. 10E, closes a circuit to energize the up deflector relay, thereby causing the up deflector to extend putting lower and lower potential on B5 as this deflector extends.

Simultaneously as the bomb gets a new trajectory more and more closely approximating the "on-target" trajectory necessary to score a hit, the rate of change of the angle swept out by the eye-mirror-gyro axis becomes less and less, resulting in a smaller rate of precession and hence a lower voltage to the torque motors. In fact, the signal may even reverse in polarity, making $A_1=200$ and $A_2=180$.

In addition E builds up in voltage due to slow charge of the condenser in the RC circuit from the 135 volts applied by the original setting of the up-down deflector potentiometer (both deflectors in retracted position). Then, however, the extension of the up deflector decreases this voltage to approximately 95 volts and hence E proceeds to decrease.

Moreover, simultaneously with the decrease in E due to the lowering of the effect of the portion $$gA_0 e^{-\frac{gt}{v}}$$

an additional gravity compensation due to the up deflector action introducing a small negative voltage (lower positive voltage) change in $a_a(s)$ of that part of E, namely the portion $$\frac{g}{v}\int_0^t e^{-\frac{g(t-s)}{v}} a_a(s)ds$$

results in an additional decrease by introducing a small negative voltage effect (somewhere between $-30$ and $0$ volts). For purposes of simplicity in illustration of this particular problem, it may be assumed that the increase in E exactly counterbalances the combined decrease, leaving E at its original value of 100 volts.

Our equation therefore becomes:

$$(A_1-A_2)+(E-140)+\tfrac{1}{2}(135-B5)=0$$
$$(200-180)+(100-140)+\tfrac{1}{2}(135-B5)=0$$
$$20-40+\tfrac{1}{2}(135-95)=0$$
$$-20+\tfrac{1}{2}(40)=0$$

Thus the up deflector extends until its potentiometer reaches 95 volts.

It is thus readily seen how the circuit operates since under the conditions of unbalance of the circuit the first unbalance of $-60$ volts (which may change to an unbalance of $-20$ volts) causes an unbalance in the deflector bridge circuit resulting in a current flowing through the coils of relay 610. This current flows in such a direction as to cause an up deflector to be extended to such a position that the potentiometer circuit 682 associated therewith cuts out sufficient resistance to make the potential on point B5 low enough to balance out (really a matching or bucking effect) the −20 volts, i.e. B5 approaches 95 volts.

As the missile assumes the correct trajectory for scoring a hit, the eye may become so shifted in position as to call for a downward precession. The downward precessing voltage may even become great enough to overcome the upward bias and thus effect a retraction of the up deflector (if excessive lift was effected by the prolonged extension of the up deflector) and thus a down deflector may possibly be called for extension.

If (as a third example) the missile in its natural normal trajectory (without benefit of deflector action and its accompanying aerodynamic acceleration) is following a trajectory which overshoots the target (as in Fig. 15), the eye being gyroscopically stabilized as described in the first two examples points with its line of sight (eye-mirror-gyro axis), when uncaged, above the target and hence transmits a down signal and therefore is precessed downwards approximately through an angle 74—71—75.

The rate of change (precession of the eye) necessary for the eye to maintain its lock-on under these conditions is so much greater than that shown in Fig. 13 (i.e. angle 75—71—74 is much greater than angle 54—52—55) that the voltage transmitted to the torque motors for down precession of the eye unit and also transmitted to the deflector circuit more than matches the up bias in the deflector circuit (still, however, this voltage is necessary to maintain the eye-mirror-gyro axis "locked-on" to the target). For simplicity, assume that the input signal in this example amounts to 275 volts applied to $A_1$ and 200 volts to $A_2$. The initial equation becomes:

$$(A_1-A_2)+(E-140)+\tfrac{1}{2}(135-B5)=0$$
$$(275-200)+(100-140)+\tfrac{1}{2}(135-B5)=0$$
$$75-40+\tfrac{1}{2}(135-135)>0$$
$$35>0$$

the voltage being in a direction calling for down deflection.

Simultaneously, as the bomb gets a new trajectory more and more closely approximating the "on-target" trajectory, the rate of change of the angle swept out by the eye-mirror-gyro axis becomes less and less, resulting in a smaller and smaller rate of precession and hence a lower voltage to the torque motors and the deflector circuit.

Thus, assume that $A_1$ becomes 250 and $A_2$ becomes 200; then $(A_1-A_2)$ becomes, say $(250-200)$.

However, E builds up in voltage due to the slow charging of the condenser of the RC circuit because of the initial 135 volts applied by the up-down deflector potentiometers in their original retracted position, then the further extension of the down deflector increases this to an applied voltage of approximately 205 volts.

Moreover, simultaneously with this increase in E due to the growth of the effect of the portion $$gA_0 e^{-\tfrac{gt}{v}}$$

there is an additional gravity compensation due to the down deflector action introducing a higher positive voltage change in $a_a(s)$ of that part of E, represented by the portion $$\frac{g}{v}\int_0^t e^{-\tfrac{g(t-s)}{v}} a_a(s)\,ds$$

This results in an additional increase by introducing a small positive voltage effect (somewhere between 0 and +30 volts). For purposes of simplicity in illustration of this particular problem, it may be assumed that E increases from 100 to 125 volts. Thus we have:

$$(A_1-A_2)+(E-140)+\tfrac{1}{2}(135-B5)=0$$
$$(250-200)+(125-140)+\tfrac{1}{2}(135-205)=0$$
$$50-15+\tfrac{1}{2}(-70)=0$$
$$+35-35=0$$

Thus, the down deflector extends until its potentiometer reaches 205 volts.

Once the missile is on the correct trajectory, the downward precession may decrease in rate and may even get below the original bias voltage provided the extended down deflector applies a high enough voltage over a long enough interval to enable the quasi-integration portion of $(E-140)$ to build up, as a result of which E may even reach a value of approximately 150.

Moreover, if excessive down acceleration was effected by the extended down deflector operating over a somewhat protracted time interval, the change in the signal may become such as to effect a retraction of the down deflector and possibly the up deflector may be called for extension.

The above simple arithmetical problems will facilitate an understanding of the action of the various formulae and their associated circuits when considered from the practical point of view.

In all the above examples it is to be noted that any preliminary movement of the eye, before lock-on is actually effected, is usually in the proper direction to call for the appropriate deflector action even though it is really the rate of motion of the eye after lock-on is attained that really determines deflector action.

In the above given illustrative arithmetical examples it is to be understood that only approximate values have been used in order to simplify the problems; however, more exact values may readily be obtained by using graphical solutions for the various functional relationships.

In the left-right deflector circuit, the grid corresponding to the grid of cathode follower tube V83 (the tube which carries over the voltage from the gravity compensation circuit without changing the characteristics of the circuit) is biased at 135 volts and, since the cathode may be approximately 5 volts higher, results in E being originally at 140 volts. Thus in the left-right deflector circuit the portion $$gA_0 e^{-\tfrac{gt}{v}}$$

of $(E-140)$ has a value of 0 since $A_0=0$. Therefore there is no $x$ component of any trajectory angle at the moment when the bomb begins to be controlled (as there is in the up-down trajectory) in the left-right trajectory because the line of flight of the missile is practically equivalent to a fall which is straight down except when changed by left-right deflector extension.

Moreover, that portion of $(E-140)$ represented by $$\frac{g}{v}\int_0^t e^{-\tfrac{g(t-s)}{v}} a_a(s)\,ds$$

has no value until deflector action is effected, and for a period of deflector action amounting to 13 seconds this quasi-integration of deflector action may amount to ±.302 $g$ (.302 of the acceleration of gravity) which when converted to volts by multiplying by 21.3 m.p.s. (=1 $g$) and again by 5 volts per m.p.s. gives ±32.2 volts applied to the grid of the cathode follower tube. Since the cathode follower tube has an amplification factor of approximately .9, this voltage is approximately ±30 volts and therefore gives a value of E ranging from 110 volts to 170 volts for the left-right deflector circuit provided the deflectors are operating over a full 13 second period.

As received at the field, the eye (gyroscopically stabilized) unit is already caged by the insertion of gyroscope driving shaft 142, Fig. 9, into position in the driven end of the shaft of the eye gyro rotor 130 by pulling the caging arm assembly 140 forward. Also, gear 133 containing the centrifugally operated declutching mechanism has been pushed into engagement or mesh with gear 132 and gear 134. Thus the eye assembly is in position to be dynamically released by gear 133 and then subseqeuntly uncaged by electromagnet 141. In addition, the free gyroscope 250, Fig. 7, is locked or caged in a fixed position by pin 234 which is held in its extended or caging position by gyro uncage wire 952.

The timer 800 is spring operated and hence must be wound and set for its particular type of bombing mission (i.e. level bombing at 20,000 feet or dive bombing at approximately 8,000 or 9,000 feet or at various other intermediate points according to the type of bombing flight for which it is to be used). In fully wound condition, the timer switches 852 to 857 are all closed in their up position; switch 851, alone, is in its down position at this time. In this position there is no battery connection to any parts of the circuit through the timer 800. Timer release wire 951, Fig. 2C, and free gyro uncage wire 952, Fig. 2C, extend through the lower arming device 950 and are provided with loops for subsequent attachment to and removal by the upper arming device. (Cover plate 980 protects silver chloride lens 990 against abrasion and similar injury during handling and is removed when the bomb is in final position in the bomb bay.)

Figure 23:
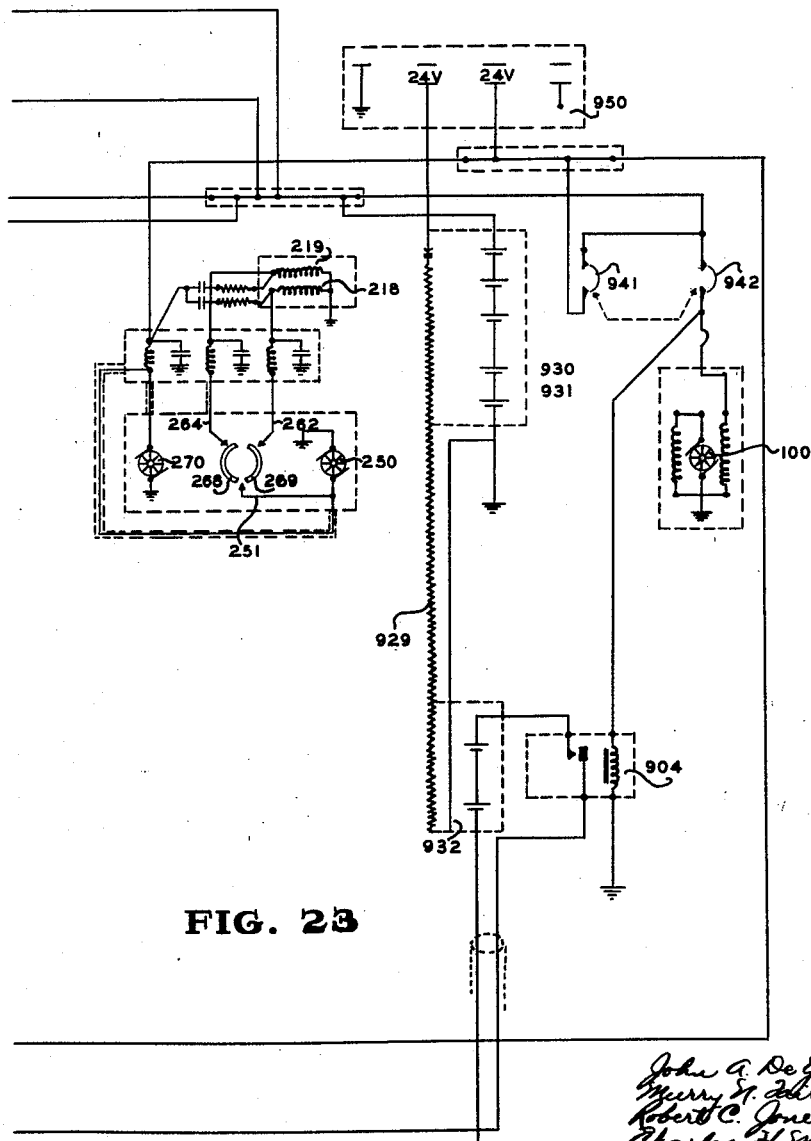

Safety screw 949, Figs. 2, 2C, 5, is inserted as shown and serves to hold switches 941 and 942, Fig. 23, open. The storage batteries 930, 931, 932 may be put in position or shipped separately—preferably the latter, since they must be filled with electrolyte, charged and reconnected at the field; if left in position the batteries would subject the mechanism to injury by spilling of the electrolyte, gassing while charging, etc. Moreover, since batteries after testing and being found defective must be removed anyway, it is preferred that they be inserted at the field after they have been filled, charged and separately tested.

Since the batteries are of the nonspilling type, they are charged and placed in the battery warmers 929 and mounted in the nose and the nose screwed onto the bomb 10, Fig. 2A, at the fuse hole by threaded end 202, wire 940 for mounting the nose maintaining gear 210 and consequently threaded end 202 locked for rotation with the nose whereby the nosepiece is securely fastened and locked onto the nose of the bomb.

The bomb with the heat homing nosepiece is then mounted in the bomb rack of the carrier plane, cover plate 980 removed and the upper arming device with its locking arm for preventing rotation of the nose put in place into the breakaway connector or lower arming device 950, whereupon wire 940 may be removed; and since the upper arming device has an arming pin which holds switches 941 and 942, Fig. 23, open, safety screw 949 may also be removed at this time.

The bomb is now ready to be taken aloft. The upper arming device contains plug connecting pins for connecting the 24 volt plane batteries to the battery warmer 929, Fig. 23, and moreover, for a time interval of approximately 200 to 45 seconds before release of the bomb the plane batteries are connected through a switch in the plane to supply 24 volts through the connections shown, Fig. 23, to the heater filaments to bring the heater elements of the tubes up to operating temperature; this same plane battery voltage is connected to the rate gyroscope 270 and free gyroscope 250 in order to bring them up to operating speed. Thus the plane batteries supply the battery warmer, bring the rate and free gyroscopes up to speed and bring the heater elements of the heater type tubes up to operating temperature before release of the bomb.

In this condition, the bomb is ready for release. Thus, about 200 to 45 seconds before release, the bombardier connects the plane batteries through a switch in the plane to supply the necessary 24 volts through the contacts in the upper arming device to the lower arming device and then to the circuits shown. The bombardier actually releases the bomb by automatic controls operated by the bomb sight. Thus, at breakaway, the bomb bay doors are opened, the upper arming device is pulled out, breaking connections with the plane batteries and switches 941 and 942, Fig. 23, close, putting the nose batteries 930, 931 into the circuit for operating the rate and free gyroscopes, switch 942 closes to start motor 100 and simultaneously causes relay 904 to close, putting 2 volts from battery 932 on the filaments of the preamplifier and postamplifier tubes. Simultaneously with the pulling away of the breakaway connector, timer release wire 951 and free gyro uncage release wire 952 are also pulled out, since they are attached to the breakaway connection through loops, Fig. 2C. Thus roll stabilization is immediately effected as the bomb is released and timer 800 starts to operate (i.e. unwind for a period of X seconds).

Motor 100 brings the mirror gyroscope of the eye assembly up to speed and also operates the roll stabilization mechanism shown in Fig. 6. Later it also operates the deflectors, i.e. extension and retraction as called for (see Figs. 5, 8).

Upon release of the bomb, timer 800 runs for a period of time equal to X seconds before it begins its sequential cam operation of switches 851 to 857. Thus the timer 800 sets into operation at fixed intervals the various components of the bomb nose. Time interval X is an adjustable time period varying from 0 seconds for dive bombing up to approximately 23.4 seconds for high level bombing (i.e. 20,000 feet; a drop of 10,000 feet is effected before timer 800 begins to take over the operation of its sequential switching steps. Preferably, the setting scale is calibrated in thousands of feet for high level bombing and also for dive bombing).

Thus at the end of time interval X the mirror and eye gyro have been brought up to speed and have been dynamically released from being driven by motor 100 by disengagement of gear 133, Fig. 9. Then (or in some bomb runs at $X+.25$ seconds) timer switch 851 is cam operated by the timer to close its upper contact and connect the nose batteries 930 and 931 through the upper contact of switch 852 to start the dynamotor 25. Simultaneously, switch 851 through a parallel circuit energizes relays 818 and 819 in the capacitor relay box 820 (see Figs. 2, 4 and 22, both relays being biased to make their left contacts) to close their right contacts and thus complete a circuit to cause dynamotor 25 to charge capacitors 505 and 506 in parallel.

Figure 22:
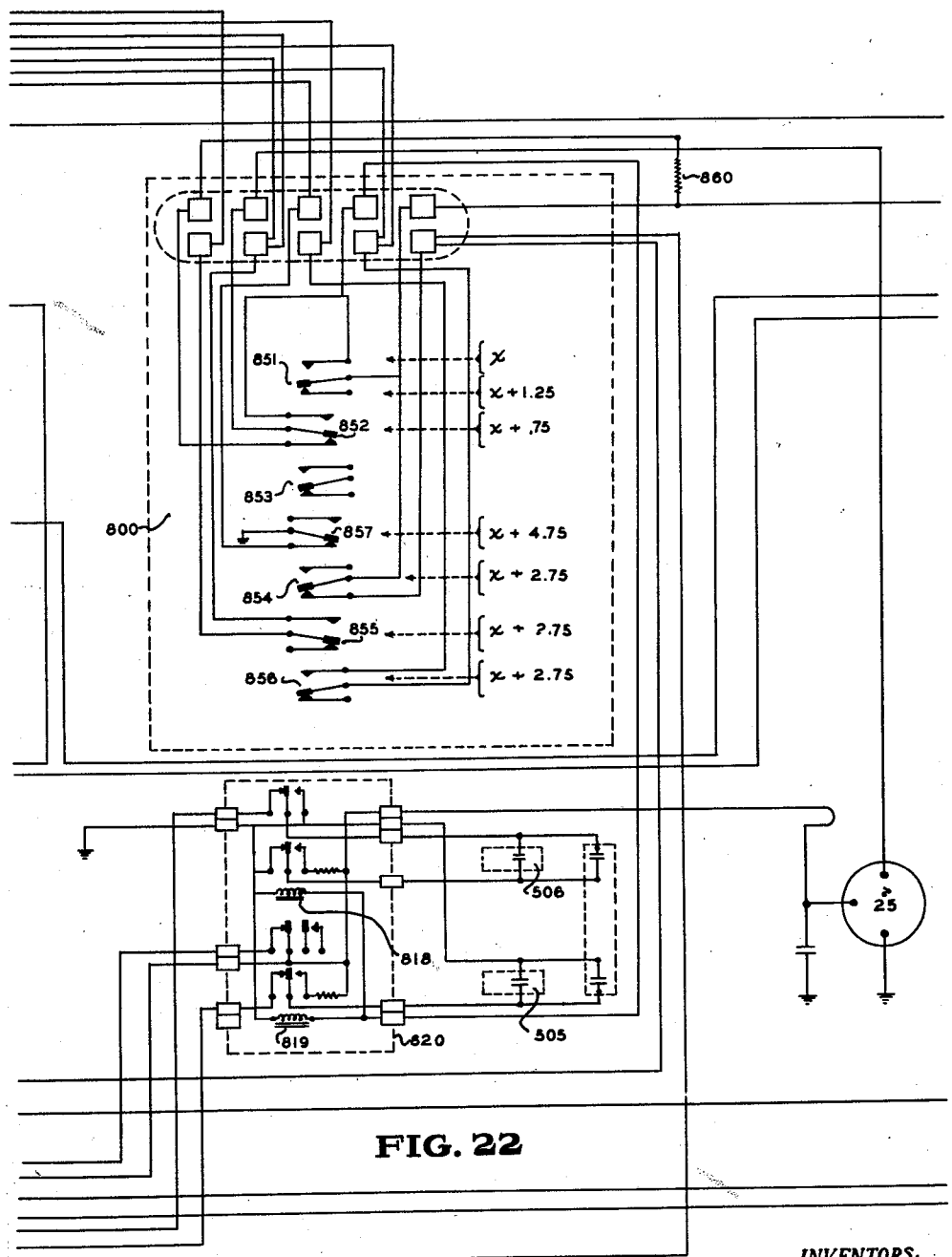

Then at $X+.75$ seconds, switch 852 is cam operated to break its upper contact and make its lower contact whereby resistance 860, Figs. 2C and 22, is cut into the circuit energizing dynamotor 25. These switching operations insure a voltage of possibly 500 to 600 or more volts for a portion of a second in order to charge condensers 505 and 506 sufficiently (i.e. to 500 volts) and then to cut down the voltage from the dynamotor to the 400 or so volts needed for the plate, torque motor bridge, etc. circuits in later operations.

Figure 18:
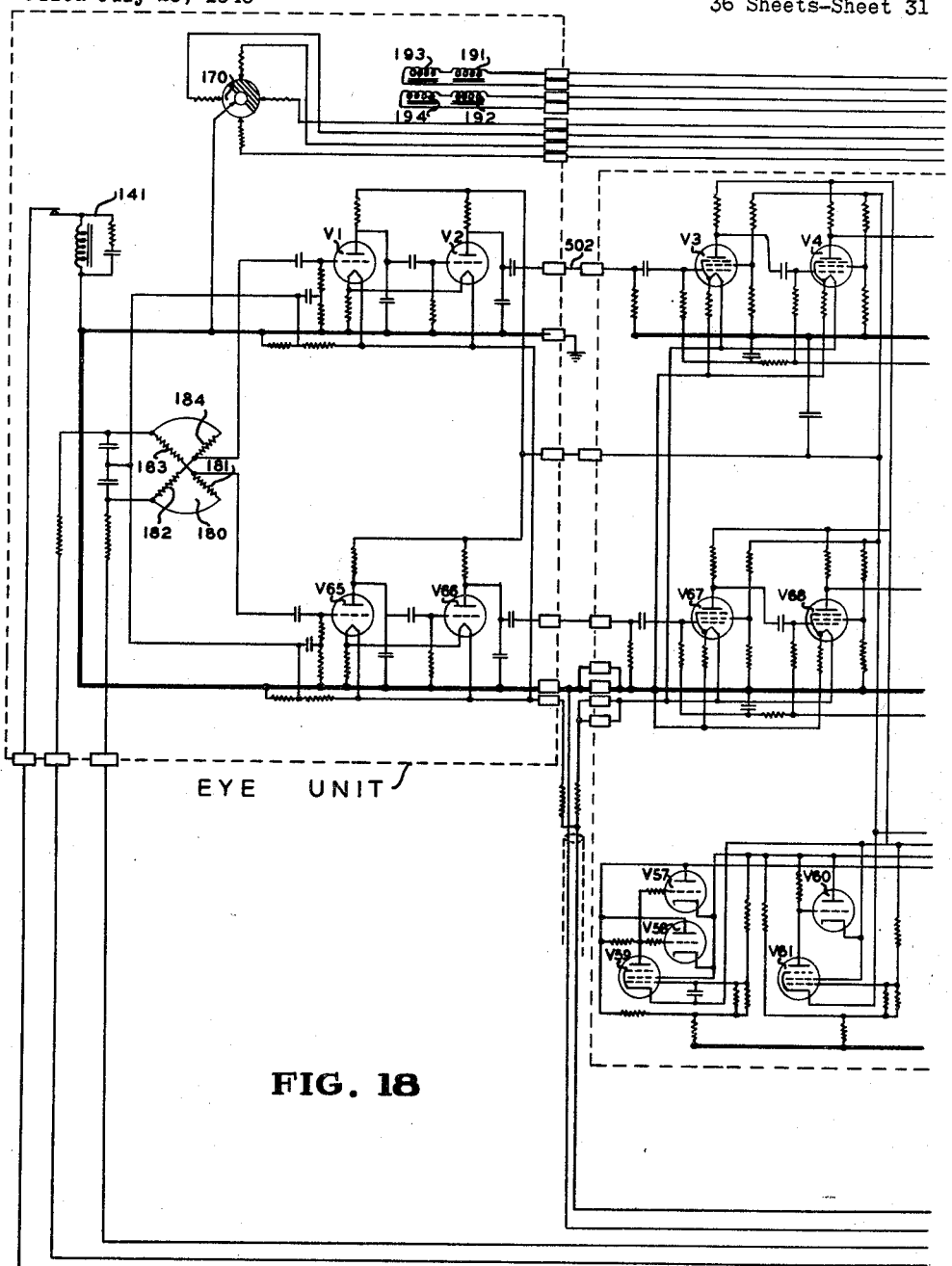
Figure 19:
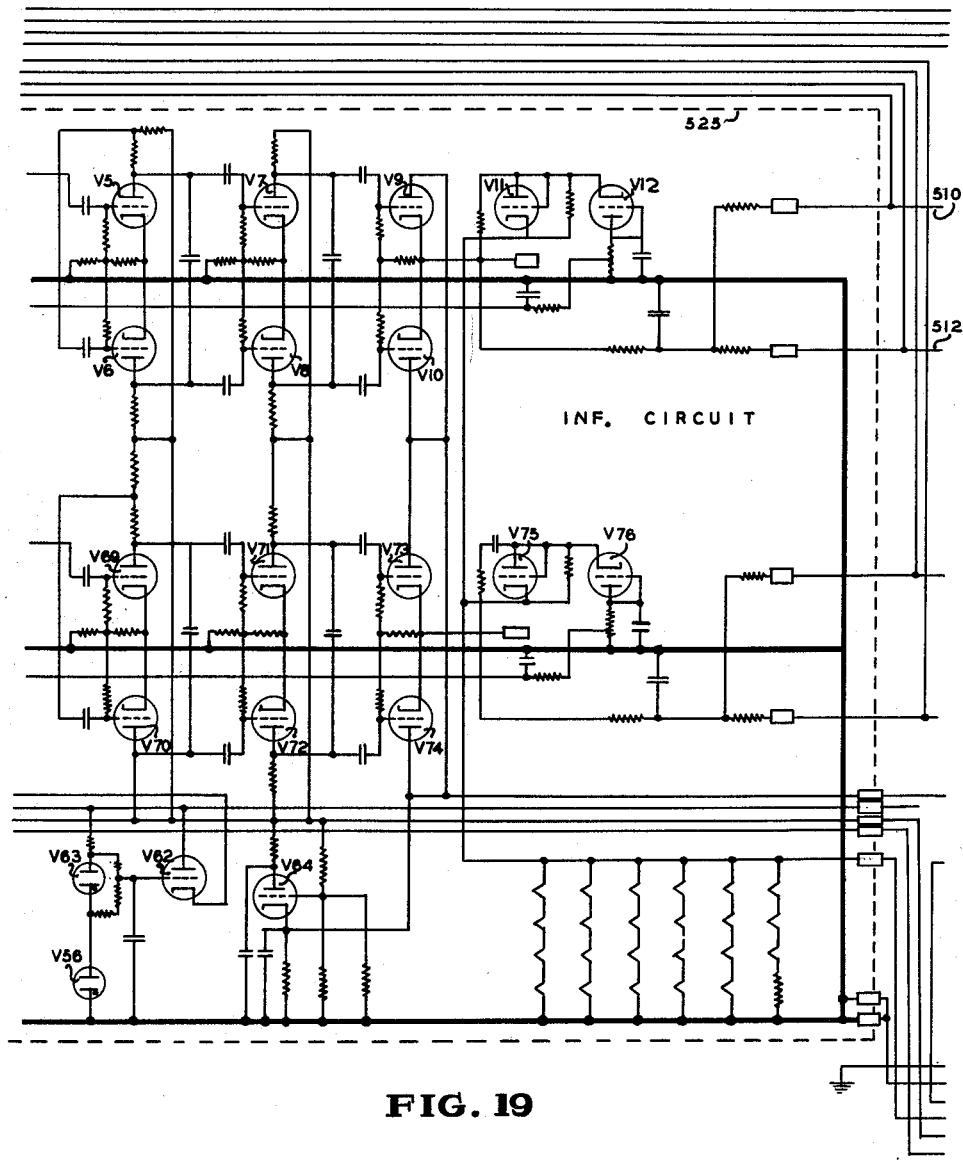
Figure 20:
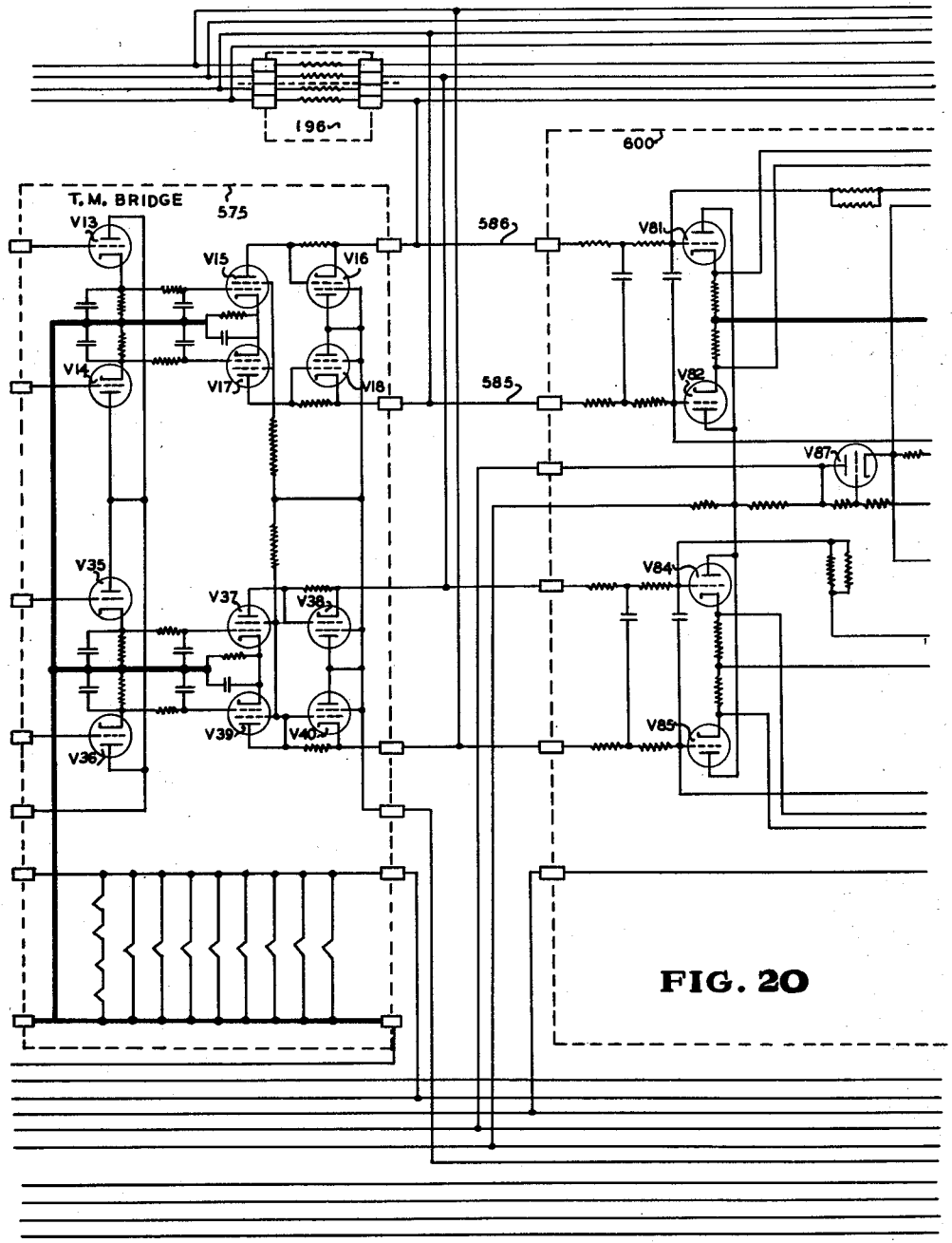

At $X+1.25$ seconds, condensers 505 and 506 are fully charged (or practically so) to a peak of approximately 500 volts each and therefore cam operated switch 851 breaks its upper contact, thereby deenergizing relays 818 and 819, whereupon condensers 505 and 506 are connected in series (through the biased contacts of relays 818 and 819) and across the arms of thermistor 180 as shown diagrammatically in Figs. 10A and 18.

Next, at $X+2.75$ seconds, switches 854, 855 and 856 are cam operated to break their upper contacts and make their lower contacts. Thus, switch 854 energizes relay 141, Fig. 9, also Fig. 18, to uncage the eye unit so that the eye can spot the target and get close to lock-on by, say, $X+4.75$ seconds and, simultaneously, switch 854 closes a circuit leading to the deflector relays (i.e. 710, 740 etc., Fig. 21) and thereby conditioning these relays for energization by the micropositioner relays (i.e. 610, Fig. 21).

At the same time (i.e. at $X+2.75$ seconds) a cam operates and breaks the upper contacts of switches 855 and 856, thereby removing the torque motor shorts from the left-right precessing torque motors and the down-up precessing torque motors, respectively.

Figure 21:
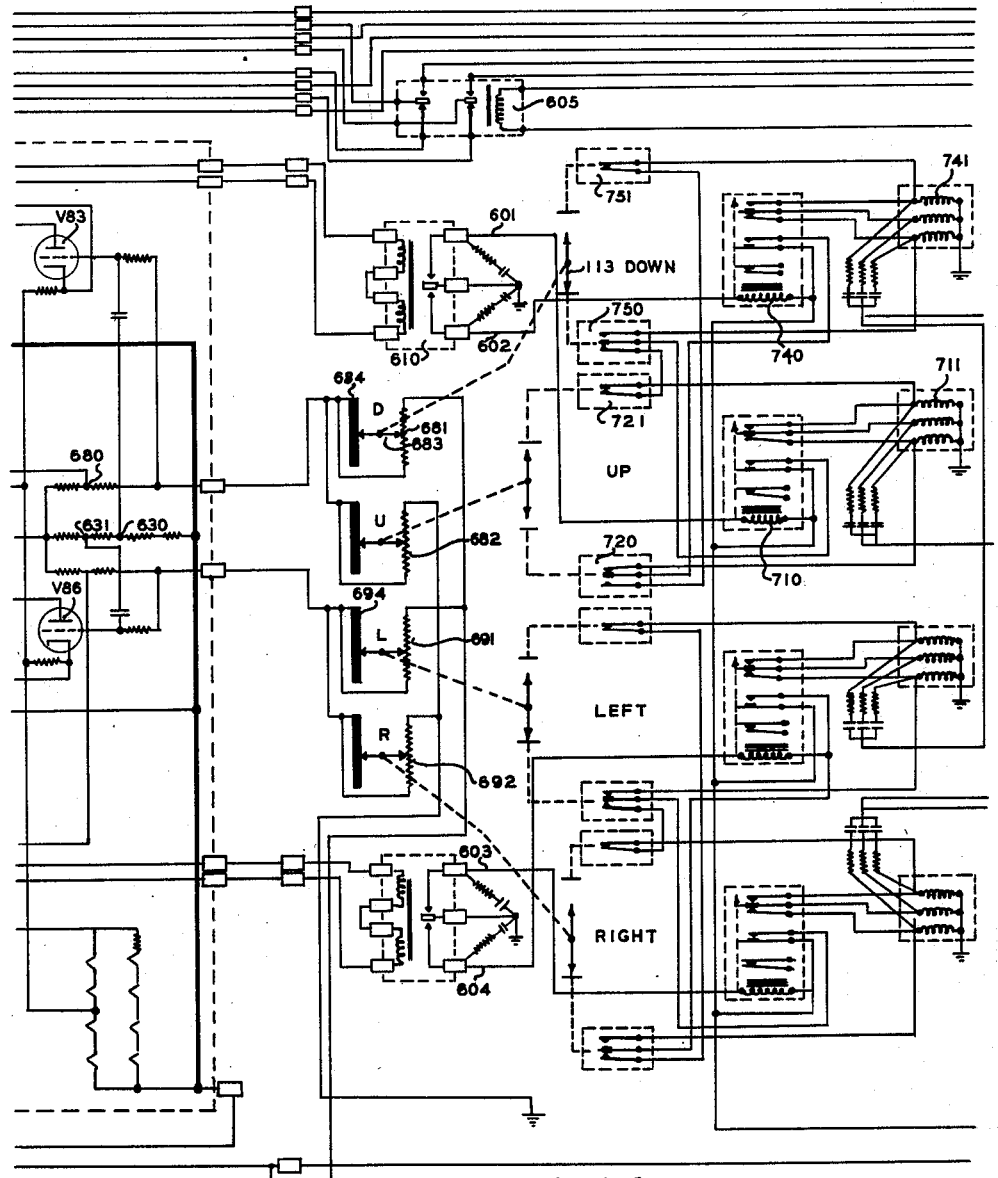

Then, at $X+4.75$ seconds (approximately) a cam operates and breaks the upper contacts of switch 857 and puts ground on and therefore energizes relay 605, Fig. 21, shown also in Fig. 2C. Relay 605 is biased to close its upper contacts and hence when energized, it closes its lower contacts as shown in Fig. 21, thereby inserting the torque motor resistance pads 196, one in series and the other in shunt with the torque motors, thereby damping the action of the torque motors and resulting in less likelihood of any hunting or oscillating action on their part as interpreted by their precession of the eye-gyro unit.

Part IV.—Addendum

Thus, when timed for normal high level bombing, the timer lets the missile run free for approximately 23.4 seconds, whereupon it then functions to set the unit in order for operation.

The fundamental control equation for the bomb was found above (Equation 27 of Part III) to be:

$$0 = 2vF - \frac{a_a(t)}{n} + gA_o e^{-\frac{gt}{v}} + \frac{g}{v}\int_0^t e^{-\frac{g(t-s)}{v}} a_a(s)\,ds$$

where $g$ is the acceleration of gravity=32 ft./sec.²; $v$ is the speed of fall=750 ft./sec.; $A_o$ is the trajectory angle at the time the eye is opened=0.366 radians=21° in the up-down channel and 0° in the right-left channel; $F$ is the angular rate of the target; $a_a$ is the lateral acceleration effected by the deflectors=0.7 $g$ or 22.4 ft./sec.² for a fully extended deflector; $n$ is the overcontrol factor=2; and $t$ is the time measured from the moment that the eye opens.

The design of the deflector circuit Fig. 12 is derived from the fundamental trajectory theory of the bomb. The deflector circuit receives the voltages supplied by two other components of the bomb, and from these voltages compute the signal for the control of the deflectors. These two voltages are: (1) the voltage at the output of the torque motor bridge ($V_{TMB}$), and (2) the voltage obtained from the deflector potentiometer ($V_{DFP}$). The deflector circuit includes two independent channels, an up-down channel and a left-right channel and there are four input voltages, two for each channel.

In the fundamental control equation, the first term represents the voltage at the output of the torque motor bridge, the second term represents the voltage obtained from the deflector potentiometers while the third and fourth terms represent voltages which are obtained inside the deflector box.

Equation 27 is readily converted into a voltage equation since the voltage supplied by the torque motor bridge $V_{TMB}$ corresponds, when the pad 196, Fig. 10C is in circuit, to 5000 volts per radian per second of target rate or as shown above (Part III) to 5 volts per mil per second.

Thus, if $R$ represents the target rate in mils per second, then $$R = 1000F \qquad (29)$$

and by substituting $n=2$ and (29) in (27) and using the relation $$V_{TMB} = 5R = 5000F \qquad (30)$$

we get $$0 = V_{TMB} - \frac{1}{2}\Big[3.35\, a_a(t)\Big] + 3.35\, gA_o e^{-\frac{t}{23.4}}$$
$$+ \int_0^t e^{-\frac{(t-s)}{23.4}}[3.35\, a_a(s)]\frac{ds}{23.4}$$

(31)

where $t$ is measured in seconds and $a_a$ in feet per second per second. (Note 3.35 $gA_o$=39, i.e. approximately 40 in Part III.)

Experimental drop tests indicate that the average acceleration effected by a fully extended deflector is about 0.7 $g$=22.4 ft./sec.². Furthermore, wind tunnel tests have shown that the acceleration is approximately proportional to the extension. Thus the voltage to be obtained from the deflector potentiometer in each channel should be 3.35×22.4 or 75 volts for a fully extended deflector, and for a deflector which is extended a fraction, $f$, of its full extension, the deflector potentiometer should supply a voltage $V_{DFP}$:

$$V_{DFP} = 3.35 a_a = 75f \qquad (32)$$

The result of substituting (32) in (31) is $$0 = V_{TMB} - \frac{1}{2}V_{DFP} + 39e^{-\frac{t}{23.4}}$$
$$+ \int_0^t e^{-\frac{(t-s)}{23.4}} V_{DFP}(s)\frac{ds}{23.4}$$

(31a)

This reduces the fundamental control equation of the bomb to an equation which involves only the voltage delivered to the deflector circuit by the torque motor bridge and the deflector potentiometer voltage, i.e. $V_{TMB}$ and $V_{DFP}$, respectively.

The deflector circuit can more generally be shown to be based on Equation 31a by referring to Fig. 12 but for purposes of simplicity in calculations, using +135 volts instead of +145 at the lower end of R² and +96 volts instead of +92 volts for the up-down channel bias.

The new relations evident from an inspection of Fig. 12 are then:

$$A = \frac{1}{2}(A1 + E)$$

$$B = \frac{1}{2}(A2 + F)$$

$$F = \frac{1}{2}(B5 + 135)$$

For purposes of further simplification, the voltage at the cathode of cathode follower V83 is assumed equal to the voltage on the grid:

$$E = G \qquad (33)$$

Then $$A - B = \frac{1}{2}(A1 + E) - \frac{1}{2}(A2 + F)$$

or $$2(A - B) = (A1 - A2) + E - \frac{1}{2}(B5 + 135) \qquad (34)$$

But $V_{TMB}$ is the difference of the voltages applied to terminals A1 and A2. Thus, $$V_{TMB} = A1 - A2 \qquad (35)$$

Furthermore, the voltage from the deflector potentiometer, $V_{DFP}$, is equal to the difference between the voltage at terminal B5 and 135 volts $$V_{DFP} = B5 - 135 \qquad (36)$$

From (35) and (36) Equation 34 becomes:

$$2(A - B) = V_{TMB} - \frac{1}{2}V_{DFP} - 135 + E \qquad (37)$$

The application of circuit theory to the part of the circuit involving R and C, yields the voltage at G at a time $t$ after the circuit begins functioning $$E = G = 96 + \frac{1}{RC}\int_0^t e^{-\frac{(t-s)}{RC}}[B5(s) - 96]\,ds$$

and by mathematical transformation $$E = G = 135 + 39e^{-\frac{t}{RC}} + \frac{1}{RC}\int_0^t e^{-\frac{(t-s)}{RC}}[B5(s) - 135]\,ds$$

(38)

Substituting (38) in (37) gives $$2(A - B) = V_{TMB} - \frac{1}{2}V_{DFP} + 39e^{-\frac{t}{23.4}}$$
$$+ \int_0^t e^{-\frac{(t-s)}{23.4}} V_{DFP}(s)\frac{ds}{23.4}$$

(39)

Thus Equations 39 and 31a are identical if the voltage difference between the voltages at A and B are maintained equal to zero. This is accomplished in the bomb with a differential relay operated by the difference in the voltages A and B, tubes V81 and V82 being used as power amplifiers. This relay operates further relay circuits which move the deflectors in the direction required to charge $V_{DFP}$ so that the magnitude of the difference between A and B is reduced to zero.

Since certain changes may be made in the above product without departing from the scope of the invention herein involved, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In combination in a nosepiece for an airborne missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein it is pointing approximately at the target and whereby the mirror of the eye-mirror-gyroscope unit scans the field of view and projects energy received from the target onto the eye of the eye-mirror-gyroscope unit, one of said circuits amplifying the signals received by the eye and converting them into electrical impulses, a commutator rotatable synchronously at mirror speed for allocating the impulses to predeterminable ones of said circuits, means responsive to the allocated impulses for precessing the eye-mirror-gyroscope unit whereby it constantly follows the path of the target and additional means responsive to received signals to guide the missile along a trajectory terminating on the target.

2. In combination in a nosepiece for an airborne missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein it is pointing approximately at the target and whereby the mirror of the eye-mirror-gyroscope unit scans the field of view and projects energy received from the target onto the eye of the eye-mirror-gyroscope unit, predetermined ones of said circuits being energizable and operable to precess the eye-mirror-gyroscope unit whereby it constantly follows the path of the target and additional means responsive to the energization of said predetermined circuits to guide the missile along a trajectory terminating on the target.

3. In combination in a nosepiece for an airborne missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein it is pointing approximately at the target and whereby the mirror of the eye-mirror-gyroscope unit scans the field of view and projects energy received from the target onto the eye of the eye-mirror-gyroscope, predetermined ones of said circuits being energizable and operable to precess the eye-mirror-gyroscope unit whereby it constantly follows the path of the target, aerodynamic means for varying the trajectory of the missile and further means responsive to the energization of said predetermined circuits for controlling the aerodynamic means.

4. In combination in a nosepiece for an airborne missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein it is pointing approximately at the target and whereby the mirror of the eye-mirror-gyroscope unit scans the field of view and projects energy received from the target onto the eye of the eye-mirror-gyroscope unit, one of said circuits amplifying the signals received by the eye and converting them into electrical impulses, a commutator rotatable synchronously at mirror speed for allocating the impulses to predeterminable ones of said circuits, peak reading circuits responsive to impulses allocated thereto for converting the impulses into a continuous current of approximately constant potential, means operable by said current to precess the eye-mirror-gyroscope unit whereby it constantly follows the path of the target and additional means responsive to the continuous current to guide the missile along a trajectory terminating on the target.

5. In combination in a nosepiece for an airborne missile, means for mounting the nosepiece axially in the fuse hole of the missile, means for stabilizing the nosepiece against axail roll, an eye-mirror-gyroscope unit caged so as to point approximately at field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein it is pointing approximately at the target and whereby the mirror of the eye-mirror-gyroscope unit scans the field of view and projects energy received from the target onto the eye of the eye-mirror-gyroscope unit, one of said circuits amplifying the signals received by the eye and converting them into electrical impulses, a commutator rotatable synchronously at mirror speed for allocating the impulses to predeterminable ones of said circuits, peak reading circuits responsive to impulses allocated thereto for converting the impulses into a continuous current of approximately constant potential, electromagnetic means operable by said current to precess the eye-mirror-gyroscope unit whereby it constantly follows the path of the target and additional means responsive to the continuous current to guide the missile along a trajectory terminating on the target.

6. In combination in a nosepiece for an airborne missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein it is pointing approximately at the target and whereby the mirror of the eye-mirror-gyroscope unit scans the field of view and projects energy received from the target onto the eye of the eye-mirror-gyroscope unit, one of said circuits amplifying the signals received by the eye and converting them into electrical impulses, a commutator rotatable synchronously at mirror speed for allocating the impulses to predeterminable ones of said circuits, peak reading circuits responsive to impulses allocated thereto for converting the impulses into a continuous current of approximately constant potential, torque motors selectively energizable by said current in accordance with the allocation of impulses by the commutator to precess the eye-mirror-gyroscope unit whereby it constantly follows the path of the target and additional means responsive to the continuous current to guide the missile along a trajectory terminating on the target.

7. In combination in a nosepiece for an airborne missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein it is pointing approximately at the target and whereby the mirror of the eye-mirror-gyroscope unit scans the field of view and projects energy received from the target onto the eye of the eye-mirror-gyroscope unit, one of said circuits amplifying the signals received by the eye and converting them into electrical impulses, a commutator rotatable synchronously at mirror speed for allocating the impulses to predeterminable ones of said circuits, peak reading circuits responsive to impulses allocated thereto for converting the impulses into a continuous current of approximately constant potential, a pair of mutually supported gimbals having bearing units for supporting the eye-mirror-gyroscope unit as a free gyroscope after the uncaging thereof, torque motors selectively energizable by said current in accordance with the allocation of impulses by the commutator and operable at the bearing units to precess the eye-mirror-gyroscope unit whereby it constantly follows the path of the target and additional means responsive to the continuous current to guide the missile along a trajectory terminating on the target.

8. In combination in a nosepiece for an airborne missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein it is pointing approximately at the target and whereby the mirror of the eye-mirror-gyroscope unit scans the field of view and projects energy received from the target onto the eye of the eye-mirror-gyroscope unit, one of said circuits amplifying the signals received by the eye and converting them into electrical impulses, a commutator rotatable synchronously at mirror speed for allocating the impulses to predeterminable ones of said circuits, peak reading circuits responsive to impulses allocated thereto for converting the impulses into a continuous current of approximately constant potential, aerodynamic means for varying the trajectory of the missile and further means responsive to the continuous current for controlling the aerodynamic means to guide the missile along a trajectory terminating on the target.

9. In combination in a nosepiece for an airbone missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein its axis is pointing approximately at the target and whereby the mirror of the eye-mirror-gyroscope unit scans the field of view and projects energy received from the target onto the eye of the eye-mirror-gyroscope unit, one of said circuits amplifying the signals received by the eye and coverting them into electrical impulses, a commutator rotatable synchronously at mirror speed for allocating the impulses to predeterminable ones of said circuits, peak reading circuits responsive to impulses allocated thereto for converting the impulses into a continuous current of approximately constant potential, means operable by said current to precess the eye-mirror-gyroscope unit whereby it constantly follows the path of the target, a plurality of axially extensible and retractable deflectors between the axis and periphery of the nosepiece, circuits selectively energizable for effecting the extension and retraction of the deflectors and switching means for selectively energizing the deflector operating circuits from said commutator to guide the missile along a trajectory terminating on the target.

10. In combination in a nosepiece for an airbone missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein its axis is pointing approximately at the target and whereby the mirror of the eye-mirror-gyroscope unit scans the field of view and projects energy received from the target onto the eye of the eye-mirror-gyroscope unit, one of said circuits amplifying the signals received by the eye and converting them into electrical impulses, a commutator rotatable synchronously at mirror speed for allocating the impulses to predeterminable ones of said circuits, peak reading circuits responsive to impulses allocated thereto for converting the impulses into a continuous current of approximately constant potential, means operable by said current to precess the eye-mirror-gyroscope unit whereby it constantly follows the path of the target, a plurality of axially extensible and retractable deflectors between the axis and periphery of the nosepiece, circuits selectively energizable for effecting the extension and retraction of the deflectors and electronic switching means for selectively energizing the deflector operating circuits from said commutator to guide the missile along a trajectory terminating on the target.

11. In combination in a nosepiece for an airbone missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein it is pointing approximately at the target and whereby the mirror of the eye-mirror-gyroscope unit scans the field of view and projects energy received from the target onto the eye of the eye-mirror-gyroscope unit, one of said circuits amplifying the signals received by the eye and converting them into electrical impulses, a commutator rotatable synchronously at mirror speed for allocating the impulses to predeterminable ones of said circuits, peak reading circuits responsive to impulses allocated thereto for converting the impulses into a continuous current of approximately constant potential, means operable by said current to precess the eye-mirror-gyroscope unit whereby it constantly follows the path of the target, axially extensible and retractable deflectors, means for effecting the extension and retraction of said deflectors, a second gear train operable by the motor and operable to actuate the means for effecting the extension and retraction of said deflectors and electromagnetic means selectively energizable by predeterminable circuits energized by said current according to the quadrant position of the target in the field of view for selecting for extension at least one of the deflectors immediately associated with a particular quadrant position of the target to guide the missile along a trajectory terminating on the target.

12. In combination in a nosepiece for an airborne missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein it is pointing approximately at the target and whereby the mirror of the eye-mirror-gyroscope unit scans the field of view and projects energy received from the target onto the eye of the eye-mirror-gyroscope unit, one of said circuits amplifying the signals received by the eye and converting them into electrical impulses, a commutator rotatable synchronously at mirror speed for allocating the impulses to predeterminable ones of said circuits, peak reading circuits responsive to impulses allocated thereto for converting the impulses into a continuous current of approximately constant potential, means operable by said current to precess the eye-mirror-gyroscope unit whereby it constantly follows the path of the target, deflectors intermediate the axis and the periphery of the nosepiece and extensible and retractable in a direction parallel to the axis, means for effecting the extension and retraction of said deflectors, a second gear train operable by the motor and operable to actuate the means for effecting the extension and retraction of said deflectors and electromagnetic means selectively energizable by predeterminable circuits energized by said current according to the quadrant position of the target in the field of view for selecting for extension at least one of the deflectors immediately associated with a particular quadrant position of the target to guide the missile along a trajectory terminating on the target.

13. In combination in a nosepiece for an airborne missile, means for mounting the nosepiece axially in the fuse hole of the missile, means for stabilizing the nosepiece against axial roll, an eye-mirror-gyroscope unit caged so as to point approximately at a field of view containing a target, a source of power, a motor operably connectable to the source of power for continuous rotation immediately upon the release of the missile, a gear train operable by the motor and capable of imparting rotation to the gyroscope of the eye-mirror-gyroscope unit, a dynamically released element in the gear train centrifugally operable for disengaging the gear train from operation by the motor, a breakaway device for preliminary orientation of the missile, interconnecting functional circuits in the nosepiece, a spring wound timing device for sequentially completing predeterminable ones of said circuits to effect the homing operation of the nosepiece, a timer release means operable by the breakaway device to start the timing device, means for stabilizing the nosepiece against axial roll having its operation initiated likewise by the breakaway device, dynamotor means operatively connected to the source of power by the timing device after the lapse of a predetermined time interval, a condenser for supplying voltage to the eye of the eye-mirror-gyroscope unit, means operable by the timing device for causing the dynamotor to charge the condenser, means operable by the timing device to disconnect the charged condenser from the dynamotor and connect it in operative association with the eye unit, means operable by the timing device for uncaging the eye-mirror-gyroscope unit in its operative position wherein it is pointing approximately at the target and whereby the mirror of the eye-mirror-gyroscope unit scans the field of view and projects energy received from the target onto the eye of the eye-mirror-gyroscope unit, one of said circuits amplifying the signals received by the eye and converting them into electrical impulses, a commutator rotatable synchronously at mirror speed for allocating the impulses to predeterminable ones of said circuits, peak reading circuits responsive to impulses allocated thereto for converting the impulses into a continuous current of approximately constant potential, means operable by said current to precess the eye-mirror-gyroscope unit whereby it constantly follows the path of the target, axially extensible and retractable deflectors, means for effecting the extension and retraction of said deflectors, a second gear train operable by the motor and operable to actuate the means for effecting the extension and retraction of said deflectors and electromagnetic means selectively energizable by predeterminable circuits energized by said current according to the quadrant position of the target in the field of view for selecting for extension at least one of the deflectors immediately associated with a particular quadrant position of the target to guide the missile along a trajectory terminating on the target, a circuit for neutralizing the electromagnetic means selectively energized by said continuous current, said neutralizing circuit comprising a potentiometer, sliding contacts for said potentiometer operable by the extensible and retractable deflectors for determining the degree of neutralization effected by said neutralizing circuit, the neutralization being effective to stop the extension and retraction of the particular deflector associated with the selectively energized electromagnetic means whereby the missile is guided along a trajectory more likely to terminate on the target.

14. A homing system for directing a bomb on a collision course with a target comprising a nosepiece of the bomb having a directional eye, said nosepiece being mounted to rotate independently of the bomb body, said directional eye being sensitive to thermal radiations emanating from the target, means cooperating with the eye for determining the relationship of eye heading to bomb-to-target line of sight, means responsive to the last-mentioned means for altering the directional eye heading in space to lock the eye on target, said last-mentioned means producing a voltage signal proportional to the rate of change of the eye heading, deflectors actuated in proportion to said voltage signal for altering the course of the bomb, and a resistance-capacitance time circuit producing a varying second voltage signal combining with the first voltage signal to introduce a gravity compensation factor into the response of the deflectors to said first signal for automatically influencing the bomb to deviate from a normal trajectory path to a desired substantially circular one, alterations in the rate of change of the eye heading as represented by changes in said first voltage signal displacing said circular trajectory to re-establish a constant rate of change of directional eye heading.

References Cited in the file of this patent

UNITED STATES PATENTS

| | | |
|---|---|---|
| 1,384,868 | Sperry | July 19, 1921 |
| 1,388,932 | Centervall | Aug. 30, 1921 |
| 1,515,869 | Moyer | Nov. 18, 1924 |
| 1,722,302 | Lamb | July 30, 1929 |
| 1,970,442 | Wittkuhns et al. | Aug. 14, 1934 |
| 2,049,375 | Henderson | July 28, 1936 |
| 2,165,800 | Koch | July 11, 1939 |
| 2,369,622 | Toulon | Feb. 13, 1945 |
| 2,403,387 | McLennan | July 2, 1946 |
| 2,404,942 | Bedford | July 30, 1946 |
| 2,406,293 | Hammond | Aug. 20, 1946 |
| 2,417,112 | Kettering | Mar. 11, 1947 |
| 2,425,558 | Ohlendorf | Aug. 12, 1947 |
| 2,425,737 | Hanna | Aug. 19, 1947 |
| 2,437,251 | Frische et al. | Mar. 9, 1948 |
| 2,507,451 | Molnar et al. | May 9, 1950 |
| 2,520,433 | Robinson | Aug. 29, 1950 |
| 2,546,145 | Boonshoff | Mar. 27, 1951 |
| 2,586,817 | Harris | Feb. 26, 1952 |
| 2,588,382 | Hammond | Mar. 11, 1952 |

FOREIGN PATENTS

| | | |
|---|---|---|
| 262,445 | Germany | July 14, 1913 |
| 797,933 | France | Feb. 24, 1936 |
| 354,768 | Italy | Dec. 7, 1937 |
| 832,427 | France | July 4, 1938 |